(12) United States Patent
Nishimura

(10) Patent No.: US 12,027,319 B2
(45) Date of Patent: Jul. 2, 2024

(54) MULTILAYER CERAMIC CAPACITOR

(71) Applicant: Murata Manufacturing Co., Ltd., Nagaokakyo (JP)

(72) Inventor: Ryo Nishimura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/367,520

(22) Filed: Sep. 13, 2023

(65) Prior Publication Data

US 2023/0420189 A1 Dec. 28, 2023

Related U.S. Application Data

(63) Continuation of application No. 17/691,607, filed on Mar. 10, 2022, now Pat. No. 11,798,744.

(30) Foreign Application Priority Data

Mar. 16, 2021 (JP) ................................. 2021-042346

(51) Int. Cl.
*H01G 4/232* (2006.01)
*H01G 4/30* (2006.01)

(52) U.S. Cl.
CPC .............. *H01G 4/232* (2013.01); *H01G 4/30* (2013.01)

(58) Field of Classification Search
CPC ................................. H01G 4/232; H01G 4/30
See application file for complete search history.

(56) References Cited

U.S. PATENT DOCUMENTS

| | | | |
|---|---|---|---|
| 2009/0284897 A1* | 11/2009 | Itamura | H01G 4/232 29/25.42 |
| 2014/0151101 A1* | 6/2014 | Lee | H01G 4/12 156/89.12 |
| 2016/0372255 A1* | 12/2016 | Maki | H01F 17/0033 |
| 2017/0330688 A1* | 11/2017 | Lim | H01G 4/306 |
| 2018/0082787 A1* | 3/2018 | Hamamori | H01G 4/2325 |
| 2019/0164682 A1* | 5/2019 | Maki | H01F 41/046 |
| 2020/0281078 A1* | 9/2020 | Takahashi | H01F 17/0013 |
| 2022/0172900 A1* | 6/2022 | Shimada | H01G 4/008 |

OTHER PUBLICATIONS

Nishimura, "Multilayer Ceramic Capacitor", U.S. Appl. No. 17/691,607, filed Mar. 10, 2022.

* cited by examiner

*Primary Examiner* — Michael P McFadden
(74) *Attorney, Agent, or Firm* — Keating & Bennett, LLP

(57) ABSTRACT

A multilayer ceramic capacitor includes a multilayer body, and external electrodes on a portion of a side surface portion including four side surface of the multilayer body, and on a portion of a first main surface of the multilayer body. The first main surface includes first regions covered with the external electrodes and a second region exposed from the external electrodes. The first regions of the first main surface each include recesses therein. The recesses in each of the first regions each include a spherical curved wall surface. The recesses in each of the first regions each have an average inlet size of about 0.3 μm or more and about 10.5 μm or less.

14 Claims, 32 Drawing Sheets

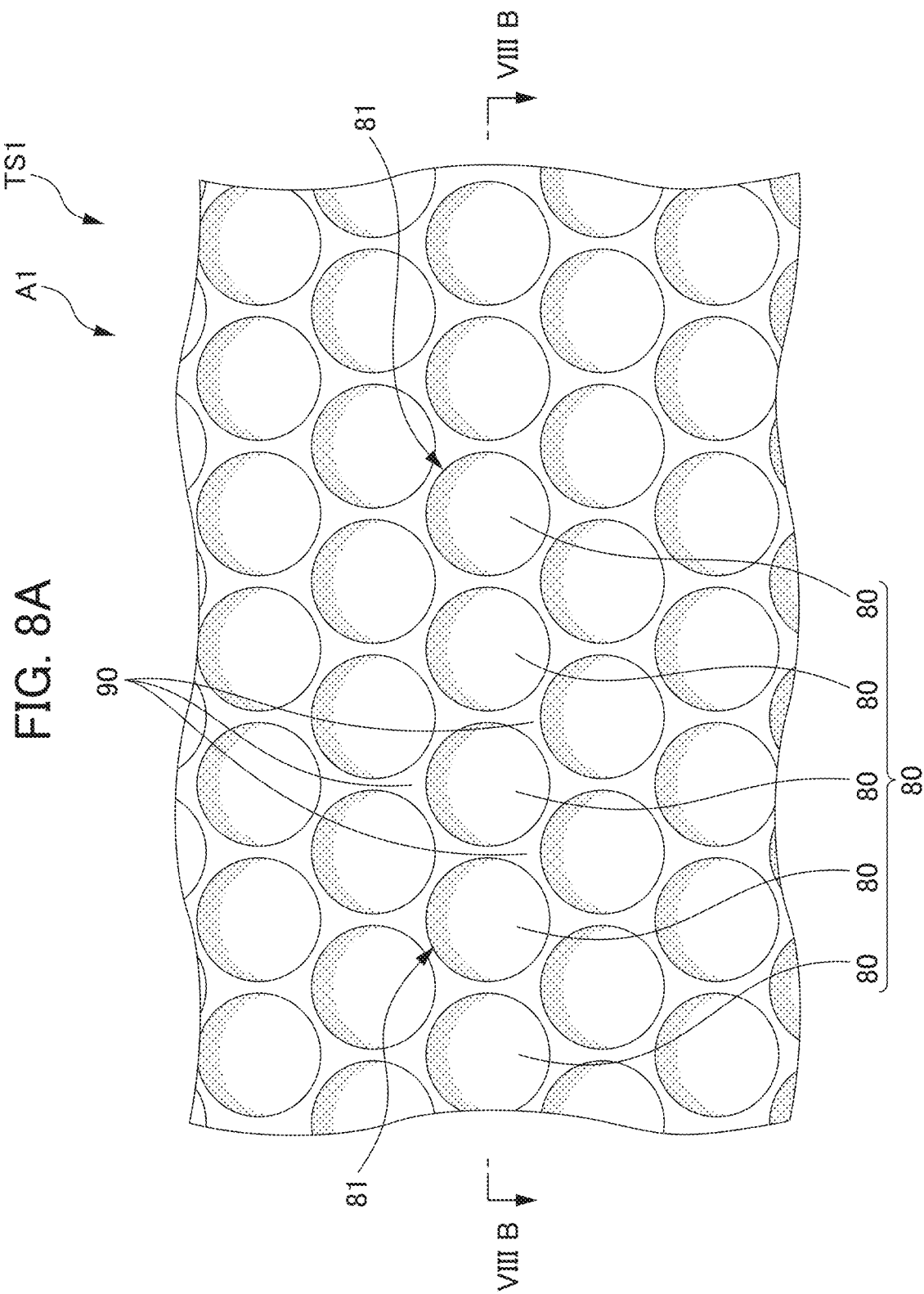

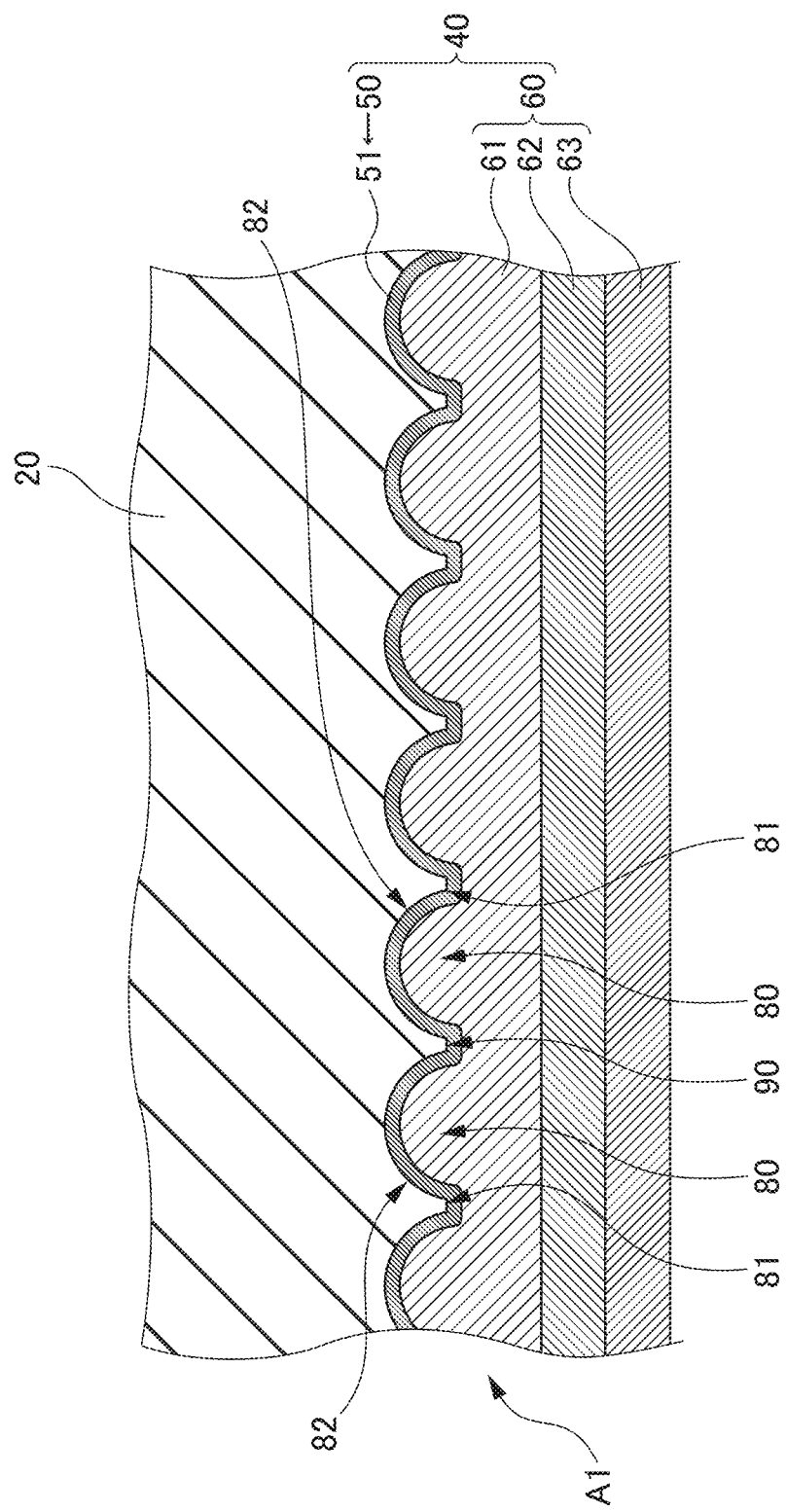

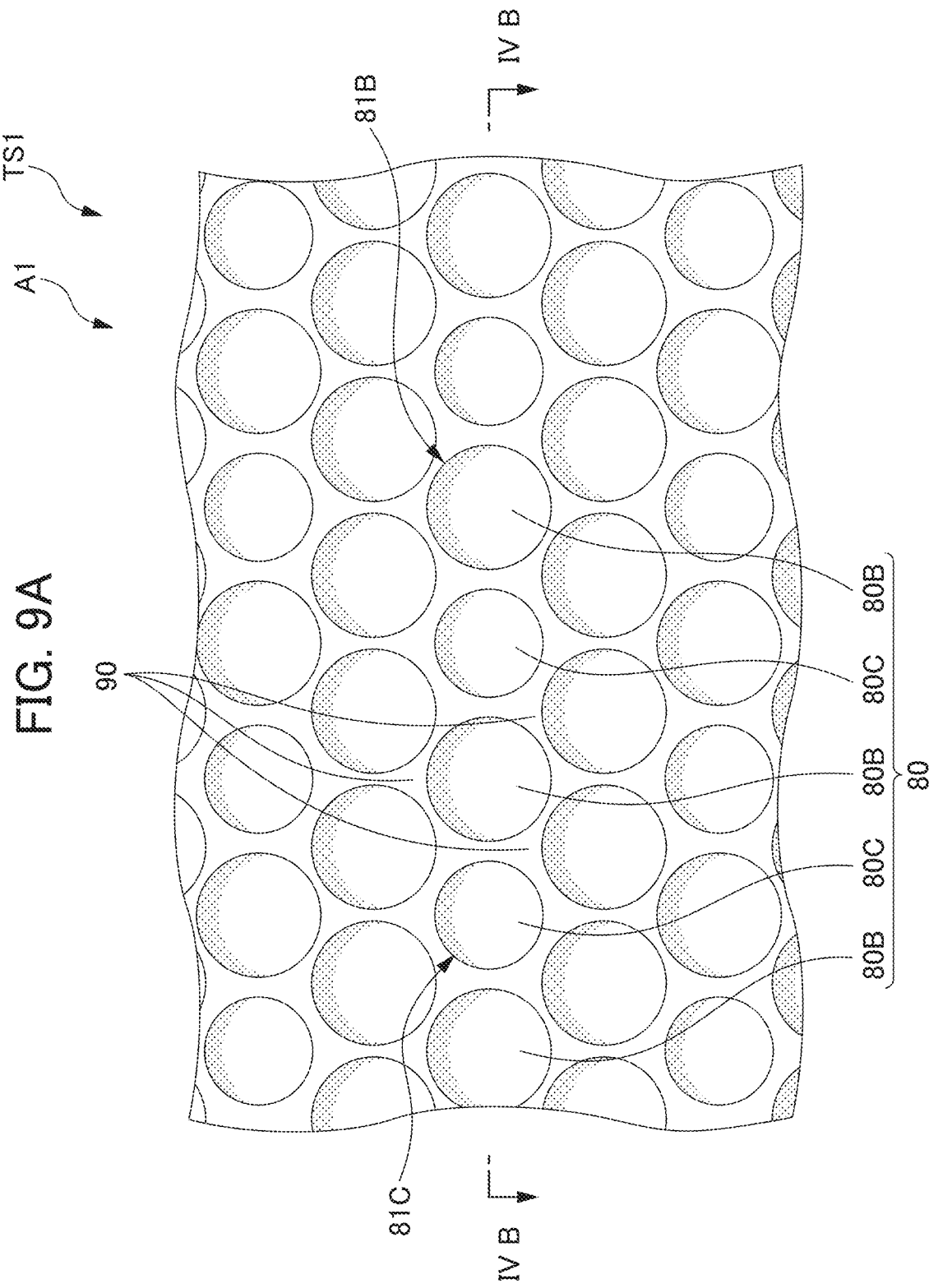

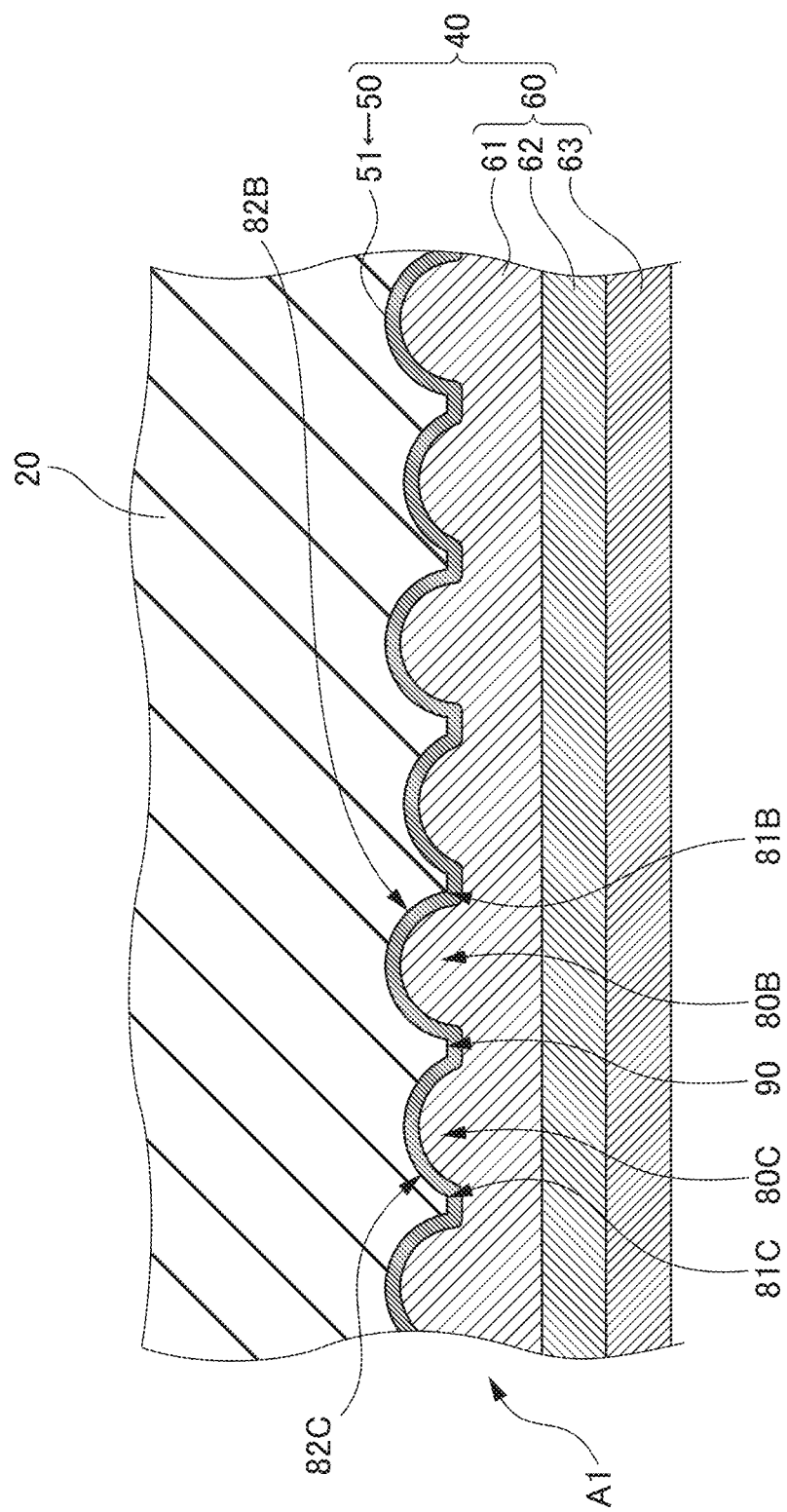

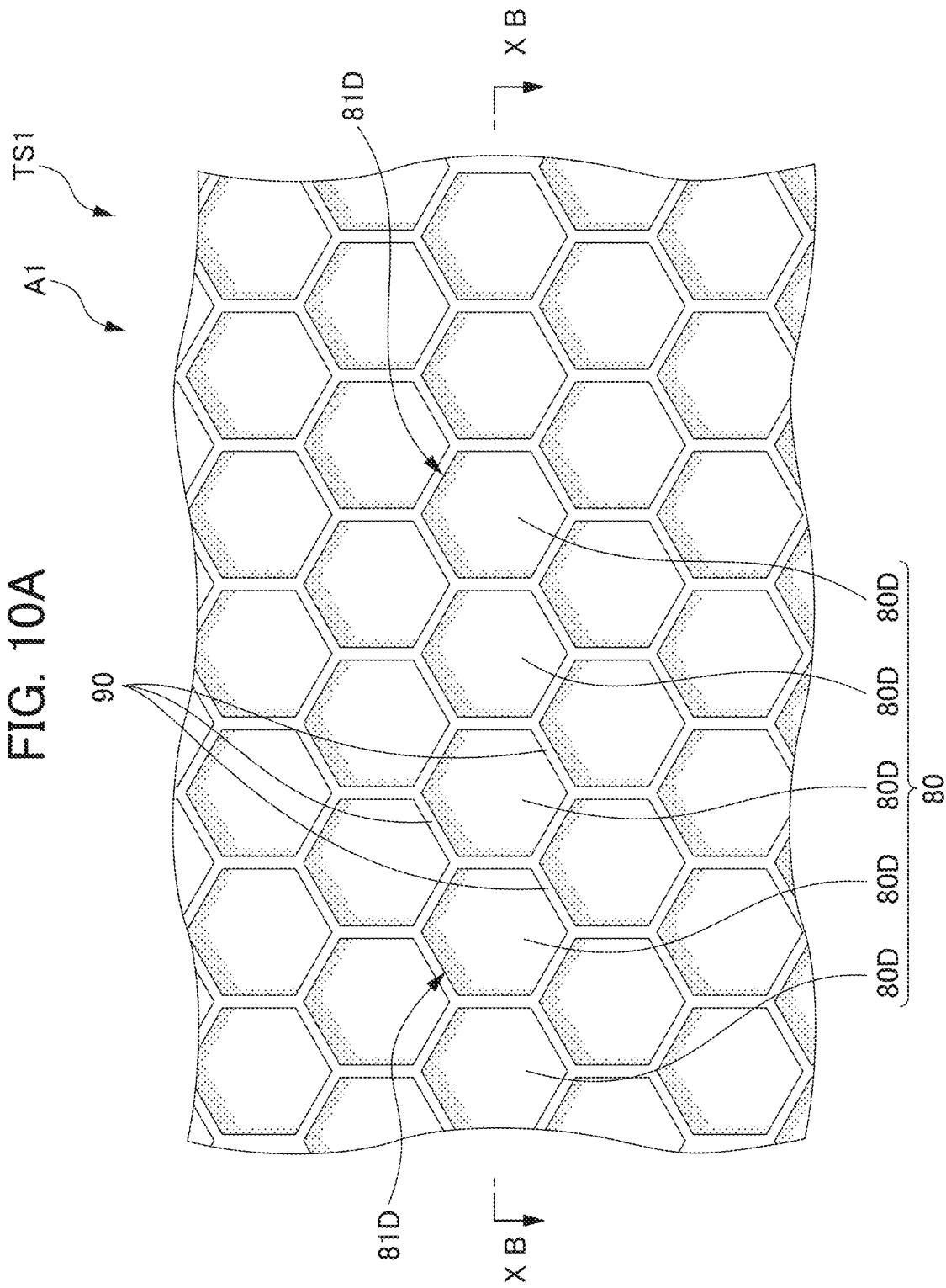

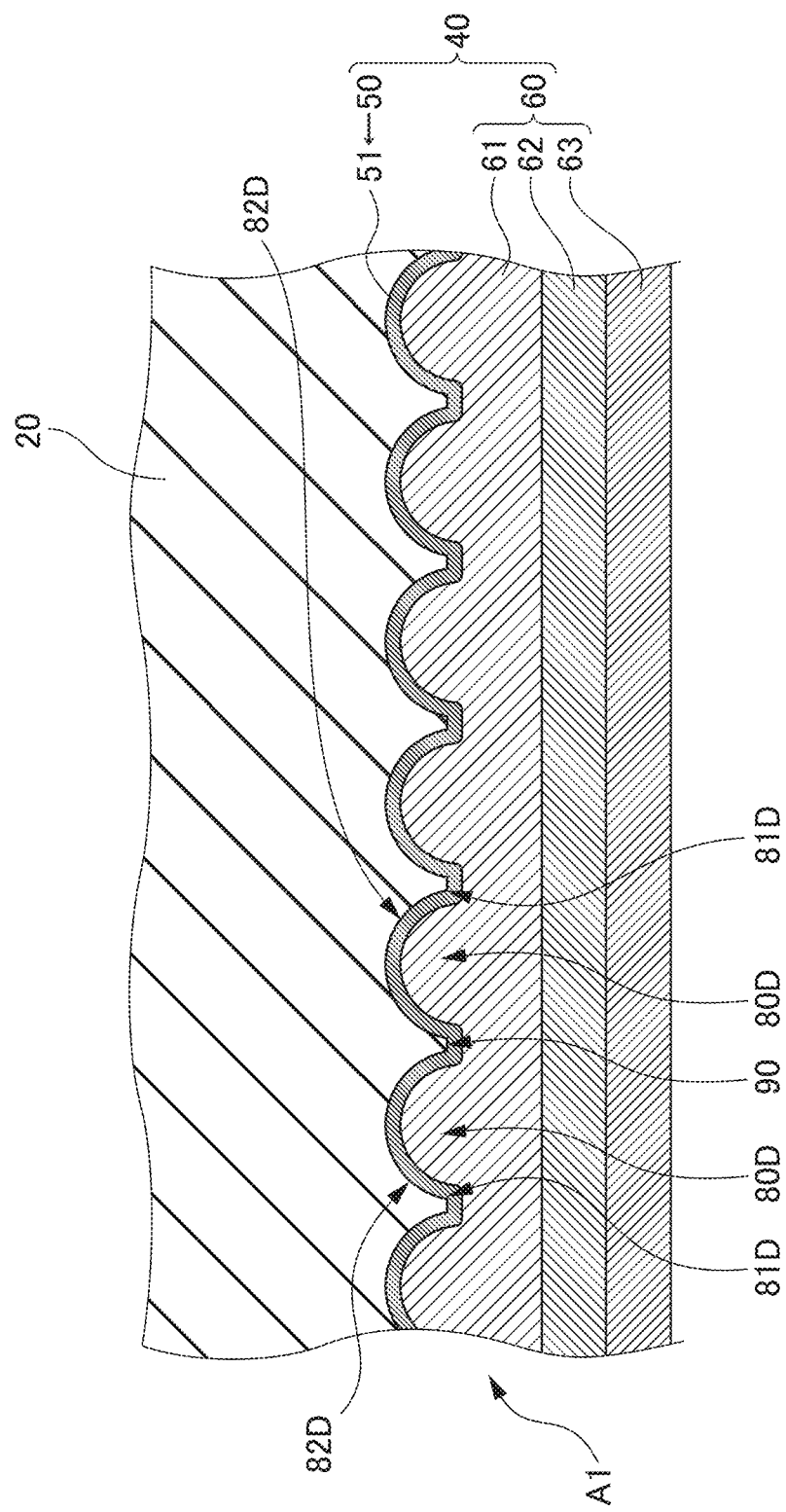

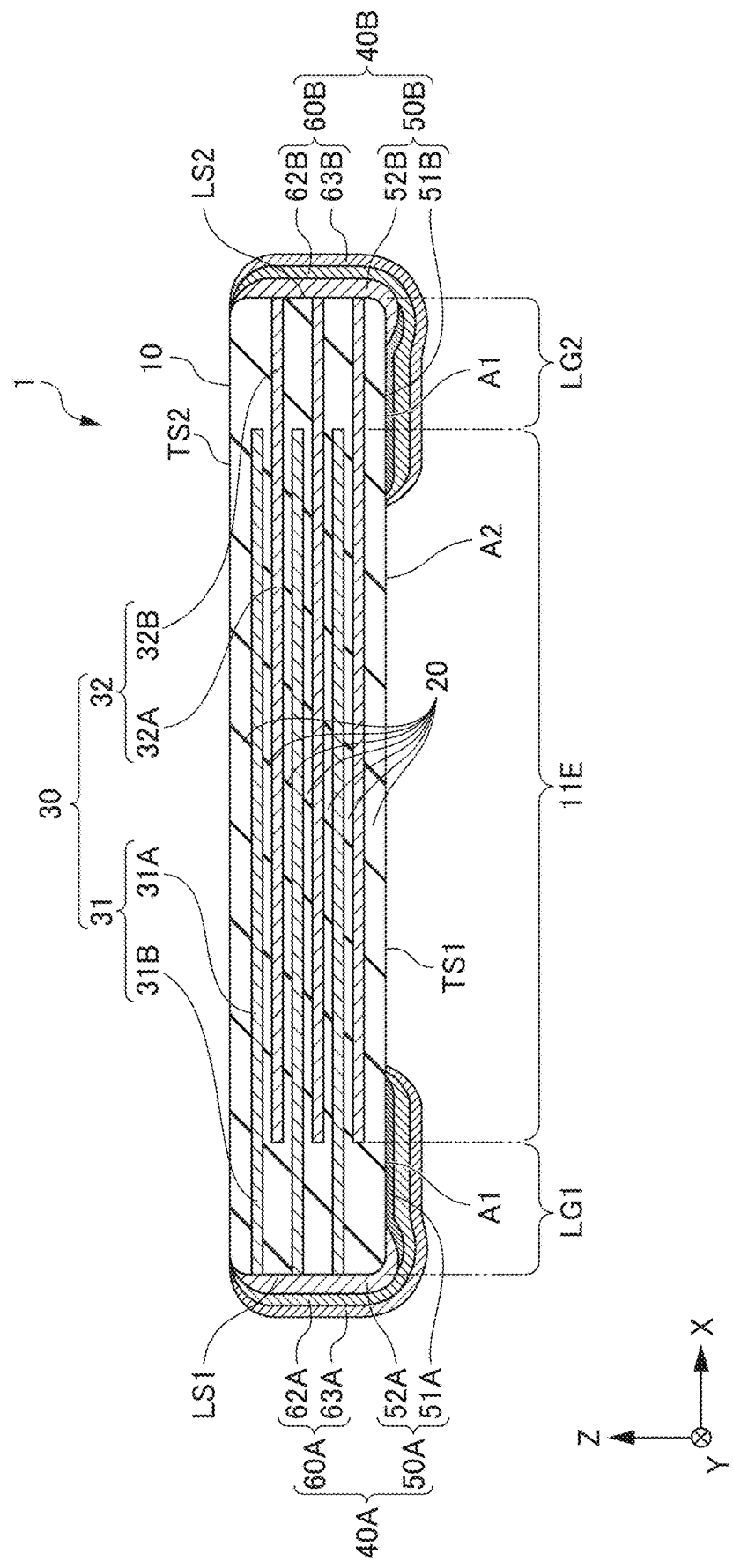

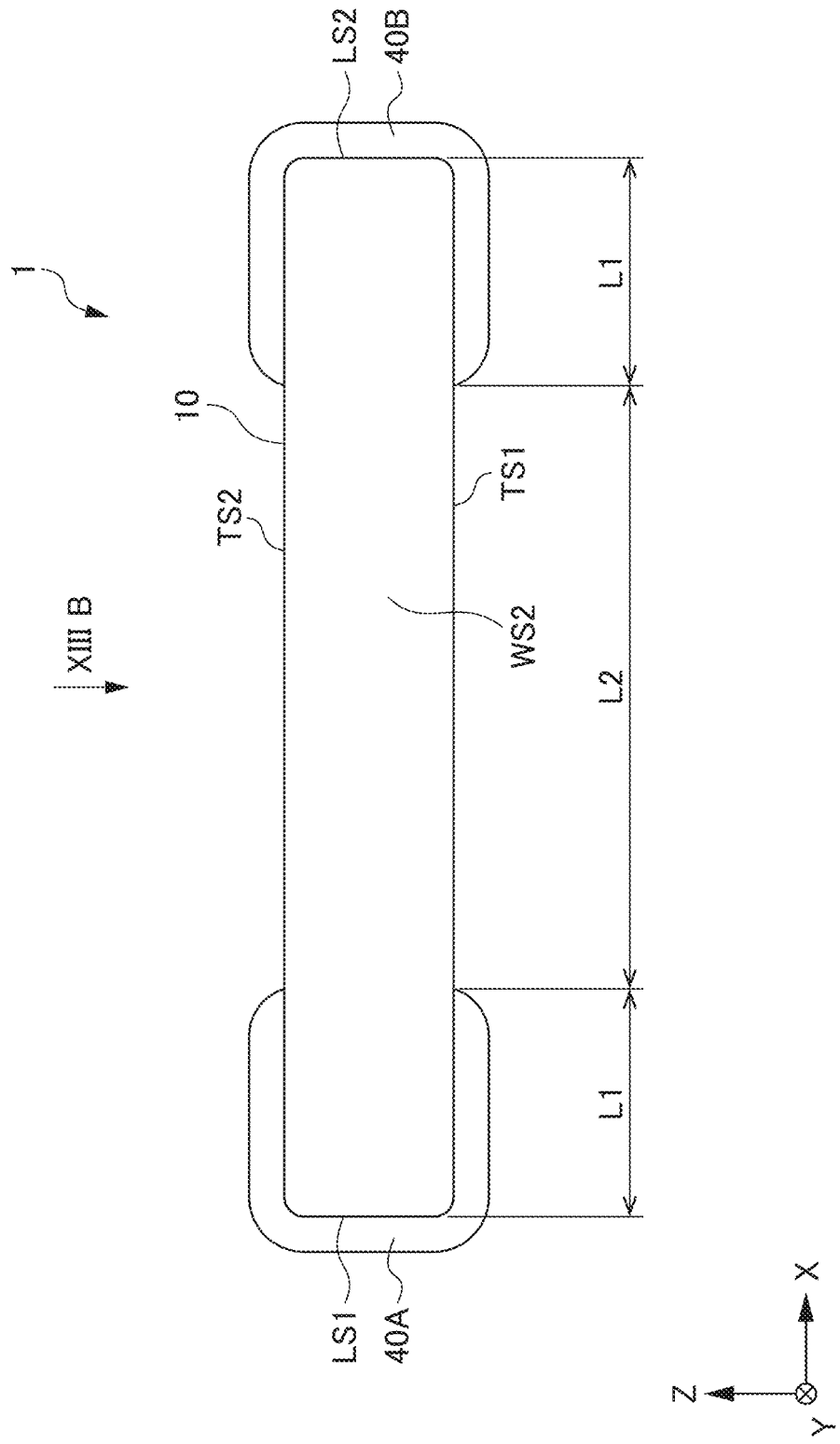

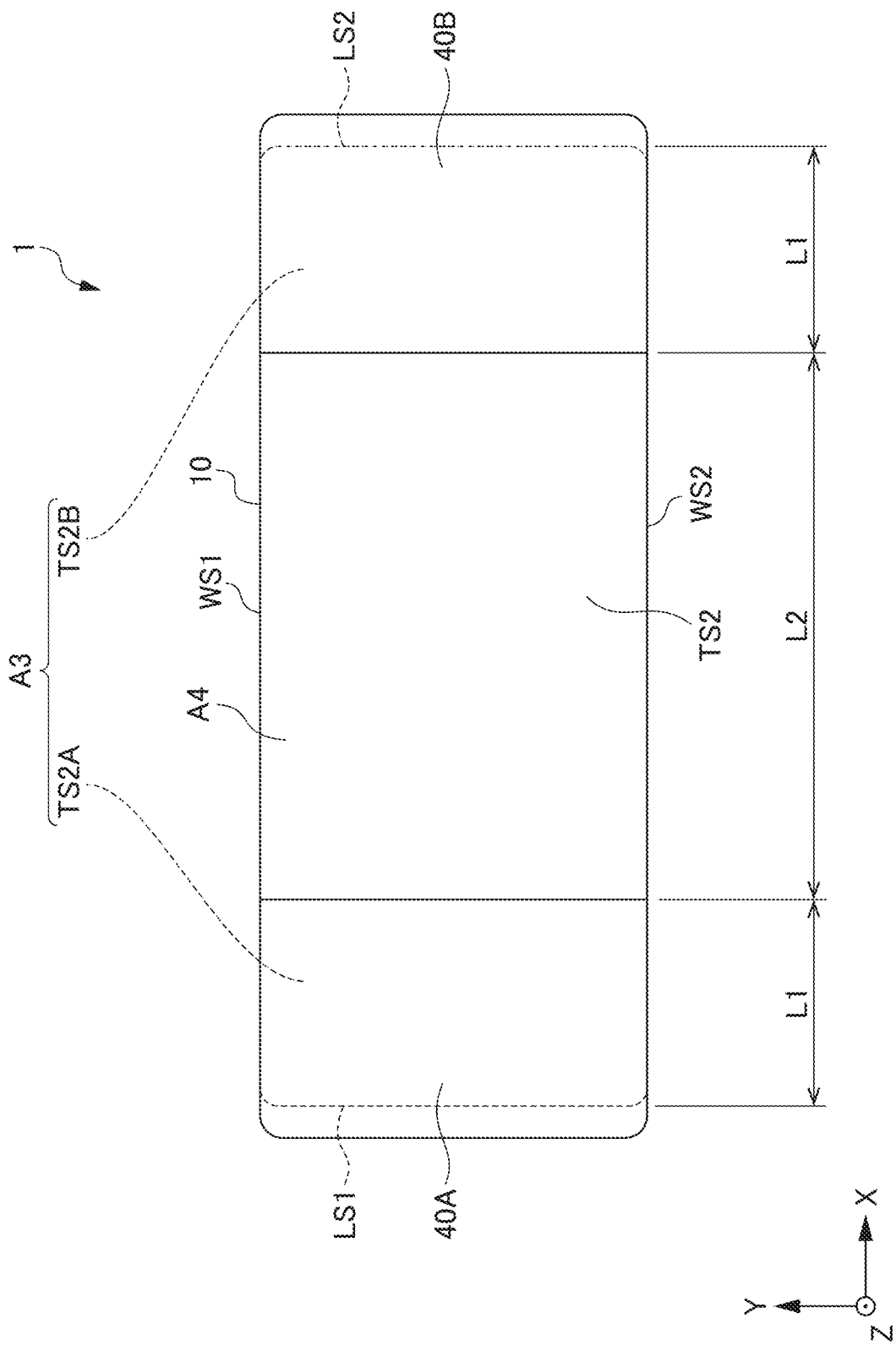

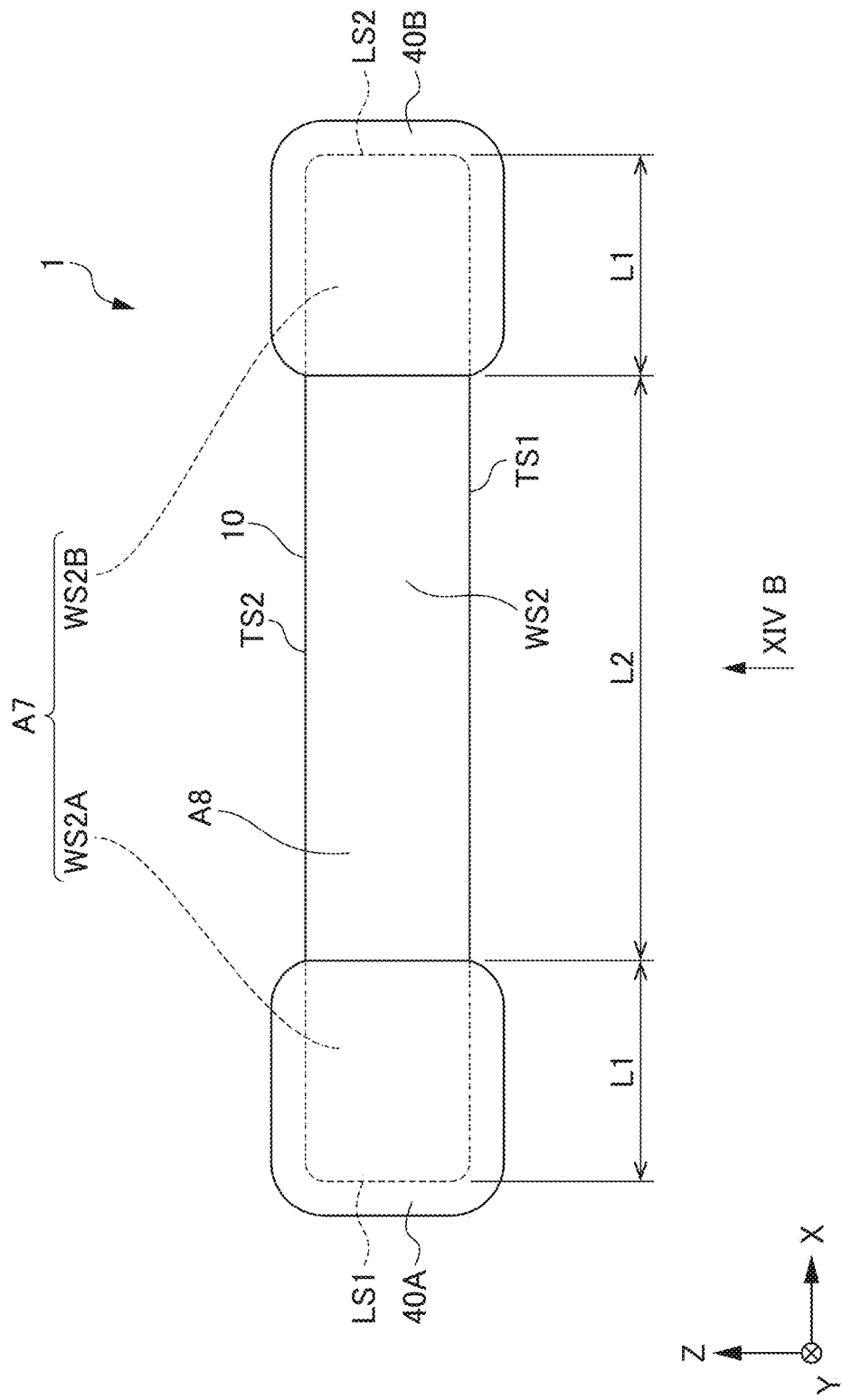

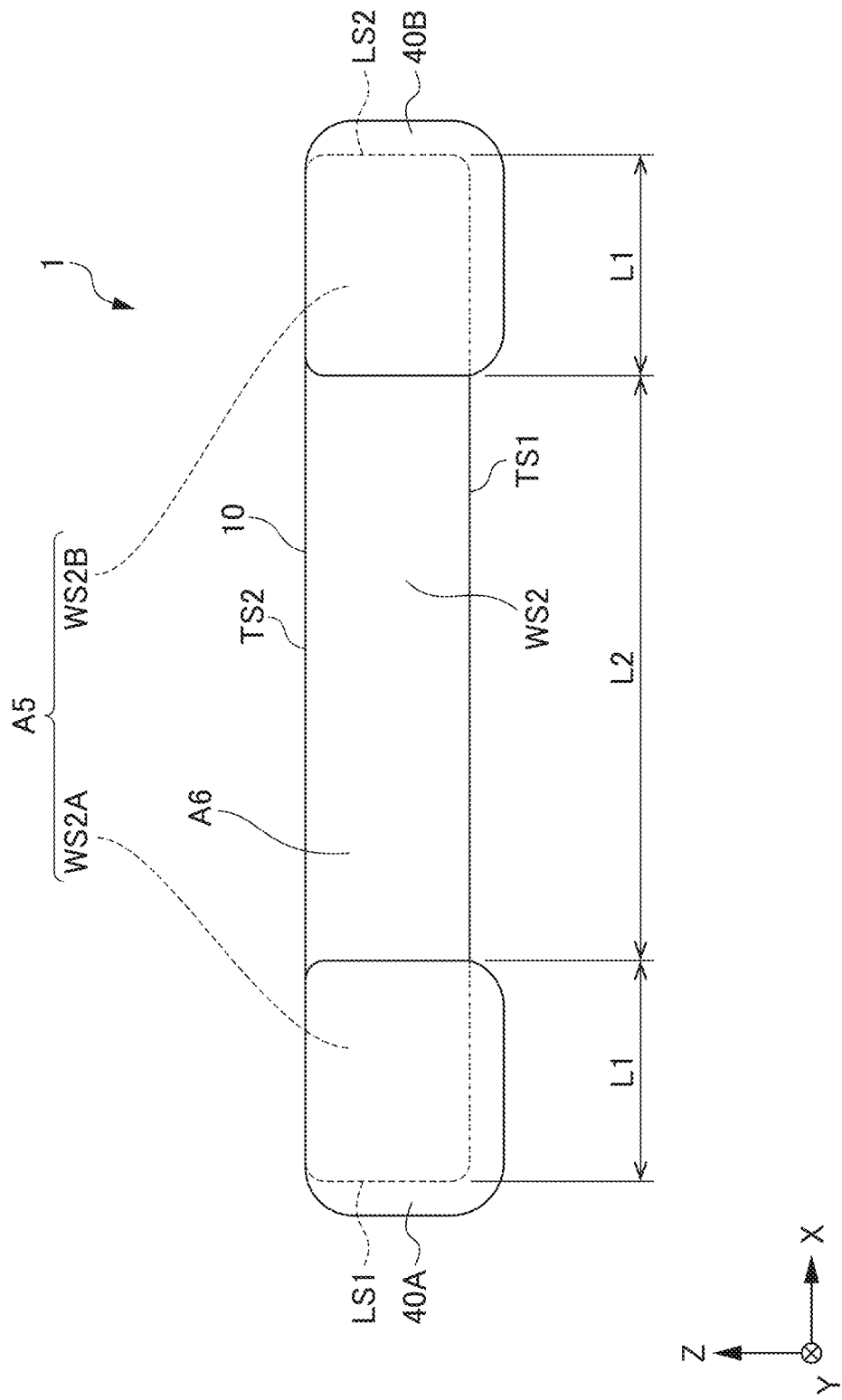

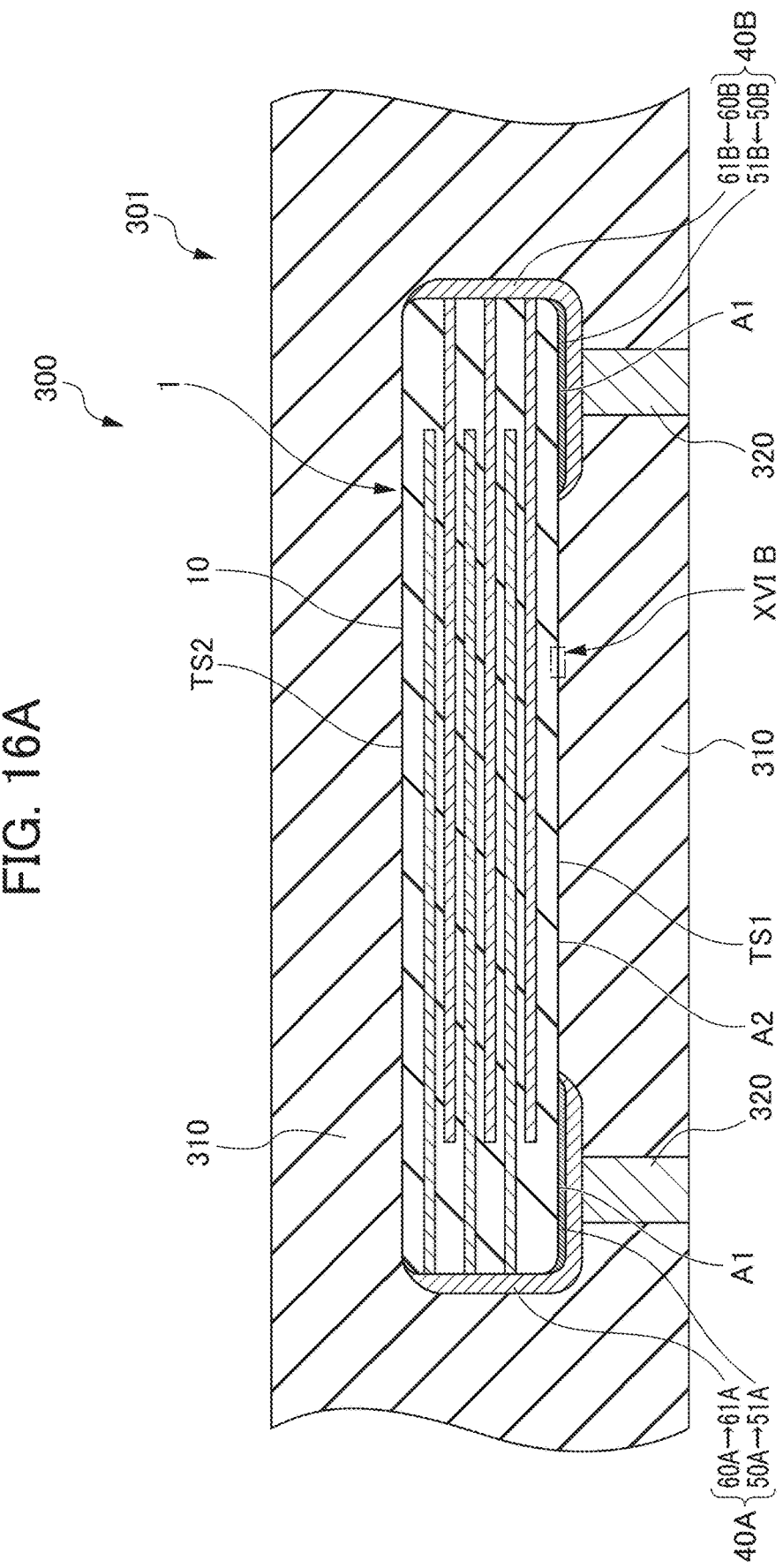

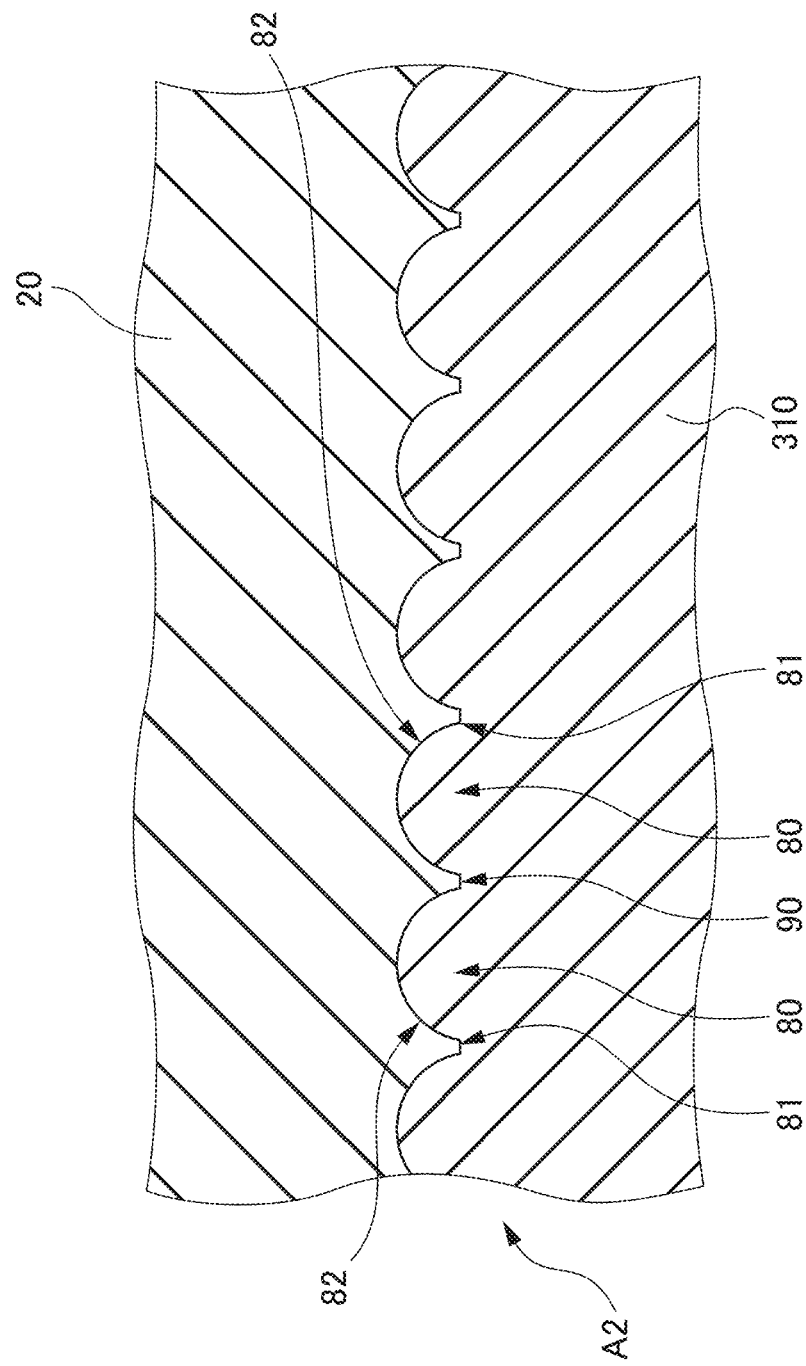

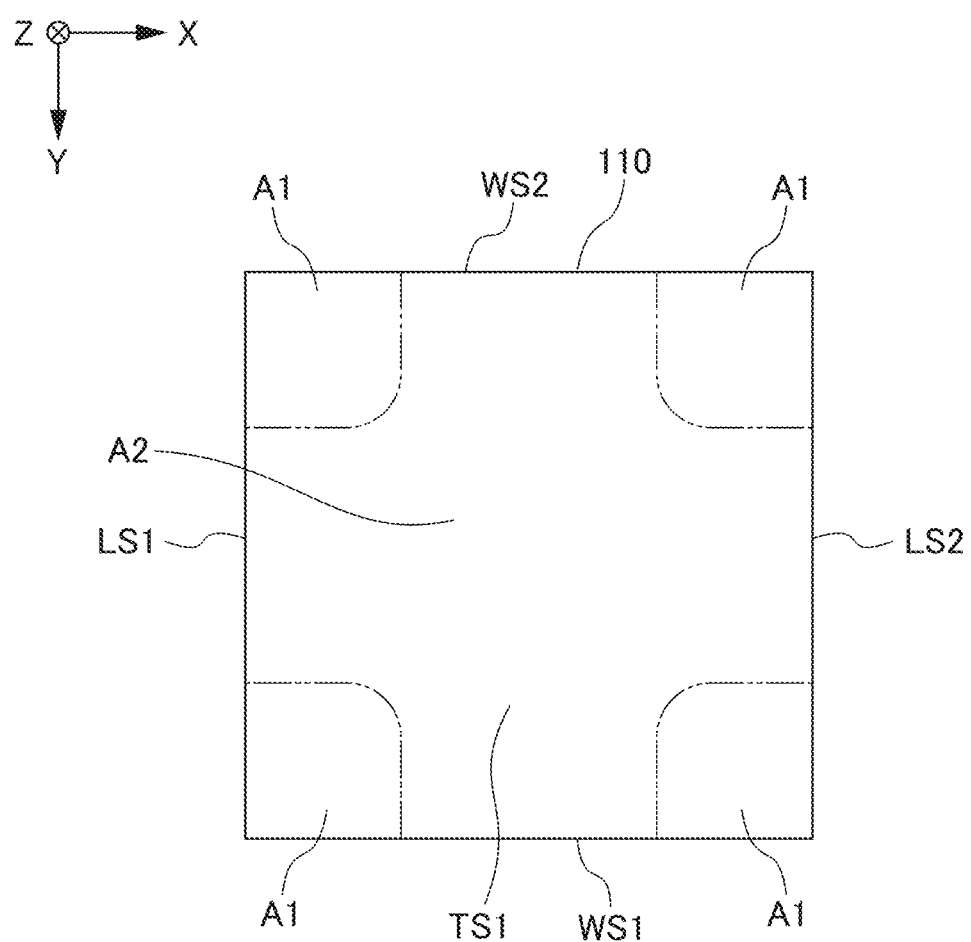

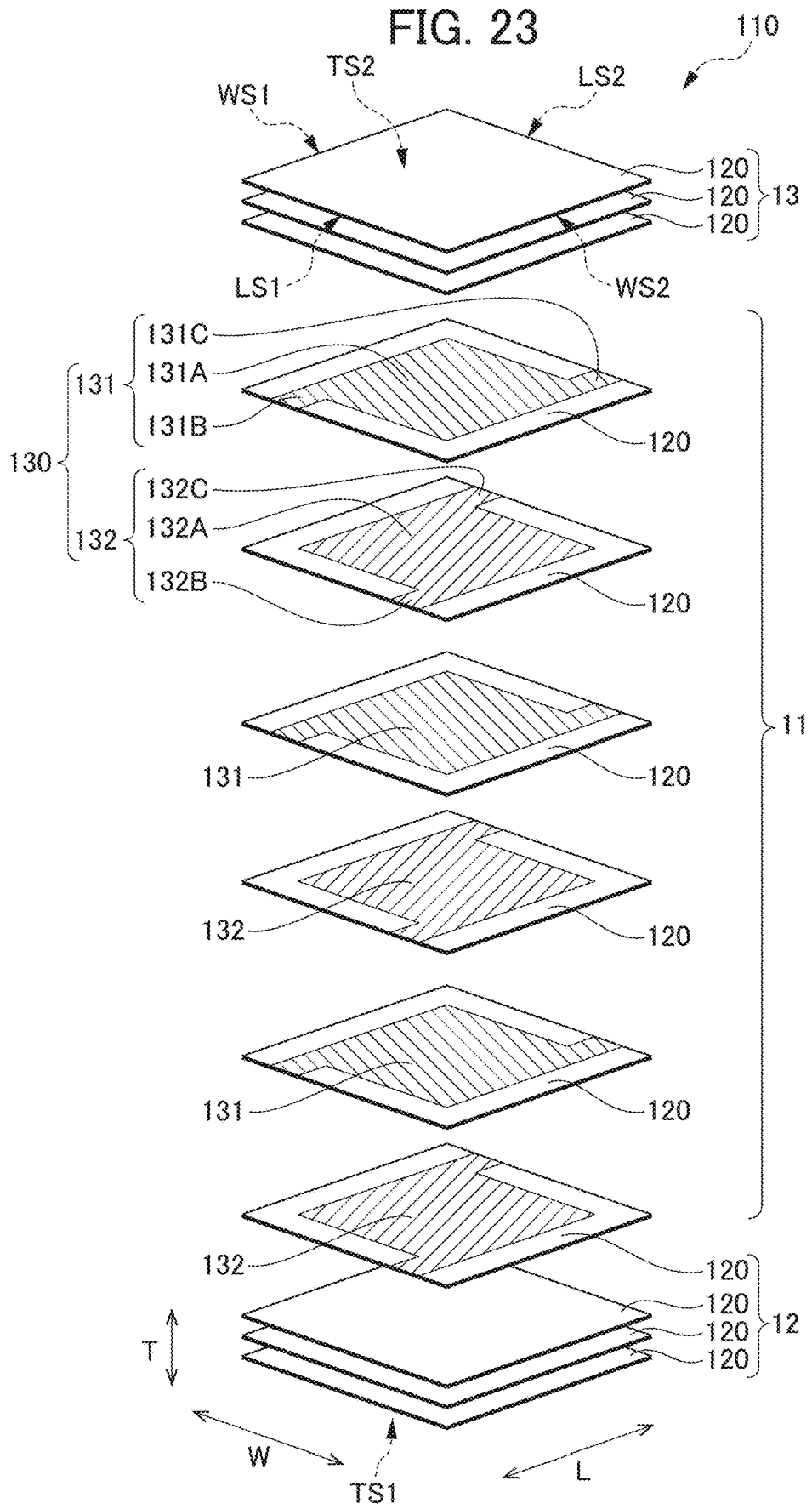

MULTILAYER CERAMIC CAPACITOR

CROSS REFERENCE TO RELATED APPLICATIONS

This application is based on and claims the benefit of priority from Japanese Patent Application No. 2021-042346, filed on Mar. 16, 2021, the contents of which are incorporated herein by reference.

BACKGROUND OF THE INVENTION

1. Field of the Invention

The present invention relates to a multilayer ceramic capacitor.

2. Description of the Related Art

Conventionally, multilayer ceramic capacitors are used in electronic equipment such as mobile phones and portable music players. Such multilayer ceramic capacitors each generally include a ceramic base body as a multilayer body including internal electrode layers, each having an end portion exposed on the surface, and external electrodes, each provided to cover the portion where the internal electrode layers of the ceramic base body are exposed. Examples of the external electrodes include a sintered metal film formed by applying and firing a conductive paste as described in Japanese Unexamined Patent Application Publication No. 2002-203737, and a plating film formed as described in Japanese Unexamined Patent Application Publication No. 2004-327983.

However, in multilayer ceramic capacitors such as those described in Japanese Unexamined Patent Application Publication No. 2002-203737 and Japanese Unexamined Patent Application Publication No. 2004-327983, when the adhesion force between the ceramic base body and the external electrode is weak, moisture or the like is likely to penetrate from the interface between the ceramic base body and the external electrode, leading to a problem in that the moisture resistance of the multilayer ceramic capacitor may be reduced.

SUMMARY OF THE INVENTION

Preferred embodiments of the present invention provide multilayer ceramic capacitors that are each able to reduce or prevent a decrease in moisture resistance.

A multilayer ceramic capacitor according to a preferred embodiment of the present disclosure includes a multilayer body including a plurality of laminated dielectric layers and a plurality of laminated internal electrode layers, the multilayer body further including a first main surface and a second main surface which oppose each other in a lamination direction, a first side surface and a second side surface which oppose each other in a length direction perpendicular or substantially perpendicular to the lamination direction, and a third side surface and a fourth side surface which oppose each other in a width direction perpendicular or substantially perpendicular to the lamination direction and the length direction, and a plurality of external electrodes on a portion of a side surface portion including the four side surfaces, and on a portion of the first main surface, the first main surface further including a plurality of first regions covered with the plurality of external electrodes and a second region exposed from the plurality of external electrodes, the plurality of first regions of the first main surface each including a plurality of recesses therein, the plurality of recesses in each of the plurality of first regions each including a spherical curved wall surface, and the plurality of recesses in each of the plurality of first regions each having an average inlet size of about 0.3 μm or more and about 10.5 μm or less.

According to preferred embodiments of the present invention, it is possible to provide multilayer ceramic capacitors that are each able to reduce or prevent a decrease in moisture resistance.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8A is an enlarged view schematically showing a microscopic state in a plan view of the surface of a first region of the multilayer body.

FIG. 8B is an enlarged cross-sectional view schematically showing a cross-section in the vicinity of a surface layer portion of the multilayer body along the line VIIIB-VIIIB of the surface in FIG. 8A.

FIG. 9A is a diagram of another preferred embodiment of the present invention of a plurality of recesses provided on the surface of the first region of the multilayer body, and corresponding to FIG. 8A.

FIG. 9B is a diagram of another preferred embodiment of the present invention of a plurality of recesses provided on the surface of the first region of the multilayer body, and corresponding to FIG. 8B.

FIG. 10A is a diagram of another preferred embodiment of the present invention of a plurality of recesses provided on the surface of the first region of the multilayer body, and corresponding to FIG. 8A.

FIG. 10B is a diagram of another preferred embodiment of the present invention of a plurality of recesses provided on the surface of the first region of the multilayer body, and corresponding to FIG. 8B.

FIG. 11A is a cross-sectional view of a first modified example of a multilayer ceramic capacitor according to a preferred embodiment of the present invention, and corresponding to FIG. 4.

FIG. 13A is a diagram of a fourth modified example of the multilayer ceramic capacitor according to a preferred embodiment of the present invention, and corresponding to FIG. 2.

FIG. 13B is an arrow view when viewing a second main surface of the multilayer ceramic capacitor shown in FIG. 13A along the direction of the arrow XIIIB.

FIG. 14A is a diagram of a fifth modified example of the multilayer ceramic capacitor according to a preferred embodiment of the present invention, and corresponding to FIG. 2.

FIG. 15 is a diagram of a sixth modified example of the multilayer ceramic capacitor according to a preferred embodiment of the present invention, and corresponding to FIG. 2.

FIG. 16A is a diagram of a second preferred embodiment of the present invention, and shows a state in which a multilayer ceramic capacitor is embedded in a component built-in board.

FIG. 16B is an enlarged view of an XVIB portion in FIG. 16A, and is an enlarged cross-sectional view schematically showing a microscopic cross-sectional shape in the vicinity of a surface layer portion of a second region of a multilayer body.

FIG. 20B is an arrow view when viewing the first main surface of the multilayer body shown in FIG. 19 along the direction of the arrow XXB.

FIG. 23 is an exploded perspective view of a multilayer body included in the multilayer ceramic capacitor of the second modified example of a preferred embodiment of the present invention, and corresponding to FIG. 18.

DETAILED DESCRIPTION OF THE PREFERRED EMBODIMENTS

Preferred embodiments of the present invention will be described below with reference to the drawings.

First Preferred Embodiment

Figure 1:
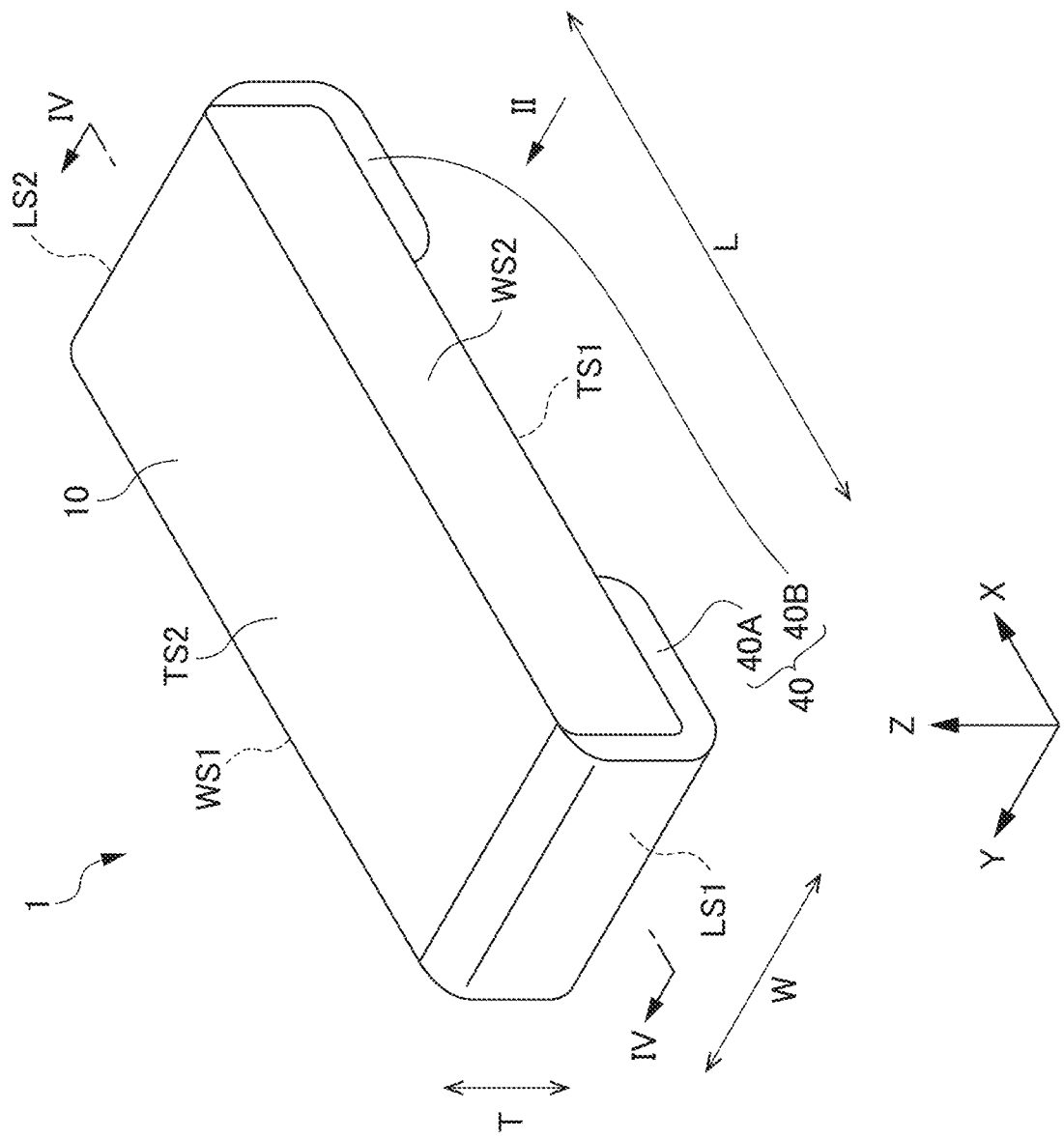
FIG. 1 is an external perspective view of a multilayer ceramic capacitor according to a preferred embodiment of the present invention.
Figure 2:
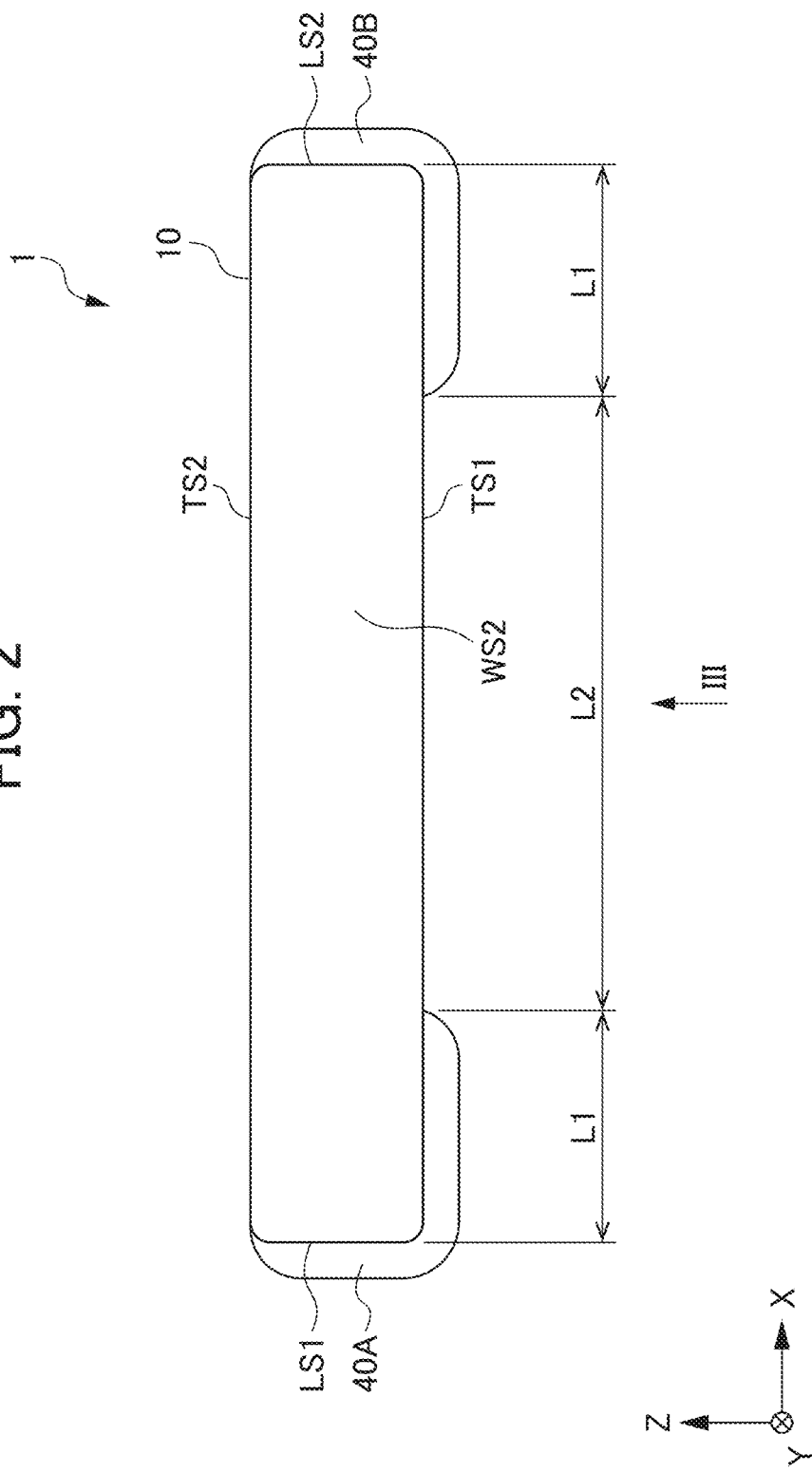
FIG. 2 is an arrow view when viewing a second side surface of the multilayer ceramic capacitor shown in FIG. 1 along the direction of the arrow II.
Figure 3:
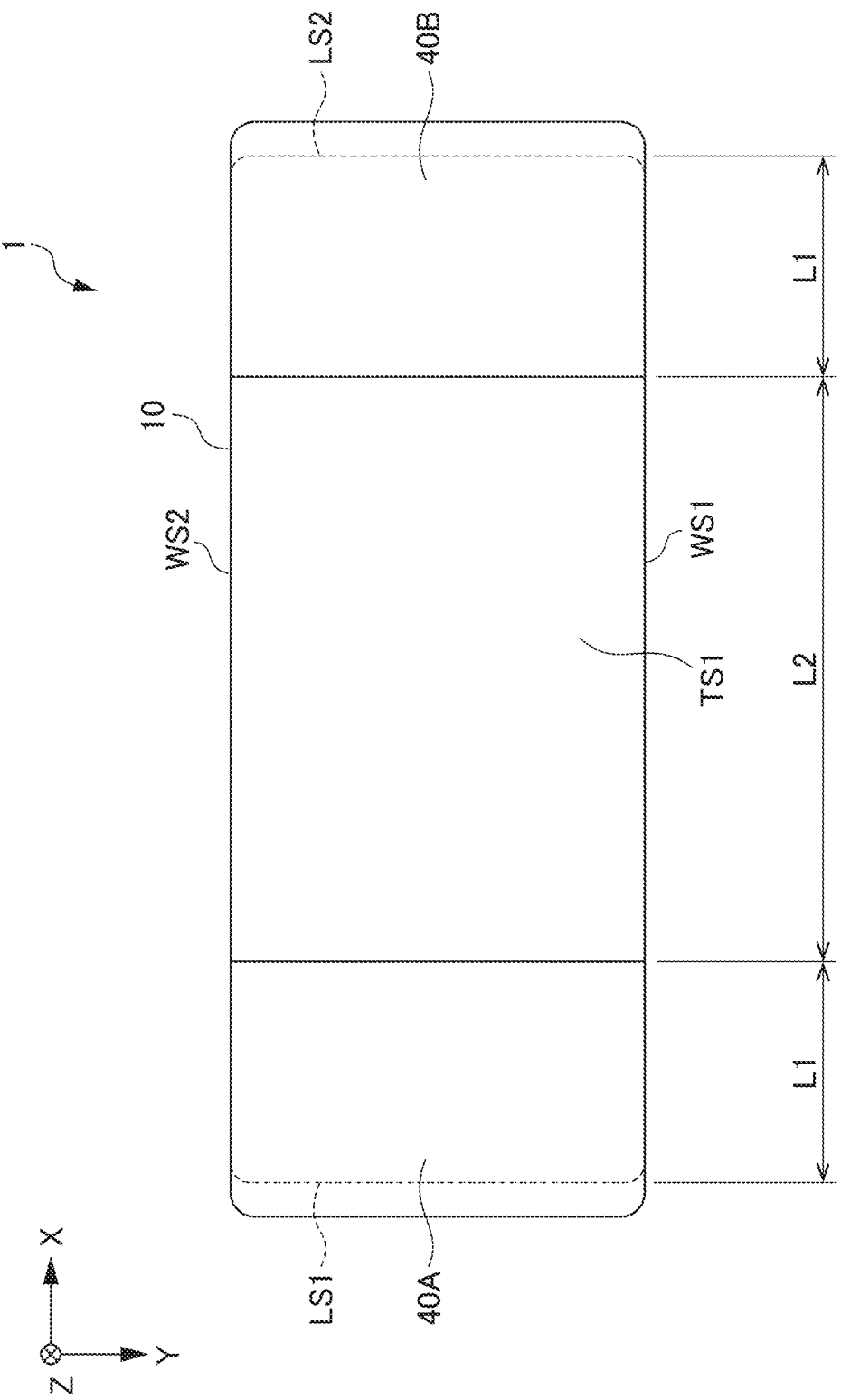
FIG. 3 is an arrow view when viewing a first main surface of the multilayer ceramic capacitor shown in FIG. 2 along the direction of the arrow III.
Figure 4:
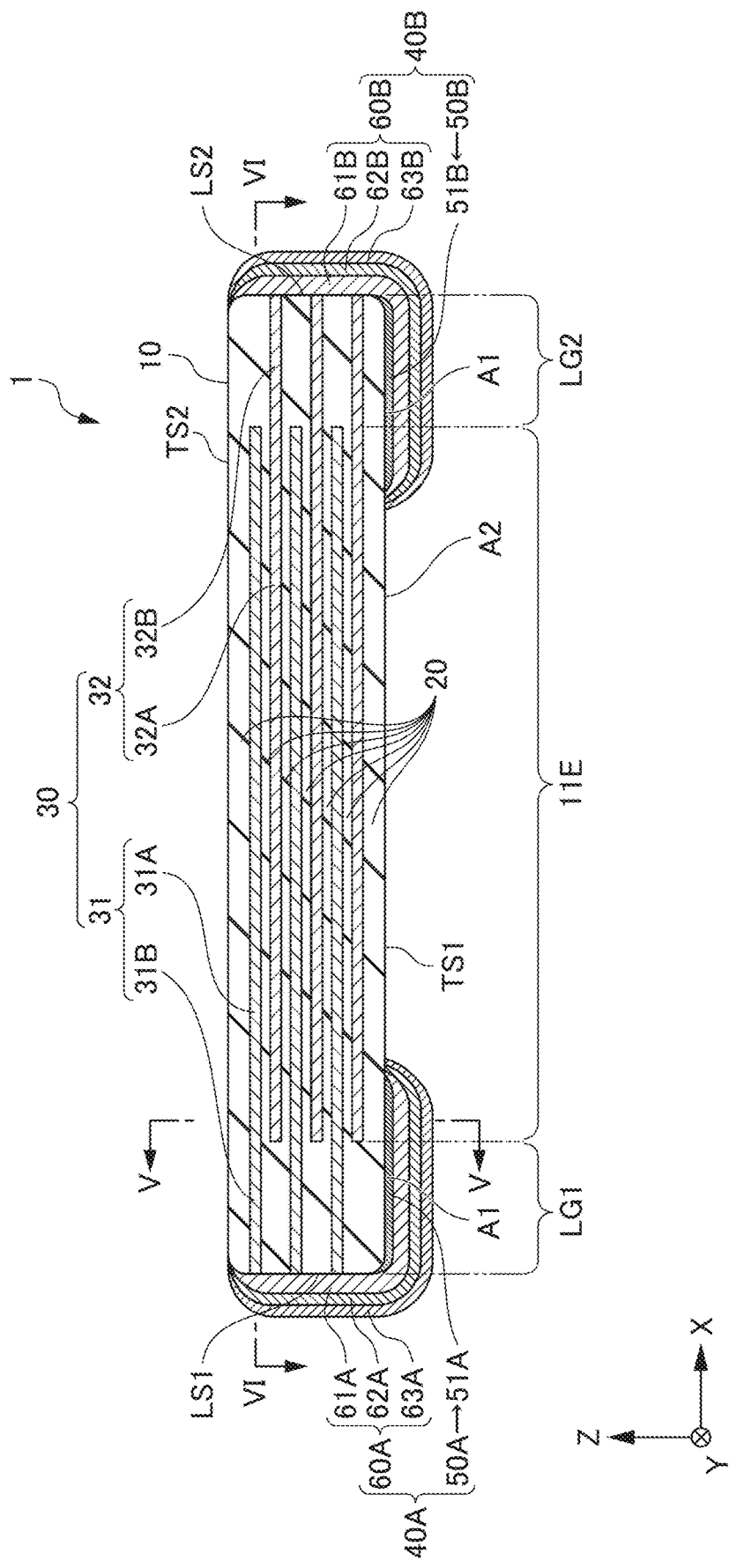
FIG. 4 is a cross-sectional view taken along the line IV-IV of the multilayer ceramic capacitor shown in FIG. 1.
Figure 5:
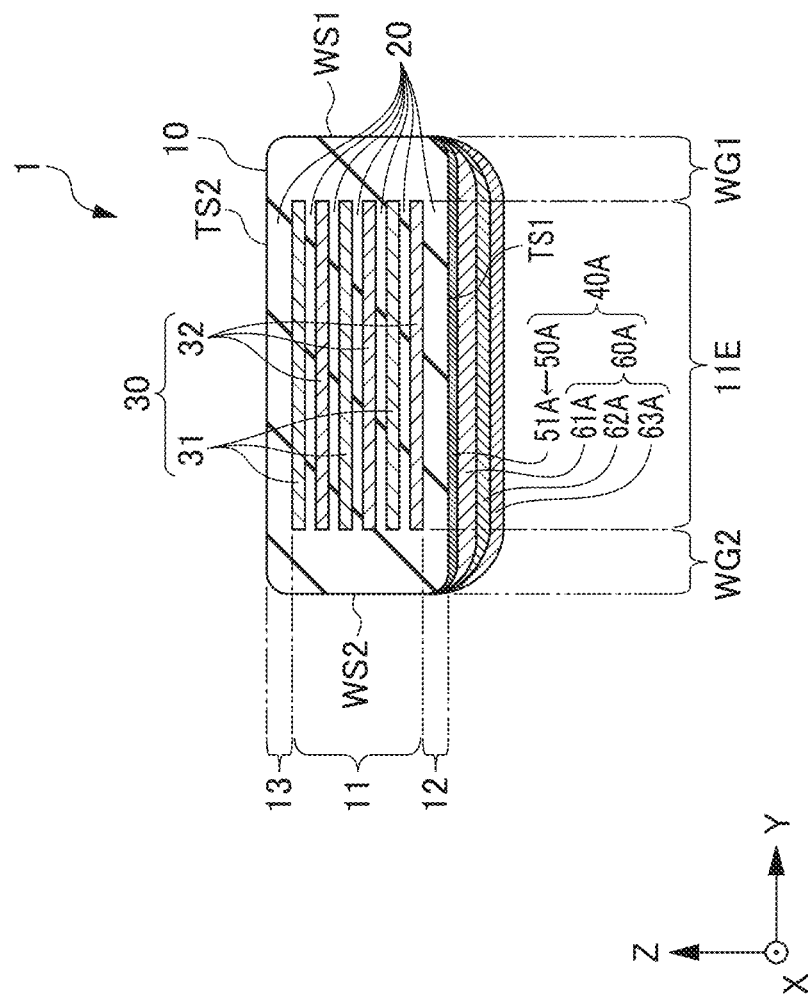
FIG. 5 is a cross-sectional view taken along the line V V of the multilayer ceramic capacitor shown in FIG. 4.
Figure 6:
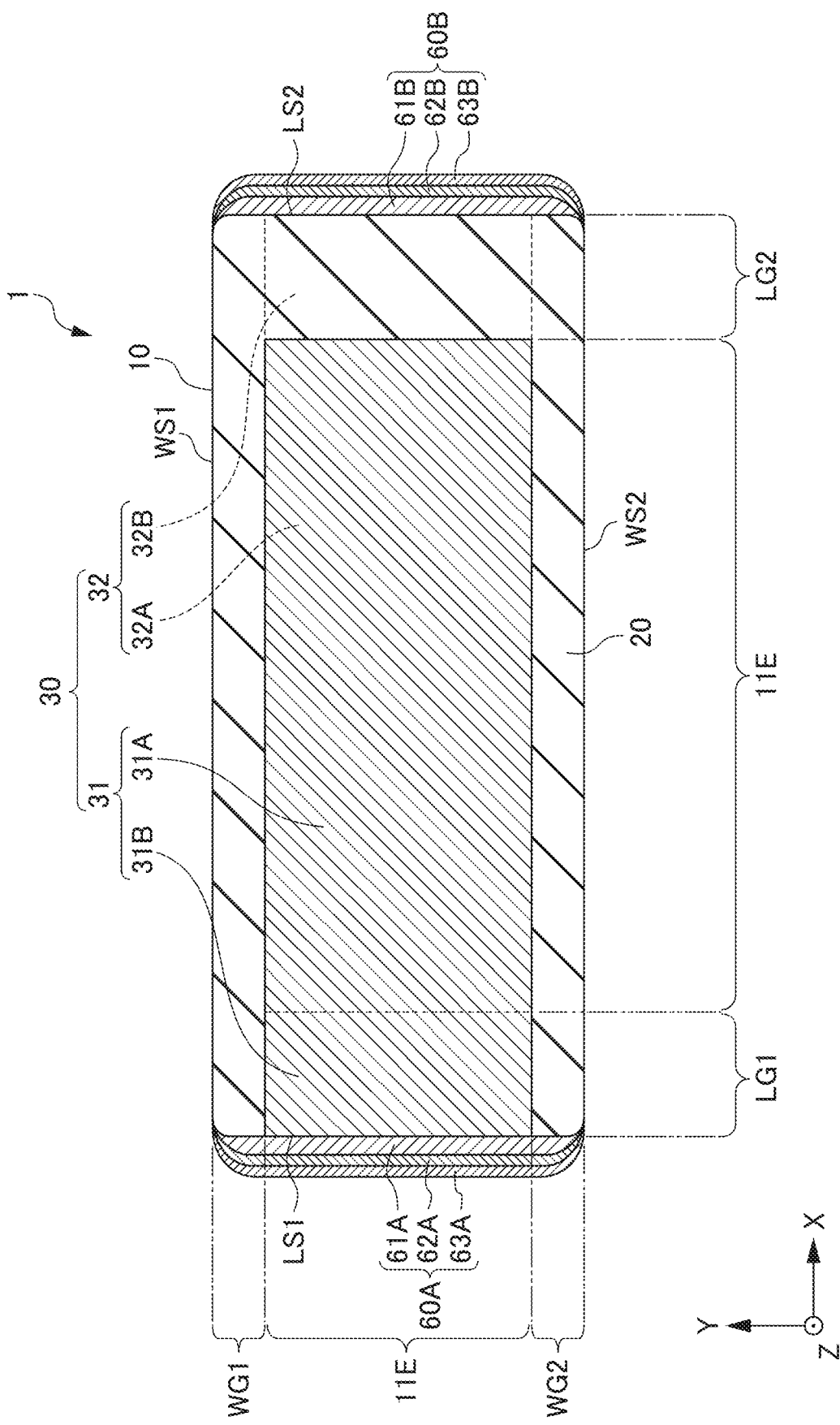
FIG. 6 is a cross-sectional view taken along the line VI-VI of the multilayer ceramic capacitor shown in FIG. 4.

Hereinafter, a multilayer ceramic capacitor 1 according to a first preferred embodiment of the present disclosure will be described. FIG. 1 is an external perspective view of the multilayer ceramic capacitor 1 according to the first preferred embodiment. FIG. 2 is an arrow view when viewing a fourth side surface WS2 of the multilayer ceramic capacitor 1 shown in FIG. 1 along the direction of the arrow II. FIG. 3 is an arrow view when viewing a first main surface TS1 of the multilayer ceramic capacitor 1 shown in FIG. 2 along the direction of the arrow III. FIG. 4 is a cross-sectional view taken along the line IV-IV of the multilayer ceramic capacitor 1 shown in FIG. 1. FIG. 5 is a cross-sectional view taken along the line V-V of the multilayer ceramic capacitor 1 shown in FIG. 4. FIG. 6 is a cross-sectional view taken along the line VI-VI of the multilayer ceramic capacitor 1 shown in FIG. 4.

The multilayer ceramic capacitor 1 includes a multilayer body 10 and external electrodes 40.

The XYZ Cartesian coordinate system is shown in FIGS. 1 to 6. The multilayer ceramic capacitor 1 and the multilayer body 10 each have a length direction L corresponding to the X direction. The multilayer ceramic capacitor 1 and the multilayer body 10 each have a width direction W corresponding to the Y direction. The multilayer ceramic capacitor 1 and the multilayer body 10 each have a lamination (stacking) direction T corresponding to the Z direction. Herein, the cross section shown in FIG. 4 is also referred to as an LT cross section. The cross section shown in FIG. 5 is also referred to as a WT cross section. The cross section shown in FIG. 6 is also referred to as an LW cross section.

As shown in FIGS. 1 to 6, the multilayer body 10 includes a first main surface TS1 and a second main surface TS2 which oppose each other in the lamination direction T, a first side surface LS1 and a second side surface LS2 which oppose each other in the length direction L perpendicular or substantially perpendicular to the lamination direction T, and a third side surface WS1 and a fourth side surface WS2 which oppose each other in the width direction W perpendicular or substantially perpendicular to the lamination direction T and the length direction L.

The multilayer body 10 has a rectangular or substantially rectangular parallelepiped shape. The dimension of the multilayer body 10 in the length direction L is not necessarily longer than the dimension of the width direction W. The multilayer body 10 preferably includes rounded corners and ridges. The corners are portions where the three surfaces of the multilayer body intersect, and the ridges are portions where the two surfaces of the multilayer body intersect.

The dimensions of the multilayer body 10 are not particularly limited, but when the dimension in the length direction L of the multilayer body 10 is defined as the L dimension, the L dimension is preferably about 0.01 mm or more and about 10 mm or less, for example. Furthermore, when the dimension in the width direction W of the multilayer body 10 is defined as a W dimension, the W dimension is preferably about 0.01 mm or more and about 10 mm or less, for example. When the dimension in the lamination direction T of the multilayer body 10 is a T dimension, the T dimension is preferably about 0.01 mm or more and about 0.2 mm or less, for example.

The multilayer body 10 includes an inner layer portion 11, and a first main surface-side outer layer portion 12 and a second main surface-side outer layer portion 13 which sandwich the inner layer portion 11 in the lamination direction T.

The inner layer portion 11 includes a plurality of dielectric layers 20 and a plurality of internal electrode layers 30. The inner layer portion 11 includes, in the lamination direction T, internal electrode layers 30 from the internal electrode layer 30 located closest to the first main surface TS1 to the internal electrode layer 30 located closest to the second main surface TS2. In the inner layer portion 11, a plurality of internal electrode layers 30 oppose each other to each other with the dielectric layer 20 interposed therebetween. The inner layer portion 11 generates a capacitance and substantially functions as a capacitor. The inner layer portion 11 is also referred to as an effective layer portion.

The plurality of dielectric layers 20 are each made of a dielectric material. The dielectric material may be, for example, a dielectric ceramic including components such as a $BaTiO_3$, $CaTiO_3$, $SrTiO_3$, or $CaZrO_3$. Furthermore, the dielectric material may be obtained by adding a sub-component such as, for example, a Mn compound, an Fe compound, a Cr compound, a Co compound, or a Ni compound to the main component.

The average particle size of the ceramic particles used in the dielectric layer 20 is preferably, for example, about 0.1 μm or more and about 1 μm or less, and more preferably about 0.1 μm or more and about 0.5 μm or less. Thus, it is possible to reduce the thickness of the dielectric layer 20 of the multilayer ceramic capacitor 1, and thus it is possible to obtain the multilayer ceramic capacitor 1 with a large capacitance density per volume.

The thickness of the dielectric layer 20 is preferably about 0.2 μm or more and about 10 μm or less, for example. The number of the dielectric layers 20 to be laminated (stacked) is preferably 4 or more and 700 or less, for example. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 each include a plurality of first internal electrode layers 31 and a plurality of second internal electrode layers 32. The plurality of first internal electrode layers 31 are each provided on the dielectric layer 20. The plurality of second internal electrode layers 32 are each provided on the second dielectric layer 20. The plurality of first internal electrode layers 31 and the plurality of second internal electrode layers 32 are alternately provided via the dielectric layer 20 in the lamination direction T of the multilayer body 10. The first internal electrode layers 31 and the second internal electrode layers 32 each sandwich the dielectric layers 20.

The first internal electrode layer 31 includes a first opposing portion 31A facing the second internal electrode layer 32, and a first lead-out portion 31B extending from the first opposing portion 31A toward the first side surface LS1. The first lead-out portion 31B is exposed on the first side surface LS1.

The second internal electrode layer 32 includes a second opposing portion 32A facing the first internal electrode layer 31, and a second lead-out portion 32B extending from the second opposing portion 32A toward the second side surface LS2. The second lead-out portion 32B is exposed on the second side surface LS2.

In the present preferred embodiment, the first opposing portion 31A and the second opposing portion 32A are opposed to each other with the dielectric layers 20 interposed therebetween, such that a capacitance is generated, and the characteristics of a capacitor are provided.

The shapes of the first opposing portion 31A and the second opposing portion 32A are not particularly limited. However, they are preferably rectangular or substantially rectangular. However, the corners of the rectangular or substantially rectangular shape may be rounded, or the corners of the rectangular or substantially rectangular shape may be slanted. The shapes of the first lead-out portion 31B and the second lead-out portion 32B are not particularly limited. However, they are preferably rectangular or substantially rectangular. However, the corners of the rectangular or substantially rectangular shape may be rounded, or the corners of the rectangular or substantially rectangular shape may be slanted.

The dimension in the width direction W of the first opposing portion 31A may be the same or substantially the same as the dimension in the width direction W of the first lead-out portion 31B, or either of them may be smaller. The dimension in the width direction W of the second opposing portion 32A may be the same or substantially the same as the dimension in the width direction W of the second lead-out portion 32B, or either of them may be smaller.

The first internal electrode layer 31 and the second internal electrode layer 32 are each made of an appropriate conductive material including a metal such as, for example, Ni, Cu, Ag, Pd, and Au, and an alloy including at least one of these metals. When using an alloy, the first internal electrode layer 31 and the second internal electrode layer 32 may be made of, for example, a Ag—Pd alloy or the like.

The thickness of each of the first internal electrode layers 31 and the second internal electrode layers 32 is preferably, for example, about 0.2 μm or more and about 2.0 μm or less. The total number of the first internal electrode layers 31 and the second internal electrode layers 32 is preferably, for example, 4 or more and 200 or less.

The first main surface-side outer layer portion 12 is located in the vicinity of the first main surface TS1 of the multilayer body 10. The first main surface-side outer layer portion 12 includes a plurality of dielectric layers 20 located between the first main surface TS1 and the internal electrode layer 30 closest to the first main surface TS1. The dielectric layers 20 used in the first main surface-side outer layer portion 12 may be the same as the dielectric layers 20 used in the inner layer portion 11.

The second main surface-side outer layer portion 13 is located in the vicinity of the second main surface TS2 of the multilayer body 10. The second main surface-side outer layer portion 13 includes a plurality of dielectric layers 20 located between the second main surface TS2 and the internal electrode layer 30 closest to the second main surface TS2. The dielectric layers 20 used in the second main surface-side outer layer portion 13 may be the same as the dielectric layers 20 used in the inner layer portion 11.

The multilayer body 10 includes a counter electrode portion 11E. The counter electrode portion 11E refers to a portion where the first opposing portion 31A of the first internal electrode layer 31 and the second opposing portion 32A of the second internal electrode layer 32 oppose each other. The counter electrode portion 11E defines and functions as a portion of the inner layer portion 11. FIG. 6 shows the range of the counter electrode portion 11E in the width direction W and in the length direction L. The counter electrode portion 11E is also referred to as a capacitor active portion.

The multilayer body 10 includes side surface-side outer layer portions WG. The side surface-side outer layer portions include a first side surface-side outer layer portion LG1 and a second side surface-side outer layer portion LG2. The first side surface-side outer layer portion LG1 includes the dielectric layer 20 and the first lead-out portion 31B located between the counter electrode portion 11E and the first side surface LS1. The second side surface-side outer layer portion LG2 includes the dielectric layer 20 and the second lead-out portion 32B located between the counter electrode portion 11E and the second side surface LS2. FIGS. 4 and 6 each show the ranges in the length direction L of the first side surface-side outer layer portion LG1 and the second side surface-side outer layer portion LG2. The first side surface-side outer layer portion and the second side surface-side outer layer portion may also be referred to as end surface-side outer layer portions, L gaps, or end gaps.

Furthermore, the side surface-side outer layer portion includes a third side surface-side outer layer portion WG1 and a fourth side surface-side outer layer portion WG2. The third side surface-side outer layer portion WG1 includes a dielectric layer 20 located between the counter electrode portion 11E and the third side surface WS1. The fourth side surface-side outer layer portion WG2 includes the dielectric layers 20 located between the counter electrode portion 11E and the fourth side surface WS2. FIGS. 5 and 6 each show the ranges of the third side surface-side outer layer portion WG1 and the fourth side surface-side outer layer portion WG2 in the width direction W. The third side surface-side outer layer portion and the fourth side surface-side outer layer portion may also be referred to as W gaps or side gaps.

The external electrode 40 includes a plurality of external electrodes, each provided on a portion of the side surface including the four side surfaces LS1, LS2, WS1, and WS2, and a portion of the first main surface TS1. In the present preferred embodiment, the external electrode 40 includes a first external electrode 40A provided in the vicinity of the first side surface LS1, and a second external electrode 40B provided in the vicinity of the second side surface LS2.

The first external electrode 40A is provided at least on a portion of the first side surface LS1 and a portion of the first main surface TS1. In the present preferred embodiment, more specifically, the first external electrode 40A extends from the first side surface LS1 to a portion of the first main surface TS1. That is, as shown in the LT cross-section of FIG. 4, the cross-sectional shape of the first external electrode 40A of the present preferred embodiment is L-shaped. The first external electrode 40A is connected to the first internal electrode layer 31.

The second external electrode 40B is provided at least on a portion of the second side surface LS2 and on a portion of the first main surface TS1. In the present preferred embodiment, more specifically, the second external electrode 40B extends from the second side surface LS2 as a portion of the side surface portion to a portion of the first main surface TS1. That is, as shown in the LT cross-section of FIG. 4, the cross-sectional shape of the second external electrode 40B of the present preferred embodiment is L-shaped. The second external electrode 40B is connected to the second internal electrode layers 32.

As described above, in the multilayer body 10, the capacitance is generated by the first opposing portions 31A of the first internal electrode layers 31 and the second opposing portions 32A of the second internal electrode layers 32 opposing each other with the dielectric layers 20 interposed therebetween. Therefore, characteristics of the capacitor are developed between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The first base electrode layer 50A and the second base electrode layer 50B each include, for example, at least one selected from a fired layer, a thin film layer, and other layers.

In the present preferred embodiment, the first base electrode layer 50A and the second base electrode layer 50B are thin film layers. The thin film layer is a layer on which metal particles are deposited.

When the first base electrode layer 50A and the second base electrode layer 50B are each made of a thin film layer, they are preferably produced by a thin film forming method such as a sputtering method or an evaporation method, for example. Herein, a sputtering electrode formed by a sputtering method will be described.

The first base electrode layer 50A of the present preferred embodiment is defined by the first thin film layer 51A including the sputtering electrode. The second base electrode layer 50B is defined by a second thin film layer 51B including the sputtering electrode. When forming the base electrode layer with a sputtering electrode, it is preferable to form a sputtering electrode directly on at least one portion of either the first main surface TS1 or the second main surface TS2 of the multilayer body 10. In the present preferred embodiment, the first thin film layer 51A including the sputtering electrode is provided on a portion of the first main surface TS1 in the vicinity of the first side surface LS1. The second thin film layer 51B including the sputtering electrode is provided on a portion on the first main surface TS1 in the vicinity of the second side surface LS2.

The thin film layer including the sputtering electrode preferably includes at least one metal selected from the group consisting of, for example, Mg, Al, Ti, W, Cr, Cu, Ni, Ag, Co, Mo and V. Thus, it is possible to increase the adhesion of the external electrode 40 to the multilayer body 10. The thin film layer may be a single layer or may include a plurality of layers. For example, the thin film layer may include a two-layer structure including a layer of Ni—Cr alloy and a layer of Ni—Cu alloy.

The thickness of the sputtering electrode in the lamination direction connecting the first main surface TS1 and the second main surface TS2 is preferably about 50 nm or more and about 400 nm or less, and more preferably about 50 nm or more and about 130 nm or less.

When providing the base electrode layer by directly forming a sputtering electrode on at least one of the first main surface TS1 and the second main surface TS2 of the multilayer body 10, it is preferable to provide a base electrode layer defining and functioning as a fired layer on the first side surface LS1 and the second side surface LS2, or alternatively it is preferable to directly provide a plated layer to be described later without providing the base electrode layer. In the present preferred embodiment, a plated layer to be described later is directly provided on the first side surface LS1 and the second side surface LS2 without providing a base electrode layer.

As described later in the first and second modified example of a preferred embodiment of the present invention, the first base electrode layer 50A and the second base electrode layer 50B may be fired layers, for example. It is preferable that the fired layer includes a metal component, and either a glass component or a ceramic component, or a metal component and both of the glass component and the ceramic component. The metal component includes, for example, at least one selected from Cu, Ni, Ag, Pd, Ag—Pd alloys, Au, and the like. The glass component includes, for example, at least one selected from B, Si, Ba, Mg, Al, Li, and the like. For the ceramic component, a ceramic material of the same kind as that of the dielectric layer 20 may be used, or a ceramic material of a different kind may be used. The ceramic component includes, for example, at least one selected from $BaTiO_3$, $CaTiO_3$, $(Ba, Ca) TiO_3$, $SrTiO_3$, $CaZrO_3$, and the like.

The fired layer is, for example, a fired conductive paste including glass and metal applied to the multilayer body 10. The fired layer may be a laminate chip including internal electrode layers and dielectric layers and a conductive paste applied to the laminate chip simultaneously fired, or may be a laminate chip having internal electrode layers and dielectric layers fired to obtain the multilayer body 10, following which a conductive paste may be applied to the multilayer body 10 and fired. In a case of simultaneously firing the laminate chip including the internal electrode layers and dielectric layers, and a conductive paste applied to the laminate chip, it is preferable that the fired layer be formed by firing a material to which a ceramic material, instead of glass component, is added. In this case, it is particularly preferable to use, as the ceramic material to be added, the same type of ceramic material as the dielectric layer 20. Furthermore, the fired layer may include a plurality of layers.

Alternatively, the first plated layer 60A and the second plated layer 60B described later may be directly provided on the multilayer body 10 without providing the first base electrode layer 50A and the second base electrode layer 50B.

The first plated layer 60A covers the first base electrode layer 50A.

The second plated layer 60B covers the second base electrode layer 50B.

The first plated layer 60A and the second plated layer 60B may include at least one selected from, for example, Cu, Ni, Sn, Ag, Pd, Ag—Pd alloys, Au, or the like. Each of the first plated layer 60A and the second plated layer 60B may include a plurality of layers.

When the multilayer ceramic capacitor 1 is mounted on the board surface, the first plated layer 60A and the second plated layer 60B are preferably a two-layer structure including a Sn plated layer on a Ni plated layer. In this case, the Ni plated layer prevents the first base electrode layer 50A and the second base electrode layer 50B from being eroded by solder when mounting the multilayer ceramic capacitor 1. Furthermore, the Sn plated layer improves the wettability of the solder when mounting the multilayer ceramic capacitor 1. This facilitates the mounting of the multilayer ceramic capacitor 1.

A Cu plated layer may be provided between the base electrode layer and the Ni plated layer. Furthermore, when directly providing the plated layer on the multilayer body 10 without providing the base electrode layer, the Cu plated layer may be provided between the Ni plated layer and the multilayer body. In a case of providing the Cu plated layer, it is possible to achieve an advantageous effect of reducing or preventing the penetration of a plating solution or moisture.

The plated layer of the present preferred embodiment includes a three-layer structure including a Cu plated layer defining and functioning as a lower plated layer, a Ni plated layer defining and functioning as an intermediate plated layer, and a Sn plated layer defining and functioning as an upper plated layer. That is, the first plated layer 60A includes a first Cu plated layer 61A, a first Ni plated layer 62A, and a first Sn plated layer 63A. The second plated layer 60B includes a second Cu plated layer 61B, a second Ni plated layer 62B, and a second Sn plated layer 63B.

The first Cu plated layer 61A covers the first side surface LS1 of the multilayer body 10 and the first base electrode layer 50A provided on the first main surface TS1 of the multilayer body 10. The first Ni plated layer 62A covers the first Cu plated layer 61A. The first Sn plated layer 63A covers the first Ni plated layer 62A.

The second Cu plated layer 61B covers the second side surface LS2 of the multilayer body 10 and the second base electrode layer 50B provided on the first main surface TS1 of the multilayer body 10. The second Ni plated layer 62B covers the second Cu plated layer 61B. The second Sn plated layer 63B covers the second Ni plated layer 62B layer.

In the present preferred embodiment, the first plated layer 60A is directly electrically connected to the first internal electrode layer 31. Furthermore, the second plated layer 60B is directly electrically connected to the second internal electrode layer 32.

By providing a plated layer including a Cu plated layer and Ni plated layer so as to cover the base electrode layer, the base electrode layer is prevented from being eroded by solder at the time of mounting the multilayer ceramic capacitor 1. Furthermore, by providing the Sn plated layer on the surface of the Ni plated layer, the wettability of the solder when mounting the multilayer ceramic capacitor 1 is improved. Thus, it is possible to easily mount the multilayer ceramic capacitor 1.

The thickness per plated layer is preferably about 2 μm or more and about 15 μm or less, for example. That is, the average thickness of each of the first Cu plated layer 61A, the first Ni plated layer 62A, the first Sn plated layer 63A, the second Cu plated layer 61B, the second Ni plated layer 62B, and the second Sn plated layer 63B is preferably about 2 μm or more and about 15 μm or less, for example. More specifically, the average thickness of each of the first Cu plated layer 61A and the second Cu plated layer 61B is more preferably about 5 μm or more and about 8 μm or less, for example. Furthermore, the average thickness of each of the first Ni plated layer 62A, the first Sn plated layer 63A, the second Ni plated layer 62B, and the second Sn plated layer 63B is more preferably about 2 μm or more and about 4 μm or less, for example.

As described in the second preferred embodiment of the present invention below, when embedding the multilayer ceramic capacitor 1 in the board, the plated layer preferably includes the outermost layer made of a Cu plated layer, for example.

The external electrode 40 may include only a plated layer without providing the first base electrode layer 50A and the second base electrode layer 50B. That is, the multilayer ceramic capacitor 1 may include a plated layer that is directly electrically connected to the first internal electrode layer 31 and the second internal electrode layer 32. In such a case, the plated layer may be provided after the catalyst is provided on the surface of the multilayer body 10 as a pretreatment.

When providing the plated layer directly on the multilayer body 10, it is possible to reduce the thickness of the base electrode layer. Therefore, since the dimension of the multilayer ceramic capacitor 1 in the lamination direction T is reduced by the amount of reducing the thickness of the base electrode layer, it is possible to reduce the height of the multilayer ceramic capacitor 1. Alternatively, when the thickness of the dielectric layer 20 sandwiched between the first internal electrode layer 31 and the second internal electrode layer 32 is increased by the amount of reducing the thickness of the base electrode layer, it is possible to improve the thickness of the base body. Thus, by providing the plated layer directly on the multilayer body 10, it is possible to improve the degrees of freedom in design of the multilayer ceramic capacitor.

Here, the basic configurations of each layer included in the first external electrode 40A and the second external electrode 40B are the same or substantially the same. Furthermore, the first external electrode 40A and the second external electrode 40B are plane symmetric or substantially plane symmetric with respect to the WT cross-section at the middle in the length direction L of the multilayer ceramic capacitor 1. Therefore, in a case in which it is not necessary to particularly distinguish between the first external electrode 40A and the second external electrode 40B, the first external electrode 40A and the second external electrode 40B may be collectively referred to as an external electrode 40. The same applies to the respective layers included in the first external electrode 40A and the second external electrode 40B. For example, in a case in which it is not necessary to particularly distinguish between the first base electrode layer 50A and the second base electrode layer 50B, the first base electrode layer 50A and the second base electrode layer 50B may be collectively referred to as a base electrode layer 50. Furthermore, in a case in which it is not necessary to particularly distinguish between the first thin film layer 51A and the second thin film layer 51B, the first thin film layer 51A and the second thin film layer 51B may be collectively referred to as a thin film layer 51. Furthermore, in a case in which it is not necessary to particularly distinguish between the first plated layer 60A and the second plated layer 60B, the first plated layer 60A and the second plated layer 60B may be collectively referred to as a plated layer 60. Furthermore, in a case in which it is not necessary to particularly distinguish between the first Cu plated layer 61A and the second Cu plated layer 61B, the first Cu plated layer 61A and the second Cu plated layer 61B may be referred to collectively as a Cu plated layer 61. Furthermore, in a case in which it is not necessary to particularly distinguish between the first Ni plated layer 62A and the second Ni plated layer 62B, the first Ni plated layer 62A and the second Ni plated layer 62B may be collectively referred to as a Ni plated layer 62. Furthermore, in a case in which it is not necessary to particularly distinguish between the first Sn plated layer 63A and the second Sn plated layer 63B, the first Sn plated layer 63A and the second Sn plated layer 63B may be collectively referred to as a Sn plated layer 63.

Figure 7:
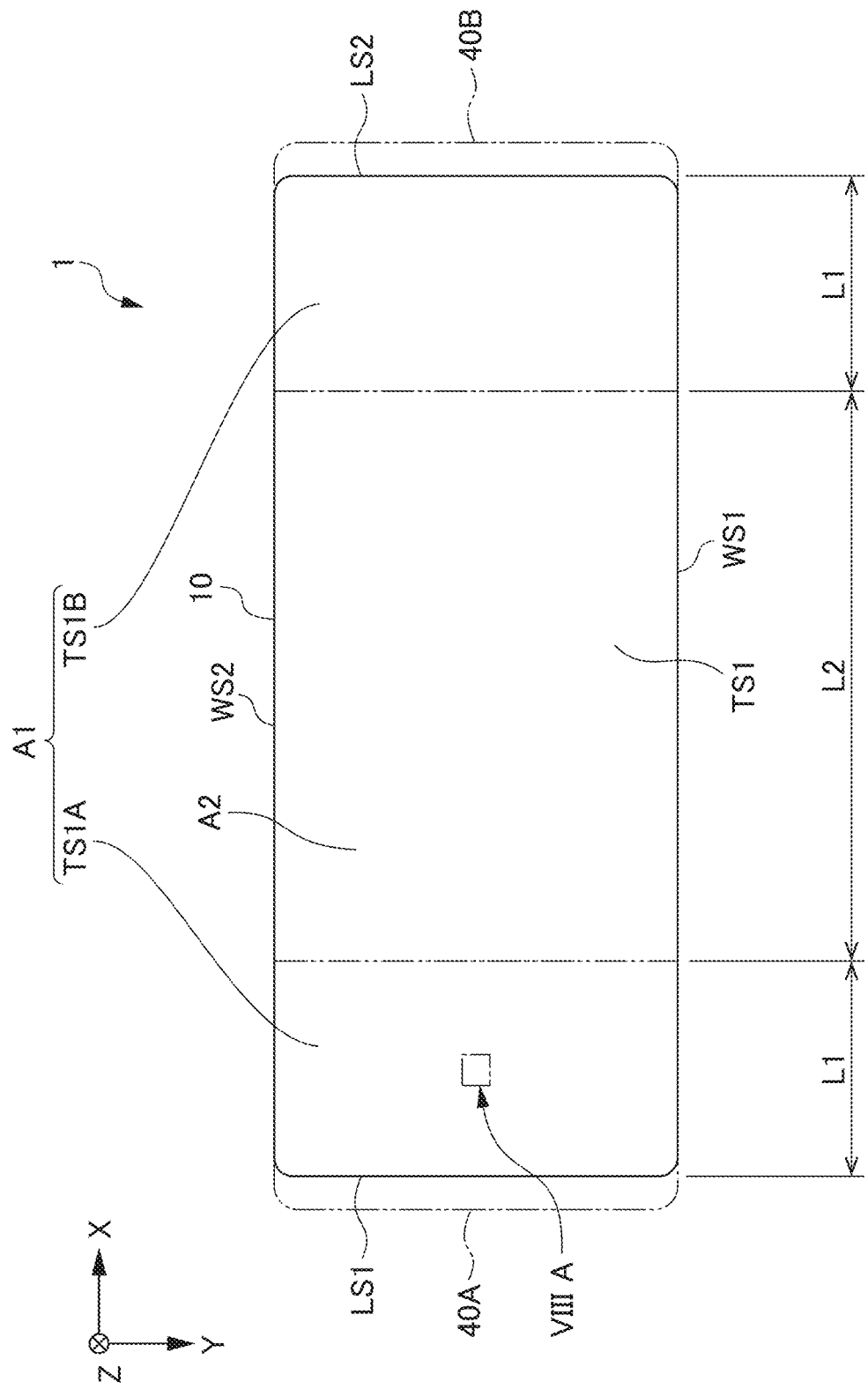
FIG. 7 is a diagram corresponding to FIG. 3, which is an arrow view when viewing a first main surface of the multilayer ceramic capacitor shown in FIG. 2 along the direction of the arrow III, and is a virtual view showing a multilayer body when excluding external electrodes.

FIG. 7 is a diagram corresponding to FIG. 3, which is an arrow view when viewing the first main surface TS1 of the multilayer ceramic capacitor 1 shown in FIG. 2 along the direction of the arrow III, and a virtual view showing the multilayer body 10 when excluding the external electrode 40.

As shown in FIG. 7, the first main surface TS1 of the multilayer body 10 includes a plurality of first regions A1 covered with the first external electrode 40A and the second external electrode 40B defining and functioning as the plurality of external electrodes 40. Furthermore, the first main surface TS1 of the multilayer body 10 includes a second region A2 exposed from the first external electrode 40A and the second external electrode 40B defining and functioning as the plurality of external electrodes 40.

In the present preferred embodiment, the plurality of first regions A1 are divided into a region TS1A covered by the first external electrode 40A and a region TS1B covered by the second external electrode 40B. That is, the plurality of first regions A1 are separated from each other in the length L direction, and include the two regions of the region TS1A located in the vicinity of the first side surface LS1 and the region TS1B located in the vicinity of the second side surface LS2. Furthermore, the second region A2 is provided between the plurality of first regions A1 so as to separate the plurality of first regions A1.

As shown in FIGS. 2 and 3, the first external electrode 40A covers the range from the first side surface LS1 over the distance L1 in the length direction toward the second side surface LS2 on the first main surface TS1 of the multilayer body 10. The second external electrode 40B covers the range from the second side surface LS2 over the distance L1 in the length direction toward the first side surface LS1 on the first main surface TS1 of the multilayer body 10. Furthermore, in the first main surface TS1 of the multilayer body 10, the region between the area covered by the first external electrode 40A and the area covered by the second external electrode 40B is exposed, and the length of the exposed portion in the length direction is defined as the distance L2.

With reference to FIG. 7, the range extending from the first side surface LS1 toward the second side surface LS2 to the distance L1 in the length direction corresponds to the region TS1A, on the first main surface TS1 of the multilayer body 10. Furthermore, the range from the second side surface LS2 toward the first side surface LS1 to the distance L1 in the length direction corresponds to the region TS1B, on the first main surface TS1 of the multilayer body 10.

That is, the distance in the length direction of each of the plurality of first regions A1 corresponds to the distance L1, and the distance in the length direction of the second region A2 corresponds to the distance L2.

FIG. 8A is an enlarged view of a VIIIA portion which is a portion of the surface of the first region A1 of the multilayer body 10 in FIG. 7, and is an enlarged view schematically showing a microscopic state when the surface of the multilayer body 10 is viewed in plane. FIG. 8B is an enlarged cross-sectional view schematically showing a cross-section in the vicinity of the surface layer portion of the multilayer body 10 along the line VIIIB-VIIIB of the surface in FIG. 8A. However, FIG. 8B schematically shows an enlarged cross-sectional view in a state where the external electrode 40 is provided on the surface of the multilayer body 10. That is, for convenience of explanation, an enlarged view of the FIG. 8A is a diagram showing a state in which the external electrode 40 is excluded, while an enlarged cross-sectional view of the FIG. 8B is a diagram of a state in which the external electrode 40 is provided.

Here, as described above, the basic configurations of the first external electrode 40A and the second external electrode 40B are the same or substantially the same. Therefore, in the following explanation of FIG. 8B and the like, the first external electrode 40A and the second external electrode 40B are described as an external electrode 40. The same applies to the respective layers included in the first external electrode 40A and the second external electrode 40B. As shown in FIG. 8B, on the dielectric layer 20 included in the multilayer body 10, the thin film layer 51 defining and functioning as the base electrode layer 50 is provided. Furthermore, the plated layer 60 covers the base electrode layer 50. The plated layer 60 includes, for example, a Cu plated layer 61, a Ni plated layer 62, and a Sn plated layer 63.

As shown in FIGS. 8A and 8B, the first region A1 of the first main surface TS1 of the multilayer body 10 includes a plurality of recesses 80 provided therein, each having a spherical curved surface.

The plurality of recesses 80 are provided in a large number in the first region A1 of the surface of the dielectric layer 20 included in the multilayer body 10. In the present preferred embodiment, the plurality of recesses 80 having the same or substantially the same size are provided in a plane.

As shown in FIG. 8A, the plurality of recesses 80 may be provided in a hexagonal close-packed shape on the surface of the dielectric layer 20. By providing the plurality of recesses 80 in the hexagonal close-packed shape, it is possible to provide the plurality of recesses 80 on the surface of the dielectric layer 20 at a high density. For example, the plurality of recesses 80 may be provided such that an average of 5 or more and 7 or less other recesses 80 are positioned around one recess 80. Thus, it is possible to provide the plurality of recesses 80 on the surface of the dielectric layer 20 at a high density. The plurality of recesses 80 may be regularly provided. Alternatively, they may not be regularly provided.

Each of the plurality of recesses 80 includes an opening 81, and a wall surface 82. As shown FIG. 8A, in the present preferred embodiment, the opening 81 defining the outer edge portion of the recess 80 is in a circular or substantially circular shape.

As its cross-sectional shape is shown in FIG. 8B, the wall surface 82 of the recess 80 includes a spherical curved surface, for example. That is, the wall surface 82 of the recess 80 includes a concave curved surface which defines a portion of the surface of the sphere. The wall surface of the recess 80 may have a hemispherical shape, for example. Alternatively, the wall surface 82 of the recess 80 may have a spherically curved surface less than a hemisphere, for example.

The first region A1 of the first main surface TS1 of the multilayer body 10 includes a plurality of recesses 80, each having a spherical curved surface, and a land portion 90 as a region in which the plurality of recesses 80 are not provided.

The average inlet size of the plurality of recesses 80 provided in the first region A1 is about 0.3 μm or more and about 10.5 μm or less, for example. When the average inlet size of the recess 80 is smaller than about 0.3 μm, since the contact area between the external electrode 40 and the multilayer body 10 is reduced, it is difficult to sufficiently obtain an anchor effect between the external electrode 40 and the multilayer body 10. Therefore, it is difficult to increase the adhesion strength between the external electrode 40 and the multilayer body 10, and there is a possibility that the moisture resistance reliability is reduced. On the other hand, when the average inlet size of the recess 80 is larger than about 10.5 μm, the stress tends to concentrate on the recess 80, so that the strength of the multilayer body 10 may be lowered and cracks may occur. The average inlet size of the plurality of recesses 80 provided in the first region A1 is preferably about 0.3 μm or more and about 3.2 μm or less, for example. When the average inlet size of the recess 80 is about 0.3 μm or more and about 3.2 μm or less, the occurrence of cracks can be further reduced or prevented. In addition, the wall surface 82 of the recess 80 includes a spherical curved surface, such that the external electrode 40 is likely to enter the plurality of recesses 80, a result of which the adhesion between the external electrode 40 and the multilayer body 10 is increased.

In addition, the average inlet size of the plurality of recesses 80 provided in the first region A1 is preferably, for example, about twice or more and about 20 times or the less the average particle size of the ceramic particles included in the dielectric layer 20, and more preferably twice or more and 10 times or less. For example, the average particle size of the ceramic particles may be about 0.1 μm or more and about 1 μm or less, and the average inlet size of the plurality of recesses 80 provided in the first region A1 may be set to be about twice or more and about 20 times or less the average particle size of the ceramic particles. For example, the average particle size of the ceramic particles may be set to about 0.1 μm or more and about 0.5 μm or less, and the average inlet size of the plurality of recesses 80 provided in the first region A1 may be set to about twice or more and about 10 times or less the average particle size of the ceramic particles. Thus, it is possible to appropriately provide the recess 80, while ensuring the anchor effect between the external electrode 40 and the multilayer body 10, and it is also possible to reduce or prevent the stress concentration on the multilayer body 10. Therefore, it is possible to achieve both the adhesion strength between the external electrode 40 and the multilayer body 10 and the strength of the multilayer body 10.

The average inlet size of the plurality of recesses 80 provided in the first region A1 may be, for example, about 0.2 times or more and about 5 times or less the thickness of the dielectric layer 20 sandwiched between the first internal electrode layer 31 and the second internal electrode layer 32. For example, as the ceramic particles included in the dielectric layer 20, smaller ceramic particles having, for example, the average particle size of about 1 μm or less or about 0.5 μm or less may be used, the thickness of the dielectric layer 20 sandwiched between the first internal electrode layer 31 and the second internal electrode layer 32 may be, for example, set to about 0.2 μm or more and about 4 μm or less, or may be, for example, about 0.2 μm or more and about 2 μm or less, and furthermore, the average inlet size of the plurality of recesses 80 provided in the first region A1 may be, for example, set to about 0.2 times or more and about 5 times or less the thickness of the dielectric layer 20 sandwiched between the first internal electrode layer 31 and the second internal electrode layer 32. Thus, the use of appropriate ceramic particles having a smaller average particle size makes it possible to appropriately provide the recess 80, while increasing the capacitance density by reducing the thickness of the dielectric layer 20 sandwiched between the first internal electrode layer 31 and the second internal electrode layer 32. Therefore, it is possible to ensure the capacitance density per volume of the multilayer ceramic capacitor 1, and also ensure the adhesion strength between the external electrode 40 and the multilayer body 10.

In the first region A1, the area ratio R occupied by the opening 81 of the plurality of recesses 80 is preferably about 52% or more, for example. Thus, the anchor effect between the external electrode 40 and the multilayer body 10 is increased, and thus it is possible to increase the adhesion strength between the external electrode 40 and the multilayer body 10. As a result, the advantageous effect of reducing or preventing the intrusion of moisture or the like from the interface between the multilayer body 10 and the external electrode 40 is increased, and thus it is possible to further improve the moisture resistance reliability of the multilayer ceramic capacitor 1. When the area ratio is smaller than about 52%, since the contact area between the external electrode 40 and the multilayer body 10 is reduced, the degree of increase in anchor effect between the external electrode 40 and the multilayer body 10 is reduced.

The average depth of the plurality of recesses 80 provided in the first region A1 is preferably about 0.1 μm or more and about 5 μm or less, and more preferably about 0.2 μm or more and about 3 μm or less, for example. Thus, it is possible to reduce or prevent the stress concentration on the multilayer body 10, while ensuring the anchor effect between the external electrode 40 and the multilayer body 10, and thus it is possible to achieve both the adhesion strength between the external electrode 40 and the multilayer body 10, and the strength of the multilayer body 10.

Here, the depth of the recess 80 is defined as the maximum value of the distance in the depth direction of the recess 80 from the deepest portion of the recess 80 to the opening 81 of the recess 80.

The average depth of the plurality of recesses 80 provided in the first region A1 may be, for example, about 25% or more and about 50% or less the average inlet size of the plurality of recesses 80.

In addition, the average depth of the plurality of recesses 80 provided in the first region A1 is preferably, for example, about 1.0 times or more and about 10 times or less the average particle size of the ceramic particles included in the dielectric layer 20, and more preferably about twice or more and about 10 times or less, for example. Thus, it is possible to appropriately provide the recess 80, and reduce or prevent the stress concentration on the multilayer body 10, while ensuring the anchor effect between the external electrode 40 and the multilayer body 10. Therefore, it is possible to achieve both the adhesion strength between the external electrode 40 and the multilayer body 10, and the strength of the multilayer body 10.

In addition, the average depth of the plurality of recesses 80 provided in the first region A1 may be larger than the thickness of the base electrode layer 50, and may be smaller than the thickness of the plated layer 60 defining and functioning as an outer electrode layer covering the base electrode layer 50. That is, when the external electrode 40 includes at least the base electrode layer 50 provided in close contact with the plurality of first regions A1 of the first main surface TS1, and the outer electrode layer covering the base electrode layer 50, the thickness of the base electrode layer 50 may be smaller than the average depth of the plurality of recesses 80, and the thickness of the outer electrode layer may be larger than the average depth of the plurality of recesses 80. Here, the base electrode layer 50 is defined by the thin film layer 51 such as a sputtering electrode, for example. The outer electrode layer is defined by a plated layer 60 covering the thin film layer 51. Thus, it is possible to increase the anchor effect between the plurality of recesses 80 of the multilayer body 10 covered by the thin film layer 51 and the plated layer 60 included in the external electrode 40, while increasing the adhesion by increasing the contact area between the surface of the multilayer body 10 and the thin film layer 51, and thus it is possible to increase the adhesion strength between the external electrode 40 and the multilayer body 10 as a whole.

The configuration of the present preferred embodiment is more effective for the multilayer body 10 having a smaller dimension in the lamination direction T. For example, it is more effective for the multilayer ceramic capacitor 1 having the multilayer body 10 in which the dimension in the lamination direction T is about 0.01 mm or more and about 0.2 mm or less. As the dimension in the lamination direction T of the multilayer body 10 is smaller, since the mechanical strength of the multilayer body 10 is likely to decrease, it is strongly required to secure both the mechanical strength of the multilayer body 10, and the adhesion strength between the external electrode 40 and the multilayer body 10.

The configuration of the plurality of recesses 80 provided in the first region A1 is not limited to that shown in FIGS. 8A and 8B. For example, the configuration of the plurality of recesses 80 may be as shown in FIGS. 9A and 9B. FIGS. 9A and 9B are diagrams showing an example of another configuration of the plurality of recesses 80 provided on the surfaces of the first regions A1 of the multilayer body 10, and are diagrams corresponding to FIGS. 8A and 8B, respectively.

In the configurations shown in FIGS. 9A and 9B, a plurality of recesses 80, each having a spherical curved surface, are provided in the first region A1 on the first main surface TS1 of the multilayer body 10. Here, the plurality of recesses 80 may have recesses of different inlet sizes. For example, as shown in FIGS. 9A and 9B, the plurality of recesses 80 may include recesses 80B each having a larger inlet size with respect to the average inlet size, and recesses 80C each having a smaller inlet size with respect to the average inlet size. In this case, the average depth of the recesses 80C, each having an inlet size smaller than the average inlet size, may be smaller than the average depth of the recesses 80B, each having a larger inlet size with respect to the average inlet size. Thus, it is possible to appropriately adjust the anchor effect between the external electrode 40 and the multilayer body 10. In addition, the recesses 80B each having a larger inlet size with respect to the average inlet size, and the recesses 80C each having a smaller inlet size with respect to the average inlet size may be regularly provided, or alternatively may not be regularly provided. Furthermore, the plurality of recesses 80 may have inlet sizes which are different randomly or in a stepwise manner.

The plurality of recesses 80B and 80C having different inlet sizes include circular or substantially circular openings 81B and 81C, and wall surfaces 82B and 82C having spherical curved surfaces. In addition, the openings 81B and 81C are not limited to a circular substantially circular shape, and may be in another shape. In addition, for example, the wall surface 82B of the recess 80B may be a hemispherical-shaped or substantially hemispherical-shaped surface, or may be a spherical-shaped surface less than hemispherical, and the wall surface 82C of the recess 80C may be a spherical curved surface less than hemispherical.

In this case as well, the average inlet size of the plurality of recesses 80 provided in the first region A1 is preferably about 0.3 μm or more and about 10.5 μm or less, for example. Furthermore, in the first region A1, the area ratio occupied by the openings of the plurality of recesses 80 is preferably about 52% or more, for example. Furthermore, the average depth of the plurality of recesses 80 provided in the first region A1 is preferably about 0.1 μm or more and about 5 μm or less, and more preferably about 0.2 μm or more and about 3 μm or less, for example.

Moreover, the configuration of the plurality of recesses 80 provided in the first region A1 is acceptable as shown in FIGS. 10A and 10B. FIGS. 10A and 10B are diagrams showing an example of another configuration of the plurality of recesses 80 provided on the surfaces of the first regions A1 of the multilayer body 10, and are diagrams corresponding to FIGS. 8A and 8B, respectively.

In the configurations shown in FIGS. 10A and 10B, a plurality of recesses 80 each having a spherical curved surface are provided in the first region A1 on the first main surface TS1 of the multilayer body 10. Here, the plurality of recesses 80 may each include a recess 80D in which an opening 81D has a hexagonal or substantially hexagonal shape. As a result, the plurality of recesses 80 can be provided at a higher density in the first region A1. Therefore, it is possible to appropriately ensure the anchor effect between the external electrode 40 and the multilayer body 10.

Even in this case, the wall surface 82D of the recess 80D has a spherical curved surface. That is, the wall 82D of the recess 80D has a concave curved surface so as to define a portion of the surface of the sphere.

In this case, it is preferable that the average inlet size of the plurality of recesses 80 provided in the first region A1 is about 0.3 μm or more and about 10.5 μm or less, for example. Furthermore, in the first region A1, the area ratio occupied by the openings of the plurality of recesses 80 is preferably about 52% or more, for example. Furthermore, the average depth of the plurality of recesses 80 provided in the first region A1 is preferably about 0.1 μm or more and about 5 μm or less, and more preferably about 0.2 μm or more and about 3 μm or less, for example.

In addition, the recesses as shown FIGS. 8A and 8B, the recesses having different inlet sizes as shown in FIGS. 9A and 9B, and the recesses having different shapes of openings as shown in FIGS. 10A and 10B may coexist in the first region A1.

Hereinafter, a non-limiting example of a method of measuring various parameters in the present preferred embodiment will be described.

A method for measuring the average inlet size of the recesses provided on the surface of the multilayer body will be described. The inlet size of the recess is calculated as the circle equivalent size of an opening of the recess. Here, the circle equivalent size indicates the diameter of a true circle corresponding to the area of a measurement target portion.

First, the external electrodes are removed using a plating release agent or other agents so as not to cause damage to the multilayer body. Then, in the middle portion in the width direction and the length direction of the first region A1, the surface of the multilayer body is photographed with a scanning electron microscope (SEM) or an atomic force microscope (AFM). The photographing condition is set such that individual ceramic particles can be distinguished, a plurality of irregularities are included in the field of view, and the three-dimensional shape of the irregularities can be confirmed. For example, in the case of SEM, about 5,000 times to about 20,000 times is a standard. Thereafter, the average inlet size of the recesses is calculated using the captured image in the following manner.

(1) Identify the outline of the outer edge of the recess and identify the opening of the recess.

(2) Perform processing of (1) on a plurality of recesses within the observation range. The observation range is set so that the number of recesses is 20 or more.

(3) Use the image processing software, and calculate the circle equivalent size of the opening of each recess as the inlet size of the recess.

(4) Set the average value of the inlet size of the plurality of recesses calculated in (3), as the average inlet size of the recess.

A non-limiting example of a method for measuring the area ratio R occupied by the opening of the plurality of recesses in the first region A1 of the surface of the multilayer body will be described. Here, the area ratio R occupied by the opening of the recess is calculated by the ratio of the total area of the first region A1 including the land portions and the plurality of recesses within the observation range, relative to the summed area of the openings of the plurality of recesses provided in the observation range.

First, the external electrodes are removed using a plating release agent or other agents so as not to cause damage to the multilayer body. Then, in the middle portion in the width direction and the length direction of the first region A1, the surface of the multilayer body is photographed with a scanning electron microscope (SEM) or an atomic force microscope (AFM). The photographing condition is set such that individual ceramic particles can be distinguished, a plurality of irregularities are included in the field of view, and the three-dimensional shape of the irregularities can be confirmed. For example, in the case of SEM, about 5,000 times to about 20,000 times is a standard. Thereafter, the area ratio R occupied by the openings of the plurality of recesses is calculated using the captured image in the following manner.

(1) Identify the outline of the outer edge of the recess and identify the opening of the recess.

(2) Perform processing of (1) on a plurality of recesses within the observation range. The observation range is set so that the number of recesses is 20 or more.

(3) Use the image processing software, and for each recess, calculate the area of the region surrounded by the outline of the outer edge of the recess as the area of the opening of the recess.

(4) Calculate the ratio occupied by the summed area of the openings of the plurality of recesses calculated in (3) with respect to the area of the entire observation range, as the area ratio R occupied by the openings of the plurality of recesses.

A non-limiting example of a method for measuring the depth of the recess provided on the surface of the multilayer body will be described. First, polishing is performed without damaging the multilayer body, and a cross section perpendicular or substantially perpendicular to the width direction of the multilayer body is exposed. Next, the cross section of the first region A1 of the surface of the multilayer body is photographed by a scanning electron microscope (SEM) or a scanning ion microscope (SIM). The photographing condition is set such that it is possible to distinguish individual ceramic particles, and a plurality of irregularities in the field of view are included. For example, in the case of SEM, about 5,000 times to about 20,000 times is a standard. Thereafter, the depth of the plurality of recesses is measured by the following method using the photographed cross-sectional image.

(1) Set the observation range so that the number of recesses is 20 or more.

(2) For one of the recesses of (1), identify two vertices indicating the opening of the recess and the lowest point indicating the deepest portion of the recess in the cross-sectional image.

(3) Obtain the length connecting the midpoint of the straight line connecting the two vertices identified in (2) and the lowest point of the recess identified in (2) as the depth of one recess.

(4) Perform processing of (1) to (3) for a plurality of recesses within the observation range, and calculate the average value of the depth of the plurality of recesses calculated within the observation range, as the depth of the recess.

A non-limiting example of a method for measuring the thickness of the dielectric layer sandwiched between a plurality of internal electrode layers will be described. First, a cross section perpendicular or substantially perpendicular to the length direction of the multilayer body exposed by polishing is observed by a scanning electron microscope (SEM). Next, the thickness of the dielectric layer 20 on a total of five lines including the center line along the lamination direction passing through the center of the cross section of the multilayer body, and two lines drawn at equal or substantially equal intervals on both sides from the center line are measured. This measurement is performed for each of the upper portion, the intermediate portion, and the lower portion in the lamination direction, and the average value of these measurements is calculated as the thickness of the dielectric layer 20 of the present preferred embodiment.

A non-limiting example of a method of measuring each layer included in the external electrode such as the base electrode layer, the plated layer, and other layers will be described. First, a cross section perpendicular or substantially perpendicular to the length direction of the multilayer body exposed by polishing is observed by a scanning electron microscope (SEM). Next, five lines are provided at equal or substantially equal intervals which are perpendicular or substantially perpendicular to the extending direction of the measurement target layer, and the thicknesses of the measurement target layer on the five lines are measured. Then, the average value of the thickness of the measurement target layer on the five lines is calculated as the thickness of the measurement target layer of the present preferred embodiment.

A non-limiting example of a method for measuring the average particle size of the ceramic particles included in the dielectric layer will be described. First, a cross section perpendicular or substantially perpendicular to the length direction of the multilayer body exposed by polishing is observed by a scanning electron microscope (SEM). Then, the particle sizes of 200 particles are measured using a diameter method which defines the maximum length of each particle in the direction parallel to the internal electrode as the particle size, and the average value is calculated as the average particle size.

Next, a non-limiting example of a method of manufacturing the multilayer ceramic capacitor 1 according to the present preferred embodiment will be described.

A dielectric sheet for the dielectric layer 20 and a conductive paste for the internal electrode layer 30 are provided. The conductive paste for the dielectric sheet and the internal electrode includes a binder and a solvent. A known binder and solvent may be used. A paste made of a conductive material is, for example, one in which an organic binder and an organic solvent are added to a metal powder.

On the dielectric sheet, a conductive paste for the internal electrode layer 30 is printed in a predetermined pattern by, for example, screen printing or gravure printing. Thus, the dielectric sheet in which the pattern of the first internal electrode layer 31 is provided, and the dielectric sheet in which the pattern of the second internal electrode layer 32 is provided are prepared.

A predetermined number of dielectric sheets in which the pattern of the internal electrode layer is not printed are laminated such that a portion is formed which defines and functions as the first main surface-side outer layer portion 12 in the vicinity of the first main surface TS1. On top of that, the dielectric sheet on which the pattern of the first internal electrode layer 31 is printed and the dielectric sheet on which the pattern of the second internal electrode layer 32 is printed are sequentially laminated alternately, such that a portion is formed which defines and functions as the inner layer portion 11. On this portion defining and functioning as the inner layer portion 11, a predetermined number of dielectric sheets in which the pattern of the internal electrode layer is not printed are laminated, such that a portion is formed which defines and functions as the second main surface-side outer layer portion 13 in the vicinity of the second main surface TS2. Thus, a laminated sheet is produced.

The laminated sheet is pressed in the lamination direction by hydrostatic pressing, for example, such that a laminated block is produced. Here, when performing the pressing, it is possible to form recesses in the laminated block by crimping a transfer plate provided with an uneven pattern on the surface, to a portion where recesses of the laminated block are to be formed. Here, by controlling the shape, size, depth, density, and the like of the concavo-convex pattern provided on the transfer plate, it is possible to form the desired recesses described in the present preferred embodiment.

The laminated block is cut to a predetermined size, such that laminate chips are cut out. At this time, corners and ridges of the laminate chips may be rounded by barrel polishing or the like.

By firing the laminate chips, the multilayer body 10 in which the recesses described in the present preferred embodiment are provided is manufactured. The firing temperature depends on the materials of the dielectric layers 20 and the internal electrode layers 30. However, it is preferably about 900° C. or more and about 1400° C. or less, for example.

When forming the base electrode layer with a thin film layer, a thin film layer defining and functioning as the base electrode layer is formed at a portion where the external electrode of the multilayer body 10 is to be formed, by performing masking or other processing. The thin film layer is formed by a thin film forming method such as a sputtering method or a deposition method, for example. In the present preferred embodiment, the thin film layer is formed on the surface of the multilayer body 10 in which the plurality of recesses described in the present preferred embodiment are provided.

Thereafter, a plated layer is formed on the surface of the base electrode layer and the multilayer body made of a thin film layer. In the present preferred embodiment, as the plated layer, a plated layer including three layers, including a Cu plated layer, a Ni plated layer, and a Sn plated layer is formed.

In addition, when forming the base electrode layer with a fired layer, a conductive paste defining and functioning as a base electrode layer is applied to the first side surface and the second side surface of the multilayer body 10. A conductive paste including a glass component and metal is applied to the multilayer body 10 by, for example, a method such as dipping. Thereafter, a firing process is performed to form the base electrode layer. The temperature of the firing process at this time is preferably about 700° C. or higher and about 900° C. or lower, for example.

In a case in which the laminate chip before firing and the conductive paste applied to the laminate chip are fired simultaneously, it is preferable that the fired layer is formed by firing a layer to which a ceramic material is added, instead of a glass component. At this time, it is particularly preferable to use, as the ceramic material to be added, the same type of ceramic material as the dielectric layer 20. In this case, a conductive paste is applied to the laminate chip before firing, and the laminate chip and the conductive paste applied to the laminate chip are fired simultaneously, such that the multilayer body 10 having a fired layer formed therein is formed.

By such a manufacturing process, the multilayer ceramic capacitor 1 is manufactured.

Hereinafter, a first modified example of the multilayer ceramic capacitor 1 according to the present preferred embodiment will be described. In the following description, the same or corresponding components as those of the above-described preferred embodiment are denoted by the same reference numerals, and detailed description thereof is omitted. FIG. 11A is a cross-sectional view showing a first modified example of the multilayer ceramic capacitor 1 according to the present preferred embodiment, and corresponding to FIG. 4.

In the present modified example, the configuration of the external electrode 40 is different from that of the above-described preferred embodiment.

The first external electrode 40A includes a first base electrode layer 50A and a first plated layer 60A. The first base electrode layer 50A of the present modified example includes a first thin film layer 51A and a first fired layer 52A. The first plated layer 60A of the present modified example includes a first Ni plated layer 62A and a first Sn plated layer 63A.

The second external electrode 40B includes a second base electrode layer 50B and a second plated layer 60B. The second base electrode layer 50B of the present modified example includes a second thin film layer 51B and a second fired layer 52B. The second plated layer 60B of the present modified example includes a second Ni plated layer 62B and a second Sn plated layer 63B.

The first fired layer 52A is provided on the first side surface LS1. More specifically, the first fired layer 52A extends not only to the first side surface LS1 but also to a portion of the first main surface TS1.

The second fired layer 52B is provided on the second side surface LS2. More specifically, the second fired layer 52B extends not only to the second side surface LS2, but also to a portion of the first main surface TS1.

The first thin film layer 51A is provided on a portion of the first main surface TS1. The first thin film layer 51A overlaps on the first fired layer 52A provided on a portion of the first main surface TS1, and the remaining portion is provided directly on the first main surface TS1 of the multilayer body 10.

The second thin film layer 51B is provided on a portion of the first main surface TS1. The second thin film layer 51B overlaps on the second fired layer 52B provided on a portion of the first main surface TS1, and the remaining portion is provided directly on the first main surface TS1 of the multilayer body 10.

The thickness in the length direction L connecting the first side surface LS1 and the second side surface LS2 of the first fired layer 52A provided on the first side surface LS1 is preferably about 1 μm or more and about 5 μm or less, for example. The thickness in the length direction L connecting the first side surface LS1 and the second side surface LS2 of the second fired layer 52B provided on the second side surface LS2 is preferably about 1 μm or more and about 5 μm or less, for example.

The first fired layer 52A and the second fired layer 52B may be made by applying, for example, conductive pastes including glasses and metals to a multilayer body and firing. In addition, in a case in which the laminate chip before firing and the conductive paste applied to the laminate chip are fired simultaneously, it is preferable that the fired layer is formed by firing a layer to which a ceramic material is added instead of a glass component. At this time, it is particularly preferable to use, as the ceramic material to be added, the same type of ceramic material as the dielectric layer 20.

In addition, the first thin film layer 51A and the second thin film layer 51B may include, for example, sputtering electrodes as in the above-described preferred embodiment.

The first plated layer 60A and the second plated layer 60B are not limited to the two-layer structure, and may include, for example, a three-layer structure including Cu-plating, or may include another layer structure as in the above preferred embodiment.

Also in the present modified example, the first main surface TS1 of the multilayer body 10 includes a plurality of first regions A1 covered with the first external electrode 40A and the second external electrode 40B defining and functioning as a plurality of external electrodes 40. In the first region A1 on the first main surface TS1 of the multilayer body 10, a plurality of recesses 80 each having a spherical curved surface with a mean inlet size of about 0.3 μm or more and about 10.5 μm or less are provided, which are shown in the above-described preferred embodiment. Therefore, it is possible to ensure the anchor effect between the external electrode 40 and the multilayer body 10, and to increase the adhesion strength between the external electrode 40 and the multilayer body 10. As a result, it is possible to reduce or prevent a decrease in the moisture resistance of the multilayer ceramic capacitor 1. Also in the present modified example, it is preferable that the area ratio R occupied by the openings of the plurality of recesses 80 in the first region A1 is about 52% or more, for example. It is preferable that other aspects such as the depth of the recess 80 are the same or substantially the same as those in the above-described preferred embodiment.

Figure 11B:
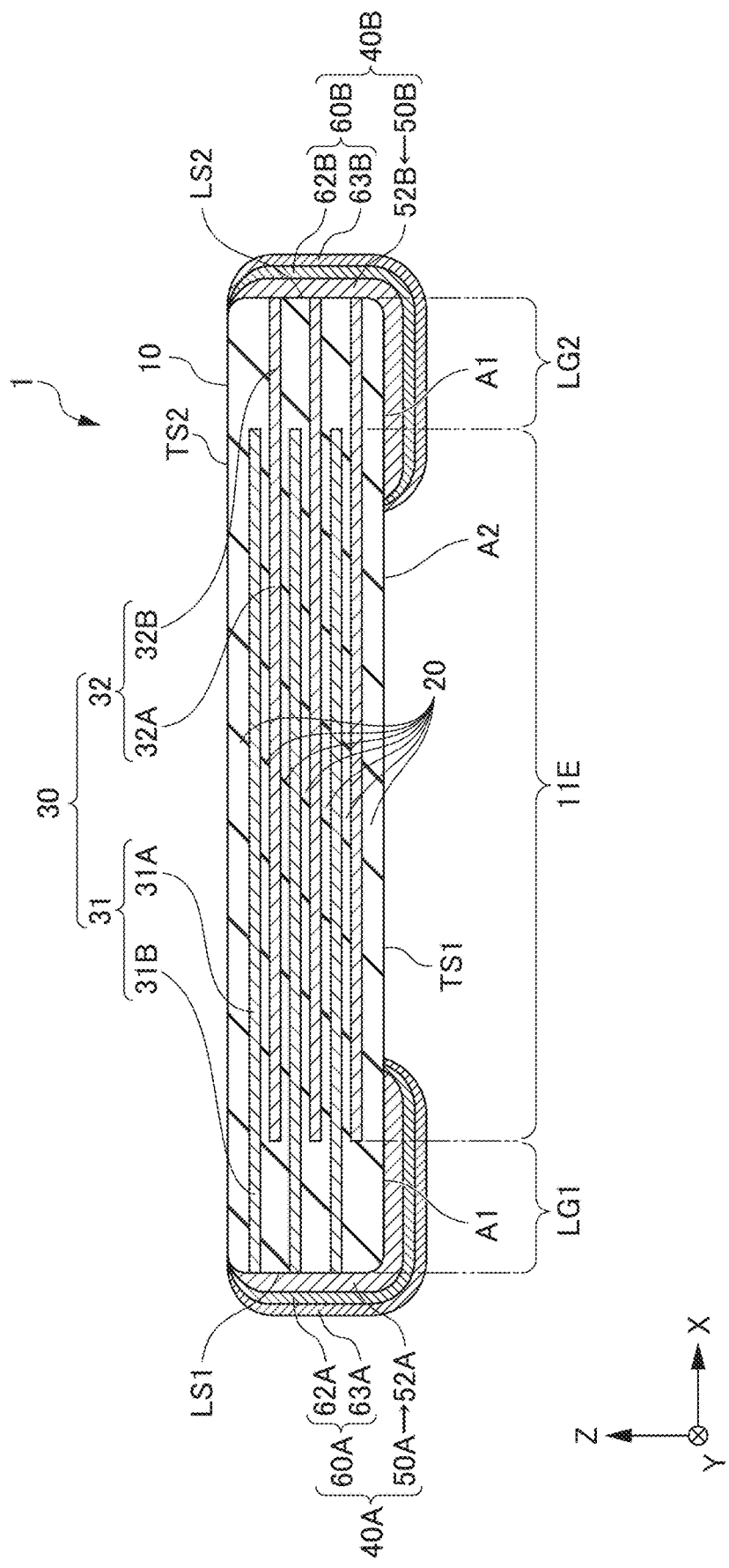
FIG. 11B is a cross-sectional view showing a second modified example of a multilayer ceramic capacitor according to a preferred embodiment of the present invention, and corresponding to FIG. 4.

Hereinafter, a second modified example of the multilayer ceramic capacitor 1 according to the present preferred embodiment will be described. In the following description, the same or corresponding components as those of the above-described preferred embodiment are denoted by the same reference numerals, and a detailed description thereof is omitted. FIG. 11B is a cross-sectional view showing a second modified example of the multilayer ceramic capacitor 1 according to the present preferred embodiment, and corresponding to FIG. 4.

In the present modified example, the configuration of the external electrode 40 is different from that of the above-described preferred embodiment.

The first external electrode 40A includes a first base electrode layer 50A and a first plated layer 60A. The first base electrode layer 50A of the present modified example includes a first fired layer 52A. The first plated layer 60A of the present modified example includes a first Ni plated layer 62A and a first Sn plated layer 63A.

The second external electrode 40B includes a second base electrode layer 50B and a second plated layer 60B. The second base electrode layer 50B of the present modified example includes a second fired layer 52B. The second plated layer 60B of the present modified example includes a second Ni plated layer 62B and a second Sn plated layer 63B.

The first base electrode layer 50A is provided on the first side surface LS1. The first base electrode layer 50A is connected to the first internal electrode layers 31. In the present preferred embodiment, the first base electrode layer 50A extends from the first side surface LS1 to a portion of the first main surface TS1 of the first base electrode layer.

The second base electrode layer 50B is provided on the second side surface LS2. The second base electrode layer 50B is connected to the second internal electrode layers 32. In the present preferred embodiment, the second base electrode layer 50B extends from the second side surface LS2 to a portion of the first main surface TS1.

The first fired layer 52A included in the first base electrode layer 50A and the second fired layer 52B included in the second base electrode layer 50B may be obtained by, for example, firing conductive pastes including glasses and metals applied to a multilayer body. In addition, in a case in which the laminate chip before firing and the conductive paste applied to the laminate chip are fired simultaneously, it is preferable that the fired layer is formed by firing a layer to which a ceramic material is added, instead of a glass component. At this time, it is particularly preferable to use, as the ceramic material to be added, the same type of ceramic material as the dielectric layer 20.

The thickness in the length direction of the first base electrode layer 50A provided on the first side surface LS1 is preferably, for example, about 15 μm or more and 160 μm or less in the middle portion in the lamination direction T and the width direction W of the first base electrode layer 50A.

The thickness in the length direction of the second base electrode layer 50B provided on the second side surface LS2 is preferably, for example, about 15 μm or more and 160 μm or less in the middle portion in the lamination direction T and the width direction W of the second base electrode layer 50B.

The thickness in the lamination direction of the first base electrode layer 50A provided on a portion of the first main surface TS1 is preferably, for example, about 5 μm or more and about 40 μm or less in the middle portion in the length direction L and the width direction W of the first base electrode layer 50A provided on this portion.

The thickness of the second base electrode layer 50B provided on a portion of the first main surface TS1 in the lamination direction is preferably, for example, about 5 μm or more and about 40 μm or less in the middle portion in the length direction L and the width direction W of the second base electrode layer 50B provided on this portion.

The first base electrode layer 50A may also be provided in a portion of the second main surface TS2. In this case, the thickness in the lamination direction of the first base electrode layer 50A provided in this portion is, for example, preferably about 5 μm or more and about 40 μm or less at the middle portion in the length direction L and the width direction W of the first base electrode layer 50A provided in this portion.

The second base electrode layer 50B may also be provided in a portion of the second main surface TS2. In this case, the thickness in the lamination direction of the second base electrode layer 50B provided in this portion is, for example, preferably about 5 μm or more and about 40 μm or less at the middle portion in the length direction L and the width direction W of the second base electrode layer 50B provided in this portion.

The first base electrode layer 50A may be provided on a portion of at least one surface of the third side surface WS1 and the fourth side surface WS2. In this case, the thickness of the first base electrode layer 50A provided in this portion in the width direction is preferably, for example, about 5 μm or more and about 40 μm or less at the middle portion in the length direction L and the lamination direction T of the first base electrode layer 50A provided in this portion.

The second base electrode layer 50B may be provided on a portion of at least one surface of the third side surface WS1 and the fourth side surface WS2. In this case, the thickness of the second base electrode layer 50B provided in this portion in the width direction is preferably, for example, about 5 μm or more and about 40 μm or less at the middle portion in the length direction L and the lamination direction T of the second base electrode layer 50B provided in this portion.

The first plated layer 60A and the second plated layer 60B are not limited to the two-layer structure, and may have a three-layer structure including, for example, Cu-plating, or may include another layer structure as in the above-described preferred embodiment.

Also in the present modified example, the first main surface TS1 of the multilayer body 10 includes a plurality of first regions A1 covered with the first external electrode 40A and the second external electrode 40B defining and functioning as a plurality of external electrodes 40. Furthermore, in the first region A1 on the first main surface TS1 of the multilayer body 10, the plurality of recesses 80 each having a spherical curved surface having a mean inlet size of, for example, about 0.3 μm or more and about 10.5 μm or less, which are shown in the above-described preferred embodiment, are provided. Therefore, it is possible to ensure the anchor effect between the external electrode 40 and the multilayer body 10, and to increase the adhesion strength between the external electrode 40 and the multilayer body 10. As a result, it is possible to reduce or prevent a decrease in the moisture resistance of the multilayer ceramic capacitor 1. Also in the present modified example, it is preferable that the area ratio R occupied by the openings of the plurality of recesses 80 in the first region A1 is about 52% or more, for example. It is preferable that other aspects such as the depth of the recess 80 are the same or substantially the same as those in the above-described preferred embodiment.

Figure 12:
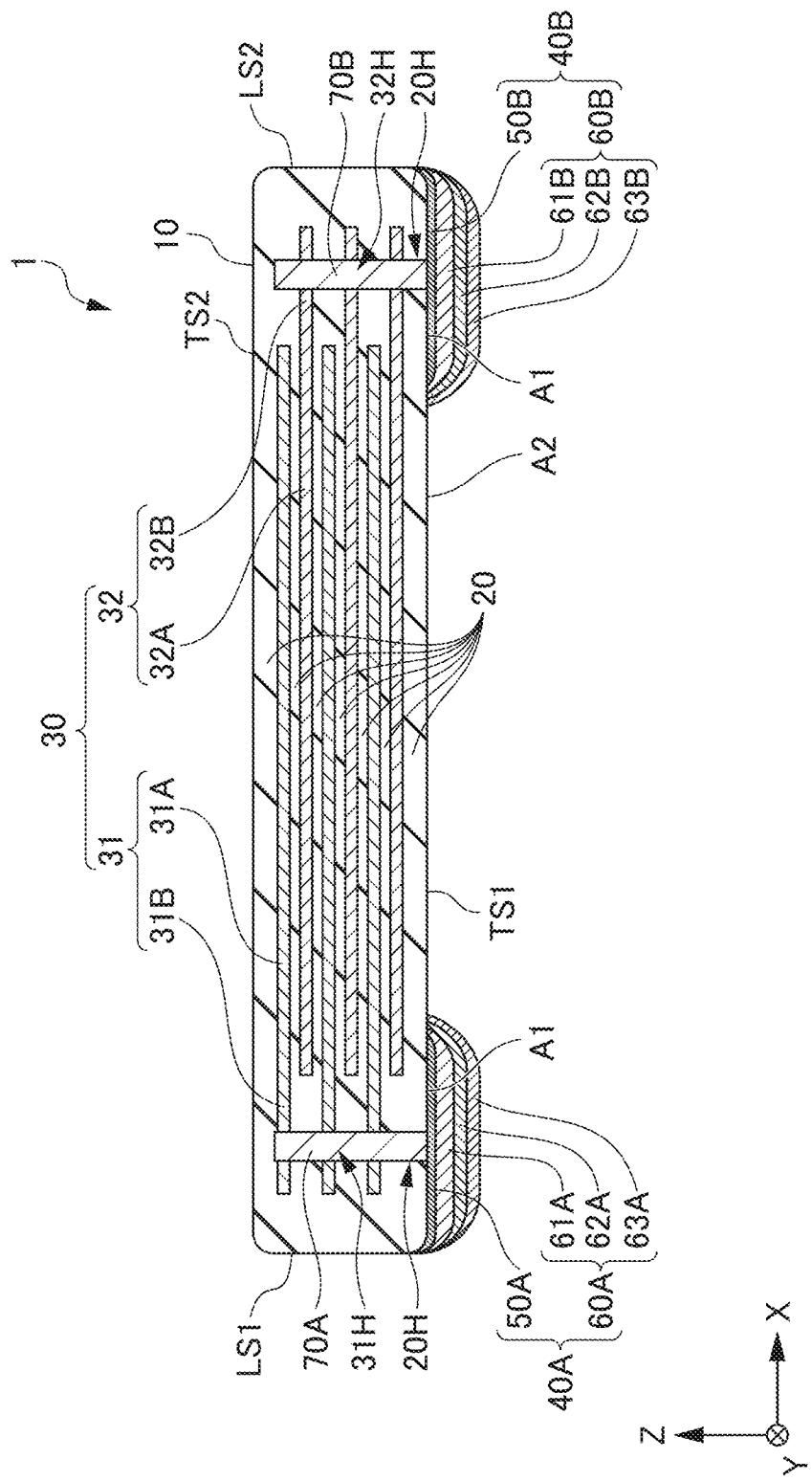
FIG. 12 is a cross-sectional view showing a third modified example of a multilayer ceramic capacitor according to a preferred embodiment of the present invention, and corresponding to FIG. 4.

Hereinafter, a third modified example of the multilayer ceramic capacitor 1 according to the present preferred embodiment will be described. In the following description, the same or corresponding components as those of the above-described preferred embodiment are denoted by the same reference numerals, and a detailed description thereof is omitted. FIG. 12 is a cross-sectional view showing a third modified example of the multilayer ceramic capacitor 1 of the present preferred embodiment, and corresponding to FIG. 4.

In the present modified example, the connection structure of the internal electrode layer 30 and the external electrode 40 is different from the above-described preferred embodiment.

The first internal electrode layer 31 includes a first opposing portion 31A facing the second internal electrode layer 32, and a first lead-out portion 31B extending from the first opposing portion 31A to the first side surface LS1. However, in the present modified example, the first lead-out portion 31B does not extend to the first side surface LS1.

The second internal electrode layer 32 includes a second opposing portion 32A facing the first internal electrode layer 31, and a second lead-out portion 32B extending from the second opposing portion 32A to the second side surface LS2.

However, in the present modified example, the second lead-out portion 32B does not extend to the second side surface LS2.

The first external electrode 40A is provided only on the first main surface TS1 or the second main surface TS2 defining and functioning as a mounting surface. Alternatively, the first external electrode 40A may be provided on the first main surface TS1 and the second main surface TS2. In the present modified example, the first external electrode 40A is provided only on a portion of the first main surface TS1 defining and functioning as a mounting surface. The first external electrode 40A includes a first base electrode layer 50A and a first plated layer 60A provided on the first base electrode layer 50A.

The second external electrode 40B is provided only on the first main surface TS1 or the second main surface TS2 defining and functioning as a mounting surface. Alternatively, the second external electrode 40B may be provided on the first main surface TS1 and the second main surface TS2. In the present modified example, the second external electrode 40B is provided only on a portion of the first main surface TS1 defining and functioning as a mounting surface. The second external electrode 40B includes a second base electrode layer 50B and a second plated layer 60B provided on the second base electrode layer 50B.

The multilayer ceramic capacitor 1 of the present modified example includes a first via connection portion 70A and a second via connection portion 70B.

The first external electrode 40A and the first lead-out portion 31B of the first internal electrode layer 31 are electrically connected to each other by the first via connection portion 70A.

The second external electrode 40B and the second lead-out portion 32B of the second internal electrode layer 32 are electrically connected to each other by the second via connection portion 70B.

The first via connection portion 70A passes through a hole portion 20H provided in the dielectric layer 20 and a hole portion 31H provided in the first internal electrode layer 31 of the multilayer body 10, and electrically connects the first internal electrode layer 31 with the first external electrode 40A.

The second via connection portion 70B passes through the hole portion 20H provided in the dielectric layer 20 and the hole portion 32H provided in the second internal electrode layer 32 of the multilayer body 10, and electrically connects the second internal electrode layer 32 with the second external electrode 40B.

When the first external electrode 40A is also provided on the second main surface TS2, the first via connection portion 70A may extend toward the second main surface TS2 so as to electrically connect the first internal electrode layer 31 with the first external electrode 40A provided on the second main surface TS2.

When the second external electrode 40B is also provided on the second main surface TS2, the second via connection portion 70B may extend toward the second main surface TS2 so as to electrically connect the second internal electrode layers 32 with the second external electrode 40B provided on the second main surface TS2.

The shapes of the first via connection portion 70A and the second via connection portion 70B are not limited to a cylindrical or substantially cylindrical shape and various shapes, such as a prismatic shape, may be used.

Also in the present modified example, the first main surface TS1 of the multilayer body 10 includes a plurality of first regions A1 covered with the first external electrode 40A and the second external electrode 40B defining and functioning as a plurality of external electrodes 40. In the first region A1 on the first main surface TS1 of the multilayer body 10, the plurality of recesses 80, each having a spherical curved surface having a mean inlet size of about 0.3 μm or more and about 10.5 μm or less, for example, which are shown in the above-described preferred embodiment, are provided. Therefore, it is possible to ensure the anchor effect between the external electrode 40 and the multilayer body 10, and to increase the adhesion strength between the external electrode 40 and the multilayer body 10. As a result, it is possible to reduce or prevent a decrease in the moisture resistance of the multilayer ceramic capacitor 1. Also in the present modified example, the area ratio R occupied by the openings 81 of the plurality of recesses 80 in the first region A1 is preferably about 52% or more, for example. Also in the present modified example, it is preferable that the area ratio R occupied by the openings of the plurality of recesses 80 in the first region A1 is about 52% or more, for example. It is preferable that other aspects such as the depth of the recess 80 are the same or substantially the same as those in the above preferred embodiment.

Hereinafter, a fourth modified example of the multilayer ceramic capacitor 1 according to the present preferred embodiment will be described. In the following description, the same or corresponding components as those of the above-described preferred embodiment are denoted by the same reference numerals, and a detailed description thereof is omitted. FIG. 13A is a diagram showing a fourth modified example of the multilayer ceramic capacitor 1 of the present preferred embodiment, and corresponding to FIG. 2. FIG. 13B is an arrow view when viewing the second main surface TS2 of the multilayer ceramic capacitor 1 shown in FIG. 13A along the direction of the arrow XIIIB.

In the present modified example, the first external electrode 40A is provided not only on a portion of the first side surface LS1 and the first main surface TS1, but also on a portion of the second main surface TS2.

In the present modified example, the second external electrode 40B is provided not only on a portion of the second side surface LS2 and the first main surface TS1, but also on a portion of the second main surface TS2.

In the present modified example, as shown in FIG. 13B, the second main surface TS2 of the multilayer body 10 includes a plurality of third regions A3 covered by the first external electrode 40A and the second external electrode 40B defining and functioning as the plurality of external electrodes 40. The second main surface TS2 of the multilayer body 10 includes a fourth region A4 exposed from the first external electrode 40A and the second external electrode 40B defining and functioning as the plurality of external electrodes 40.

In the present modified example, the plurality of third regions A3 are divided into a region TS2A covered by the first external electrode 40A, and a region TS2B covered by the second external electrode 40B. That is, the plurality of third regions A3 are separated into the two regions in the length direction L of the region TS2A located in the vicinity of the first side surface LS1 and a region TS2B located in the vicinity of the second side surface LS2. Furthermore, the fourth region A4 is provided between the plurality of third regions A3 so as to separate the plurality of third regions A3.

Also in the present modified example, the first main surface TS1 of the multilayer body 10 includes a plurality of first regions A1 covered with the first external electrode 40A and the second external electrode 40B defining and functioning as the plurality of external electrodes 40. In the first region A1 on the first main surface TS1 of the multilayer body 10, the plurality of recesses 80, each having a spherical curved surface having a mean inlet size of about 0.3 μm or more and about 10.5 μm or less, which are shown in the above-described preferred embodiment, are provided. Therefore, it is possible to ensure the anchor effect between the external electrode 40 and the multilayer body 10, and to increase the adhesion strength between the external electrode 40 and the multilayer body 10. As a result, it is possible to reduce or prevent a decrease in the moisture resistance of the multilayer ceramic capacitor 1. Also in the present modified example, it is preferable that the area ratio R occupied by the openings of the plurality of recesses 80 in the first region A1 be 52% or more. It is preferable that other aspects such as the depth of the recess 80 are the same as those in the above preferred embodiment.

Furthermore, in the present modified example, the plurality of recesses 80 each having a spherical curved surface having a mean inlet size of about 0.3 μm or more and about 10.5 μm or less, similar to the recesses provided in the first region A1, are also provided in the third region A3 on the second main surface TS2 of the multilayer body 10. Therefore, even in this portion, it is possible to ensure the anchor effect between the external electrode 40 and the multilayer body 10, and to increase the adhesion strength between the external electrode 40 and the multilayer body 10. As a result, it is possible to reduce or prevent a decrease in the moisture resistance of the multilayer ceramic capacitor 1. In the present modified example, it is preferable that the area ratio R occupied by the openings of the plurality of recesses 80 in the third region A3 be also about 52% or more. It is preferable that other aspects such as the depth of the recess 80 are the same as those of the recesses provided in the first region A1.

According to the configuration of the present modified example, mounting can be performed not only on the first main surface TS1, but also on the second main surface TS2. As a result, the direction selection of the multilayer ceramic capacitor 1 at the time of packaging becomes unnecessary. Furthermore, when mounting the multilayer ceramic capacitor 1, it is possible to draw up the solder to the main surface opposite to the mounting surface. Therefore, the self-alignment property and the adhesion at the time of reflow mounting can be improved.

Figure 14B:
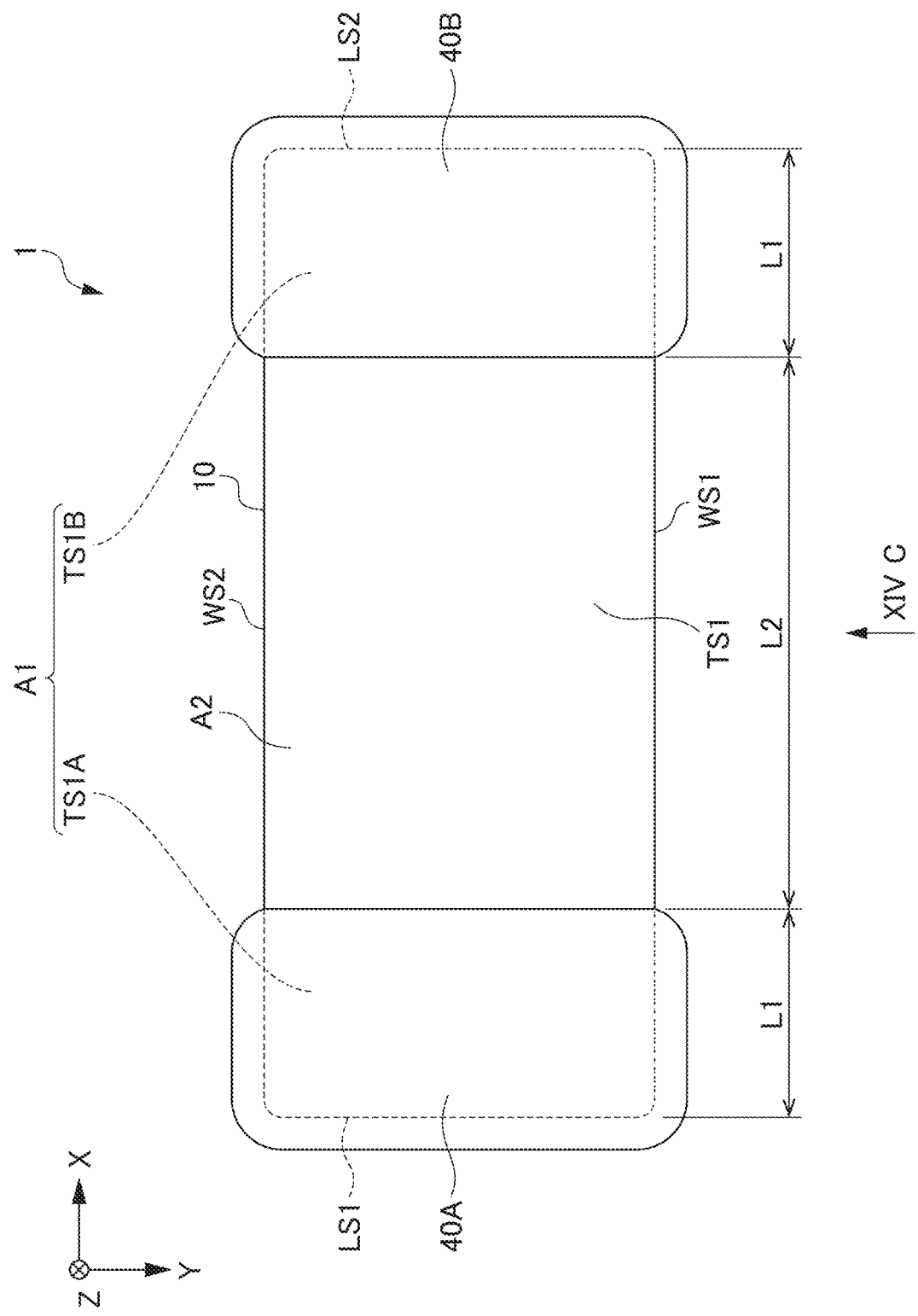
FIG. 14B is an arrow view when viewing the first main surface of the multilayer ceramic capacitor shown in FIG. 14A along the direction of the arrow XIVB.
Figure 14C:
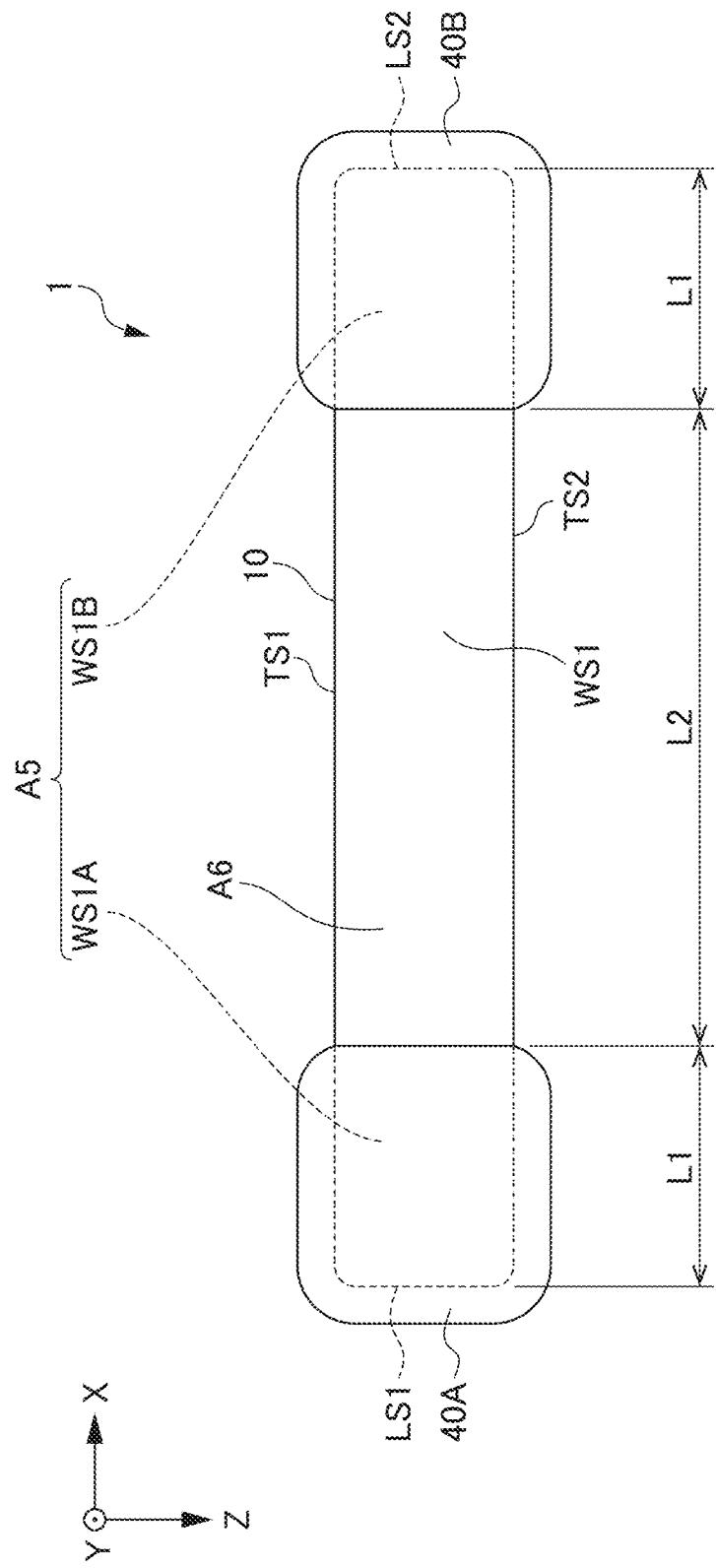
FIG. 14C is an arrow view when viewing the third side surface of the multilayer ceramic capacitor shown in FIG. 14B along the direction of the arrow XIVC.

Hereinafter, a fifth modified example of the multilayer ceramic capacitor 1 of the present preferred embodiment will be described. In the following description, the same components as those of the above preferred embodiment are denoted by the same reference numerals, and a detailed description thereof is omitted. FIG. 14A is a diagram showing a fifth modified example of the multilayer ceramic capacitor 1 of the present preferred embodiment, and corresponding to FIG. 2. FIG. 14B is an arrow view when viewing the first main surface TS1 of the multilayer ceramic capacitor 1 shown in FIG. 14A along the direction of the arrow XIVB. FIG. 14C is an arrow view when viewing the third side surface WS1 of the multilayer ceramic capacitor 1 shown in FIG. 14B along the direction of the arrow XIVC.

In the present modified example, the first external electrode 40A extends from the first side surface LS1 to a portion of the first main surface TS1 and a portion of the second main surface TS2, and further to a portion of the third side surface WS1 and a portion of the fourth side surface WS2. In other words, the first external electrode 40A is provided on five surfaces including the first side surface LS1, the first main surface TS1, the second main surface TS2, the third side surface WS1, and the fourth side surface WS2.

In the present modified example, the second external electrode 40B extends from the second side surface LS2 to a portion of the first main surface TS1 and a portion of the second main surface TS2, and further to a portion of the third side surface WS1 and a portion of the fourth side surface WS2. In other words, the second external electrodes 40B are provided on five surfaces including the second side surface LS2, the first main surface TS1, the second main surface TS2, the third side surface WS1, and the fourth side surface WS2.

In the present modified example, as shown in FIG. 14C, the third side surface WS1 of the multilayer body 10 includes a plurality of fifth regions A5 covered by the first external electrode 40A and the second external electrode 40B defining and functioning as a plurality of external electrodes 40. The third side surface WS1 of the multilayer body 10 includes a sixth region A6 exposed from the first external electrode 40A and the second external electrode 40B defining and functioning as the plurality of external electrodes 40.

In the present modified example, the plurality of fifth regions A5 are divided into a region WS1A covered by the first external electrode 40A, and a region WS1B covered by the second external electrode 40B. That is, the plurality of fifth regions A5 are separated into two regions in the length direction L, which are the region WS1A located in the vicinity of the first side surface LS1 and the region WS1B located in the vicinity of the second side surface LS2. The sixth region A6 is provided between the plurality of fifth regions A5 so as to separate the plurality of fifth regions A5.

Furthermore, in the present modified example, as shown in FIG. 14A, the fourth side surface WS2 of the multilayer body 10 includes a plurality of seventh regions A7 covered with the first external electrode 40A and the second external electrode 40B defining and functioning as the plurality of external electrodes 40. Furthermore, the fourth side surface WS2 of the multilayer body 10 includes an eighth region A8 exposed from the first external electrode 40A and the second external electrode 40B defining and functioning as the plurality of external electrodes 40.

In the present modified example, the plurality of seventh regions A7 are divided into a region WS2A covered by the first external electrode 40A, and a region WS2B covered by the second external electrode 40B. That is, the plurality of seventh regions A7 are separated into two regions in the length L direction, which are the region WS2A located in the vicinity of the first side surface LS1 and the region WS2B located in the vicinity of the second side surface LS2. Furthermore, the eighth region A8 is provided between the plurality of seventh regions A7 so as to separate the plurality of seventh regions A7.

In the present modified example, as in the fourth modified example, the plurality of recesses 80 each having a spherical curved surface having a mean inlet size of about 0.3 μm or more and about 10.5 μm or less, for example, are provided in the first region A1 on the first main surface TS1 of the multilayer body 10 and in the third region A3 on the second main surface TS2 of the multilayer body 10. Therefore, the same advantageous effects as in the fourth modified example can be obtained.

Furthermore, in the present modified example, the plurality of recesses 80 each having a spherical curved surface having a mean inlet size of about 0.3 μm or more and about 10.5 μm or less, for example, similar to the recesses provided in the first region A1, are provided in the fifth region A5 on the third side surface WS1 of the multilayer body 10 and the seventh region A7 on the fourth side surface WS2 of the multilayer body 10. Therefore, even in this portion, it is possible to ensure the anchor effect between the external electrode 40 and the multilayer body 10, and to increase the adhesion strength between the external electrode 40 and the multilayer body 10. As a result, it is possible to reduce or prevent a decrease in the moisture resistance of the multilayer ceramic capacitor 1. In the present modified example, it is preferable that the area ratio R occupied by the openings of the plurality of recesses 80 in the fifth region A5 and the seventh region A7 is also about 52% or more, for example. It is preferable that other aspects such as the depth of the recess 80 are the same or substantially the same as those of the recess provided in the first region A1.

In addition, the formation of the plurality of recesses 80 in the fifth region A5 and the seventh region A7 can be performed by, after the laminate chip is cut out, crimping a transfer plate having a concavo-convex pattern on its surface to a portion of the laminate chip where the recesses are to be formed.

With the configuration of the present modified example, when mounting the multilayer ceramic capacitor 1, it is possible to draw up the solder to the third side surface WS1 and the fourth side surface WS2. Therefore, it is possible to further improve the self-alignment property and the adhesion at the time of reflow mounting.

Hereinafter, a sixth modified example of the multilayer ceramic capacitor 1 according to the present preferred embodiment will be explained. In the following description, the same components as those of the above-described preferred embodiment are denoted by the same reference numerals, and a detailed description thereof is omitted. FIG. 15 is a diagram showing a sixth modified example of the multilayer ceramic capacitor 1 of the present preferred embodiment, and corresponding to FIG. 2.

In the present modified example, the first external electrodes 40A are provided not only on a portion of the first side surface LS1 and the first main surface TS1, but also on a portion of the third side surface WS1 and the fourth side surface WS2. In other words, the first external electrodes 40A are provided on the four surfaces of the first side surface LS1, the first main surface TS1, the third side surface WS1, and the fourth side surface WS2.

In the present modified example, the second external electrode 40B is provided, not only on a portion on the second side surface LS2 and the first main surface TS1, but also on a portion of the third side surface WS1 and the fourth side surface WS2. In other words, the second external electrodes 40B are provided on the four surfaces of the second side surface LS2, the first main surface TS1, the third side surface WS1, and the fourth side surface WS2.

Also in the present modified example, the first main surface TS1 of the multilayer body 10 includes a plurality of first regions A1 covered with the first external electrode 40A and the second external electrode 40B as a plurality of external electrodes 40. In the first region A1 on the first main surface TS1 of the multilayer body 10, a plurality of recesses 80 having a spherical curved surface having a mean inlet size of about 0.3 µm or more and about 10.5 µm or less, for example, which are shown in the above-described preferred embodiment, are provided. Therefore, to ensure the anchor effect between the external electrode 40 and the multilayer body 10, it is possible to increase the adhesion strength between the external electrode 40 and the multilayer body 10. As a result, it is possible to reduce or prevent a decrease in the moisture resistance of the multilayer ceramic capacitor 1. Also in the present modified example, it is preferable that the area ratio R occupied by the openings of the plurality of recesses 80 in the first region A1 is about 52% or more, for example. It is preferable that other aspects such as the depth of the recess 80 are the same or substantially the same as those in the above preferred embodiment.

Also in the present modified example, as in the fifth modified example, a plurality of recesses 80 having spherical curved surfaces having a mean inlet size of about 0.3 µm or more and about 10.5 µm or less, for example, are provided in the fifth region A5 on the third side surface WS1 of the multilayer body 10 and in the seventh region A7 on the fourth side surface WS2 of the multilayer body 10, similarly to the recesses provided in the first region A1. Therefore, even in this portion, to ensure the anchor effect between the external electrode 40 and the multilayer body 10, it is possible to increase the adhesion strength between the external electrode 40 and the multilayer body 10. As a result, it is possible to reduce or prevent a decrease in the moisture resistance of the multilayer ceramic capacitor 1.

Even in the configuration of the present modified example, when mounting the multilayer ceramic capacitor 1, it is possible to draw up the solder to the third side surface WS1 and the fourth side surface WS2. Therefore, the self-alignment property and the adhesion at the time of reflow mounting can be further improved. Furthermore, in the present modified example, the external electrode 40 is not provided on the second main surface TS2. Therefore, it is possible to reduce the height of the multilayer ceramic capacitor 1 and to increase the volume of the effective portion of the internal electrode layer 30 of the multilayer ceramic capacitor 1 by the thickness of the external electrode 40 which is omitted, such that it is possible to improve the degrees of freedom in design of the multilayer ceramic capacitor 1.

According to the multilayer ceramic capacitor 1 of the present preferred embodiment, the following advantageous effects are achieved.

(1) The multilayer ceramic capacitor 1 of the present preferred embodiment includes the multilayer body 10 including the plurality of laminated dielectric layers 20 and the plurality of laminated internal electrode layers 30, the multilayer body 10 further including the first main surface TS1 and the second main surface TS2 which oppose each other in the lamination direction, the first side surface LS1 and the second side surface LS2 which oppose each other in the length direction perpendicular or substantially perpendicular to the lamination direction, and the third side surface WS1 and the fourth side surface WS2 which oppose each other in the width direction perpendicular or substantially perpendicular to the lamination direction and the length direction, and the plurality of external electrodes 40 provided on a portion of the side surface including the four side surfaces LS1, LS2, WS1, and WS2, and on a portion of the first main surface TS1, the first main surface TS1 further including the plurality of first regions A1 covered with the plurality of external electrodes 40 and the second region A2 exposed from the plurality of external electrodes 40, the plurality of first regions A1 of the first main surface TS1, each including the plurality of recesses 80 provided therein, the plurality of recesses 80 provided in each of the plurality of first regions A1, each including a spherical curved wall surface, and the plurality of recesses 80 provided in each of the plurality of first regions A1, each having the average inlet size of about 0.3 µm or more and about 10.5 µm or less. With such a configuration, it is possible to ensure the anchor effect between the external electrode 40 and the multilayer body 10, such that it is possible to increase the adhesion strength between the external electrode 40 and the multilayer body 10. As a result, it is possible to reduce or prevent a decrease in the moisture resistance of the multilayer ceramic capacitor 1.

(2) In the multilayer ceramic capacitor 1 according to the present preferred embodiment, in each of the plurality of first regions A1, the area ratio occupied by the openings of the plurality of recesses 80 is about 52% or more. With such a configuration, the anchor effect between the external electrode 40 and the multilayer body 10 is increased, such that it is possible to further increase the adhesion strength between the external electrode 40 and the multilayer body 10.

(3) In the multilayer ceramic capacitor 1 according to the present preferred embodiment, each of the plurality of external electrodes 40 is provided on a portion of the second main surface TS2, the second main surface TS2 further includes the plurality of third regions A3 covered by the plurality of external electrodes 40 and the fourth region A4 exposed from the plurality of external electrodes 40, the plurality of third regions A3 of the second main surface TS2 each include the plurality of recesses 80 provided therein, the plurality of recesses 80 provided in each of the plurality of third regions A3 each include a spherical curved wall surface, and the plurality of recesses provided in each of the plurality of third regions A3 each have the average inlet size of about 0.3 µm or more and about 10.5 µm or less. With such a configuration, even in the third region A3, it is possible to ensure the anchor effect between the external electrode 40 and the multilayer body 10, such that it is possible to increase the adhesion strength between the external electrode 40 and the multilayer body 10. As a result, it is possible to reduce or prevent a decrease in the moisture resistance of the multilayer ceramic capacitor 1.

(4) In the multilayer ceramic capacitor 1 according to the present preferred embodiment, in each of the plurality of third regions A3, the area ratio occupied by the openings of the plurality of recesses 80 is about 52% or more. With such a configuration, the anchor effect between the external electrode 40 and the multilayer body 10 is increased, such that it is possible to further increase the adhesion strength between the external electrode 40 and the multilayer body 10.

(5) In the multilayer ceramic capacitor 1 according to the present preferred embodiment, each of the plurality of external electrodes 40 is provided on a portion of the third side surface WS1, the third side surface WS1 further includes the plurality of fifth regions A5 covered by the plurality of external electrodes 40 and the sixth region A6 exposed from the plurality of external electrodes 40, the plurality of fifth regions A5 of the third side surface WS1 each include the plurality of recesses 80 provided therein, the plurality of recesses 80 provided in each of the plurality of fifth regions A5 each include a spherical curved wall surface, and the plurality of recesses 80 provided in each of the plurality of fifth regions A5 each have the average inlet size of about 0.3 µm or more and about 10.5 µm or less. With such a configuration, even in the fifth region A5, it is possible to ensure the anchor effect between the external electrode 40 and the multilayer body 10, such that it is possible to increase the adhesion strength between the external electrode 40 and the multilayer body 10. As a result, it is possible to reduce or prevent a decrease in the moisture resistance of the multilayer ceramic capacitor 1.

(6) In the multilayer ceramic capacitor 1 according to the present preferred embodiment, in each of the plurality of fifth regions A5, the area ratio occupied by the openings of the plurality of recesses 80 is about 52% or more. With such a configuration, the anchor effect between the external electrode 40 and the multilayer body 10 is increased, such that it is possible to further increase the adhesion strength between the external electrode 40 and the multilayer body 10.

(7) In the multilayer ceramic capacitor 1 according to the present preferred embodiment, each of the plurality of external electrodes 40 is provided on a portion of the fourth side surface WS2, the fourth side surface WS2 further includes the plurality of seventh regions A7 covered by the plurality of external electrodes 40 and the eighth region A8 exposed from the plurality of external electrodes 40, the plurality of seventh regions A7 of the fourth side surface WS2 each include the plurality of recesses 80 provided therein, the plurality of recesses 80 provided in each of the plurality of seventh regions A7 each include a spherical curved wall surface, and the plurality of recesses provided in each of the plurality of seventh regions A7 each have the average inlet size of about 0.3 µm or more and about 10.5 µm or less. With such a configuration, even in the seventh region A7, it is possible to ensure the anchor effect between the external electrode 40 and the multilayer body 10, such that it is possible to increase the adhesion strength between the external electrode 40 and the multilayer body 10. As a result, it is possible to reduce or prevent a decrease in the moisture resistance of the multilayer ceramic capacitor 1.

(8) In the multilayer ceramic capacitor 1 according to the present preferred embodiment, in each of the plurality of seventh regions A7, the area ratio occupied by the openings of the plurality of recesses 80 is about 52% or more. With such a configuration, the anchor effect between the external electrode 40 and the multilayer body 10 is increased, such that it is possible to further increase the adhesion strength between the external electrode 40 and the multilayer body 10.

(9) In the multilayer ceramic capacitor 1 according to the present preferred embodiment, the plurality of external electrodes 40 includes the first external electrode 40A and the second external electrode 40B, the first external electrode 40A is provided at least on a portion of the first side surface LS1 and a portion of the first main surface TS1, the second external electrode 40B is provided at least on a portion of the second side surface LS2 and a portion of the first main surface TS1, and the plurality of first regions A1 includes the first region TS1A covered with the first external electrode 40A in the vicinity of the first side surface LS1, and the first region TS1B covered with the second external electrode 40B in the vicinity of the second side surface LS2. Even in a multilayer ceramic capacitor including two such external electrodes 40, it is possible to achieve the advantageous effects of the present disclosure.

(10) In the multilayer ceramic capacitor 1 according to the present preferred embodiment, the ceramic particles included in the dielectric layers 20 have the average particle size of about 0.1 µm or more and about 1 µm or less. With such a configuration, it is possible to reduce the thickness of the dielectric layer 20 of the multilayer ceramic capacitor 1, such that it is possible to obtain the large multilayer ceramic capacitor 1 having a large capacitance density per volume.

(11) In the multilayer ceramic capacitor 1 according to the present preferred embodiment, in the plurality of first regions A1, the plurality of recesses 80 have the average inlet size of about twice or more and about 20 times or less the average particle size of the ceramic particles included in the dielectric layers 20. With such a configuration, it is possible to appropriately provide the recesses 80, and furthermore, it is possible to reduce or prevent the stress concentration on the multilayer body 10, while ensuring the anchor effect between the external electrode 40 and the multilayer body 10. Therefore, it is possible to achieve both the adhesion strength between the external electrode 40 and the multilayer body 10 and the strength of the multilayer body 10.

(12) In the multilayer ceramic capacitor 1 according to the present preferred embodiment, the plurality of internal electrode layers 30 include the plurality of first internal electrode layers 31 and the plurality of second internal electrode layers 32, the multilayer body 10 includes the plurality of dielectric layers 20 sandwiched between the first internal electrode layer 31 and the second internal electrode layer 32, and in the plurality of first regions A1, the plurality of recesses 80 have the average inlet size of about 0.2 times or more and about 5 times or less the thickness of the dielectric layers 20. With such a configuration, it is possible to use appropriate ceramic particles, each having a smaller average particle size, and thus it is possible to appropriately provide the recesses 80 while increasing the capacitance density by reducing the thickness of the dielectric layer 20 sandwiched between the first internal electrode layer 31 and the second internal electrode layer 32. Therefore, it is possible to ensure the capacitance density per volume of the multilayer ceramic capacitor 1, and ensure the adhesion strength between the external electrode 40 and the multilayer body 10.

(13) In the multilayer ceramic capacitor 1 according to the present preferred embodiment, in the first regions A1, the plurality of recesses 80 have the average depth of about 0.1 μm or more and about 5 μm or less. With such a configuration, it is possible to reduce or prevent the stress concentration on the multilayer body 10 while ensuring the anchor effect between the external electrode 40 and the multilayer body 10, such that it is possible to achieve both the strength of the multilayer body 10 and the adhesion strength and the multilayer body 10 between the external electrode 40.

(14) In the multilayer ceramic capacitor 1 according to the present preferred embodiment, the plurality of external electrodes 40 each include at least the base electrode layer 50 provided in close contact with the plurality of first regions A1 of the first main surface TS1, and an outer electrode layer covering the base electrode layer 50, and the plurality of recesses 80 provided in each of the plurality of first regions A1 have the average depth which is larger than the thickness of the base electrode layer 50, and smaller than the thickness of the outer electrode layer. With such a configuration, it is possible to increase the anchor effect between the plated layer 60 included in the outer electrode layer and the plurality of recesses 80 of the multilayer body 10 in which the base electrode layer 50 is coated, while increasing the adhesion force by increasing the surface of the multilayer body 10 and the contact area of the thin film layer 51 included in the base electrode layer 50, such that it is possible to increase the adhesion strength between the external electrode 40 and the multilayer body 10 as a whole.

(15) In the multilayer ceramic capacitor 1 according to the present preferred embodiment, the plurality of recesses 80 provided in each of the first regions A1 include recesses having an inlet size larger than the average inlet size and recesses having an inlet size smaller than the average inlet size, and the average depth of the recesses having an inlet size smaller than the average inlet size is smaller than the average depth of the recesses having an inlet size larger than the average inlet size. Thus, it is possible to appropriately adjust the anchor effect between the external electrode 40 and the multilayer body 10.

Second Preferred Embodiment

Hereinafter, a multilayer ceramic capacitor 1 according to a second preferred embodiment of the present invention will be described. In the following, the same or corresponding components as those of the first preferred embodiment are denoted by the same reference numerals, and the detailed descriptions thereof are omitted. FIG. 16A is a diagram showing a state in which the multilayer ceramic capacitor 1 of the present preferred embodiment is embedded in a component built-in board 300. FIG. 16B is an enlarged view of an XVIB portion in FIG. 16A, and is an enlarged cross-sectional view schematically showing a microscopic cross-sectional shape in the vicinity of the surface layer portion of the second region A2 of the multilayer body 10.

The multilayer ceramic capacitor 1 of the present preferred embodiment includes a plurality of recesses 80 not only on the surface of the multilayer body 10 on which the first external electrode 40A and the second external electrode 40B defining and functioning as a plurality of external electrodes are provided, but also on the surface of the multilayer body 10 on which the first external electrode 40A and the second external electrode 40B defining and functioning as a plurality of external electrodes are not provided.

As shown in FIG. 16A, the component built-in board 300 includes the multilayer ceramic capacitor 1, and a board 301 including the multilayer ceramic capacitor 1 therein. The board 301 includes a core material 310 mainly made of resin, and a via hole conductor 320.

The material included in the core material 310 is, for example, glass epoxy resin. However, the material included in the core material 310 is not limited to a glass epoxy resin. For example, it may be a polyimide resin or the like.

The via hole conductor 320 electrically connects the external electrode 40 of the multilayer ceramic capacitor 1, with a wiring pattern (not shown) printed on the board 301. The metal included in the via hole conductor 320 is, for example, Cu. However, the metal included in the via hole conductor 320 is not limited to Cu, and may be, for example, Au, Pt, or the like.

The external electrode 40 of the multilayer ceramic capacitor 1 may be the same or substantially the same as that of the first preferred embodiment. However, the external electrode 40 preferably includes an outermost layer formed by Cu plating.

The first external electrode 40A includes a first base electrode layer 50A and a first plated layer 60A. For example, the first base electrode layer 50A may include a first thin film layer 51A, and the first plated layer 60A may include a first Cu plated layer 61A.

The second external electrode 40B includes a second base electrode layer 50B and a second plated layer 60B. For example, the second base electrode layer 50B may include a second thin film layer 51B, and the second plated layer 60B may include a second Cu plated layer 61B.

Thus, for example, in a case of forming the via hole conductor 320 with Cu, the external electrode 40 and the via hole conductor 320 include the same or substantially the same type of metal. Therefore, the connection resistance of both of the connection portions is reduced, and it is possible to reduce or prevent deterioration of the board characteristics.

Similar to the first preferred embodiment, the first main surface TS1 of the multilayer body 10 includes a second region A2 exposed from the first external electrodes 40A and the second external electrodes 40B defining and functioning as the plurality of external electrodes 40.

In the present preferred embodiment, as shown in FIG. 16B, a plurality of recesses 80 each having a spherical curved surface having a mean inlet size of about 0.3 µm or more and about 10.5 µm or less, for example, similar to the recesses provided in the first region A1, are also provided in the second region A2 on the first main surface TS1 of the multilayer body 10. Therefore, in this portion, it is possible to ensure the anchor effect between the core material 310 included in the board 301 and the multilayer body 10, and increase the adhesion strength between the core material and the multilayer body 10. In addition, in the present modified example, it is preferable that the area ratio R occupied by the openings of the plurality of recesses 80 in the second region A2 is also about 52% or more, for example. It is preferable that other aspects such as the depth of the recess 80 are the same or substantially the same as those of the recess provided in the first region A1.

As described above, it is preferable that the plurality of recesses 80 are also provided on the surface of the multilayer body 10 on which the first external electrode 40A and the second external electrode 40B defining and functioning as the plurality of external electrodes are not provided. With such a configuration, even when used in applications such as embedding the multilayer ceramic capacitor 1 in the component built-in board or a high-density package, it is still possible to ensure the adhesion strength between the external electrode 40 and the multilayer body 10. In addition, even between the surface of the multilayer body 10 and a sealing agent, such as a resin, used for a component built-in board or a high-density package, the adhesion strength can be improved by the anchor effect. Therefore, it is possible to further improve the moisture resistance of the multilayer ceramic capacitor 1.

In addition, the plurality of recesses 80 each having a spherical curved surface having a mean inlet size of about 0.3 µm or more and about 10.5 µm or less, for example, similar to the recesses provided in the first region A1, may also be provided on the second main surface TS2 of the multilayer body 10. In addition, the plurality of recesses 80 each having a spherical curved surface having a mean inlet size of about 0.3 µm or more and about 10.5 µm or less, for example, similar to the recesses provided in the first region A1, may be provided on the third side surface WS1 and the fourth side surface WS2 of the multilayer body 10. As a result, the adhesion strength can be improved by the anchor effect between the surface of the multilayer body 10 and the sealing agent such as a resin used for the component built-in board or the high-density package.

In addition, in the multilayer ceramic capacitor 1 of the mode shown in FIGS. 13A and 13B and FIGS. 14A to 14C as the modified examples of the first preferred embodiment, the plurality of recesses 80 each having a spherical curved surface having a mean inlet size of about 0.3 µm or more and about 10.5 µm or less, for example, similar to the recesses provided in the first region A1, may be provided in the fourth region A4 on the second main surface TS2. Furthermore, in the multilayer ceramic capacitor 1 of the mode shown in FIGS. 14A to 14C and FIG. 15 as the modified examples of the first preferred embodiment, the plurality of recesses 80 each having a spherical curved surface having a mean inlet size of about 0.3 µm or more and about 10.5 µm or less, for example, similar to the recesses provided in the first region A1, may be provided in the sixth region A6 of the third side surface WS1 and the eighth region A8 of the fourth side surface WS2. As a result, the adhesion strength can be improved by the anchor effect between the surface of the multilayer body 10 and the sealing agent such as a resin used for the component built-in board or the high-density package.

According to the multilayer ceramic capacitor 1 of the present preferred embodiment, the following advantageous effects are obtained in addition to the above-described (1) to (15).

(16) In the multilayer ceramic capacitor 1 according to the present preferred embodiment, the second region A2 in addition to the plurality of first regions A1 includes the plurality of recesses 80 provided therein, the plurality of recesses 80 provided in the second region A2 each include a spherical curved wall surface, and the plurality of recesses 80 provided in the second region A2 each have the average inlet size of about 0.3 µm or more and about 10.5 µm or less. With such a configuration, even when used in applications such as embedding the multilayer ceramic capacitor 1 in the component built-in board or a high-density package, it is possible to ensure the adhesion strength between the external electrode 40 and the multilayer body 10. In addition, even between the surface of the multilayer body 10 and a sealing agent such as a resin used for a component built-in board or a high-density package, the adhesion strength can be improved by the anchor effect.

(17) In the multilayer ceramic capacitor 1 according to the present preferred embodiment, in the second region A2, the area ratio occupied by the openings of the plurality of recesses 80 is about 52% or more. As a result, the anchor effect is improved even between the surface of the multilayer body 10 and the sealing agent such as a resin used for the component built-in board or the high-density package, such that the adhesion strength can be improved.

(18) In the multilayer ceramic capacitor 1 according to the present preferred embodiment, the fourth region A4 in addition to the plurality of third regions A3 includes the plurality of recesses 80 provided therein, the plurality of recesses 80 provided in the fourth region A4 each include a spherical curved wall surface, and the plurality of recesses 80 provided in the fourth region A4 each have the average inlet size of about 0.3 µm or more and about 10.5 µm or less. With such a configuration, even when used in applications such as embedding the multilayer ceramic capacitor 1 in the component built-in board or a high-density package, it is possible to ensure the adhesion strength between the external electrode 40 and the multilayer body 10. In addition, even between the surface of the multilayer body 10 and a sealing agent such as a resin used for a component built-in board or a high-density package, the adhesion strength can be improved by the anchor effect.

(19) In the multilayer ceramic capacitor 1 according to the present preferred embodiment, in the fourth region A4, the area ratio occupied by openings of the plurality of recesses 80 is about 52% or more. With such a configuration, the anchor effect is improved even between the surface of the multilayer body 10 and the sealing agent such as a resin used for the component built-in board or the high-density package, such that the adhesion strength can be improved.

Third Preferred Embodiment

Figure 17:
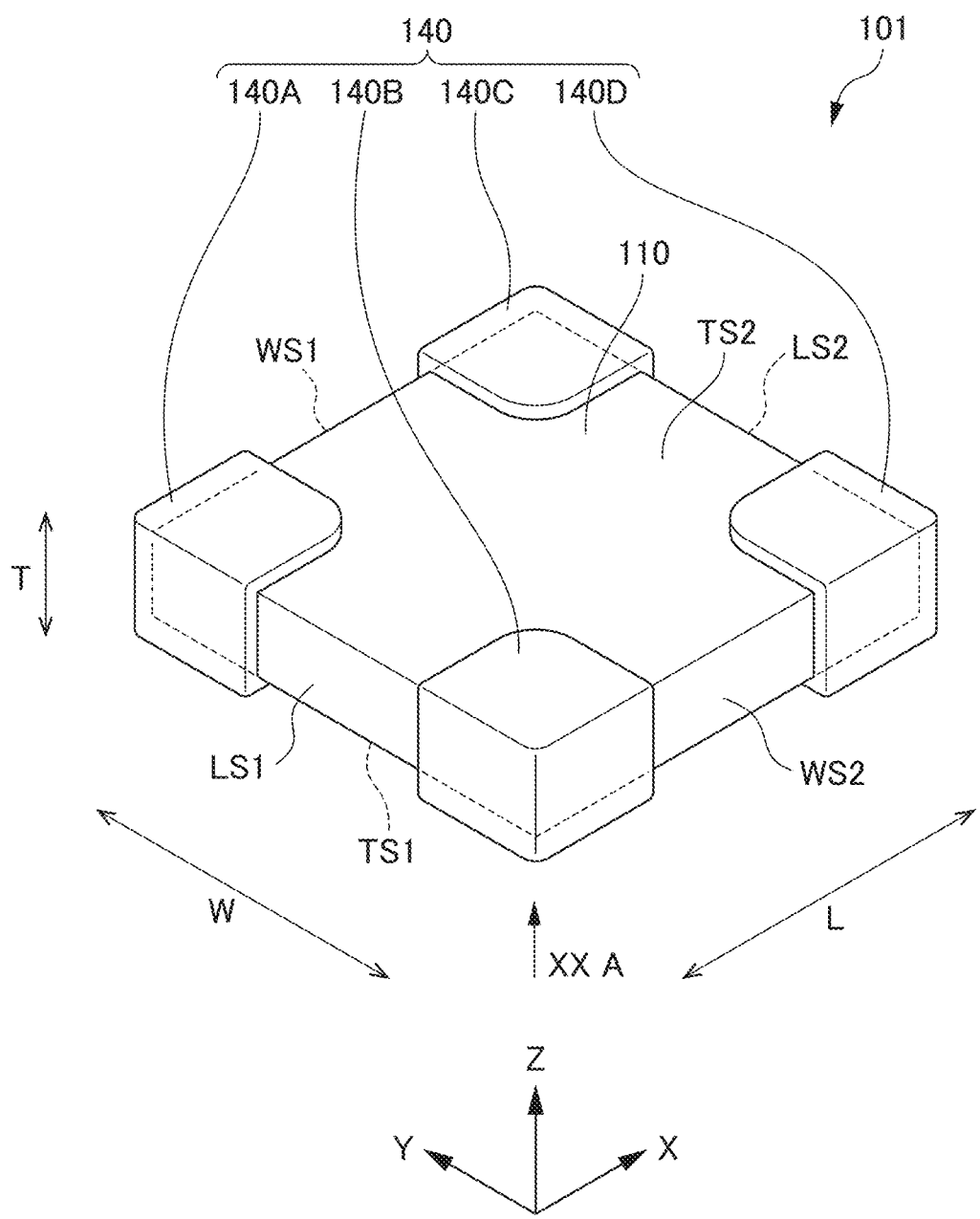
FIG. 17 is an external perspective view of a multilayer ceramic capacitor according to a third preferred embodiment of the present invention.
Figure 18:
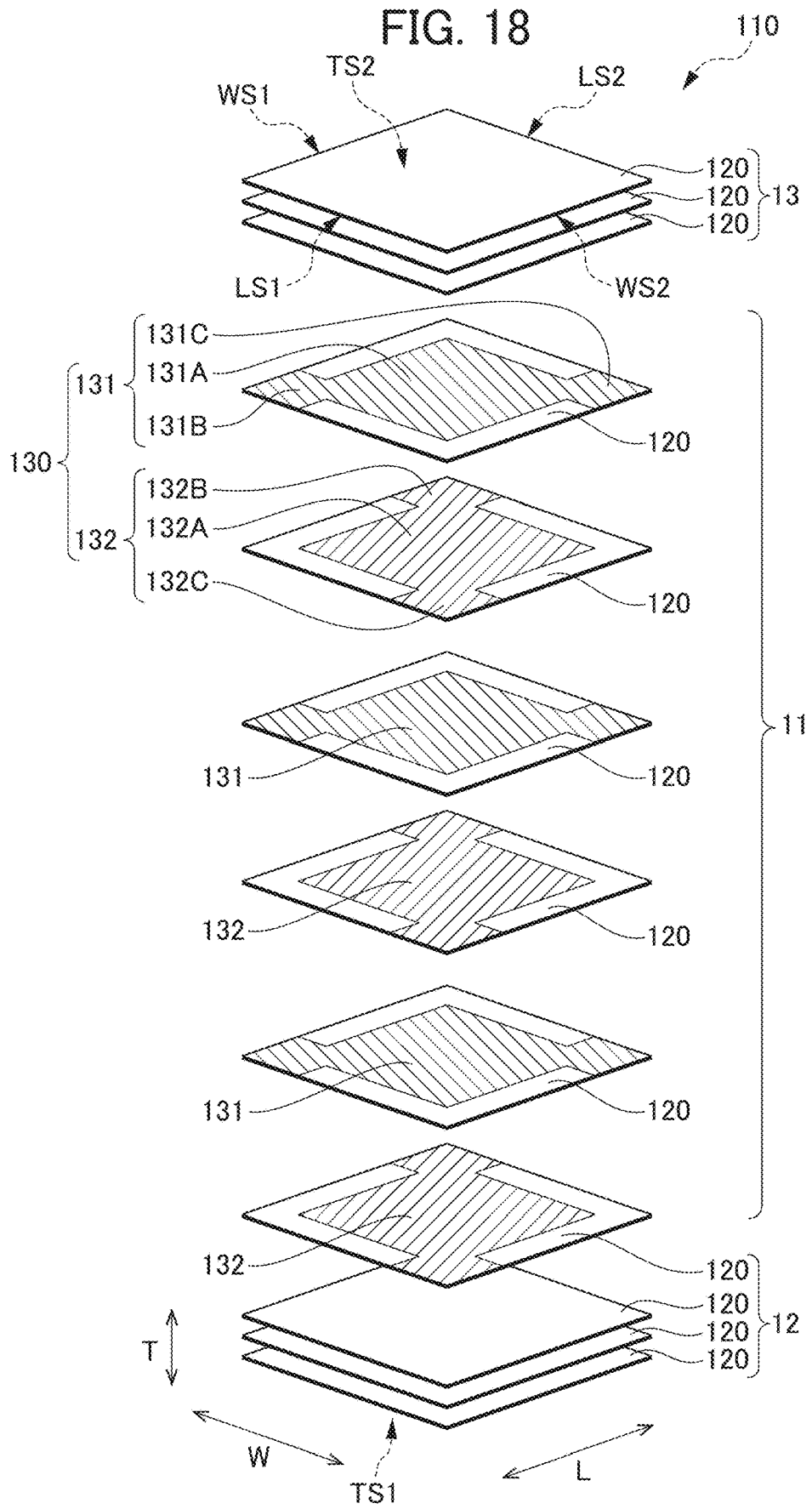
FIG. 18 is an exploded perspective view of the multilayer body included in the multilayer ceramic capacitor according to the third preferred embodiment of the present invention.
Figure 19:
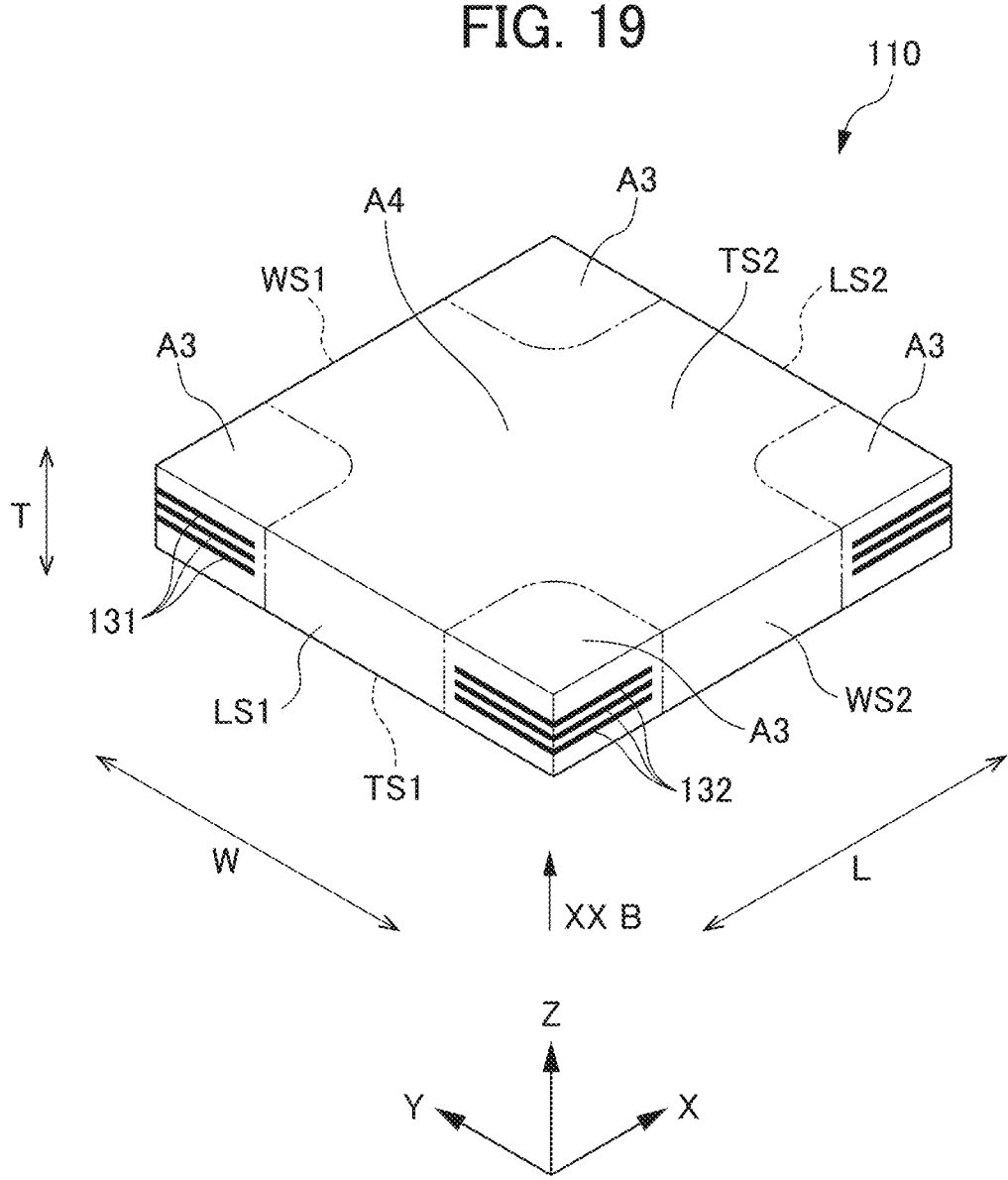
FIG. 19 is an external perspective view of the multilayer body included in the multilayer ceramic capacitor according to the third preferred embodiment of the present invention.
Figure 20A:
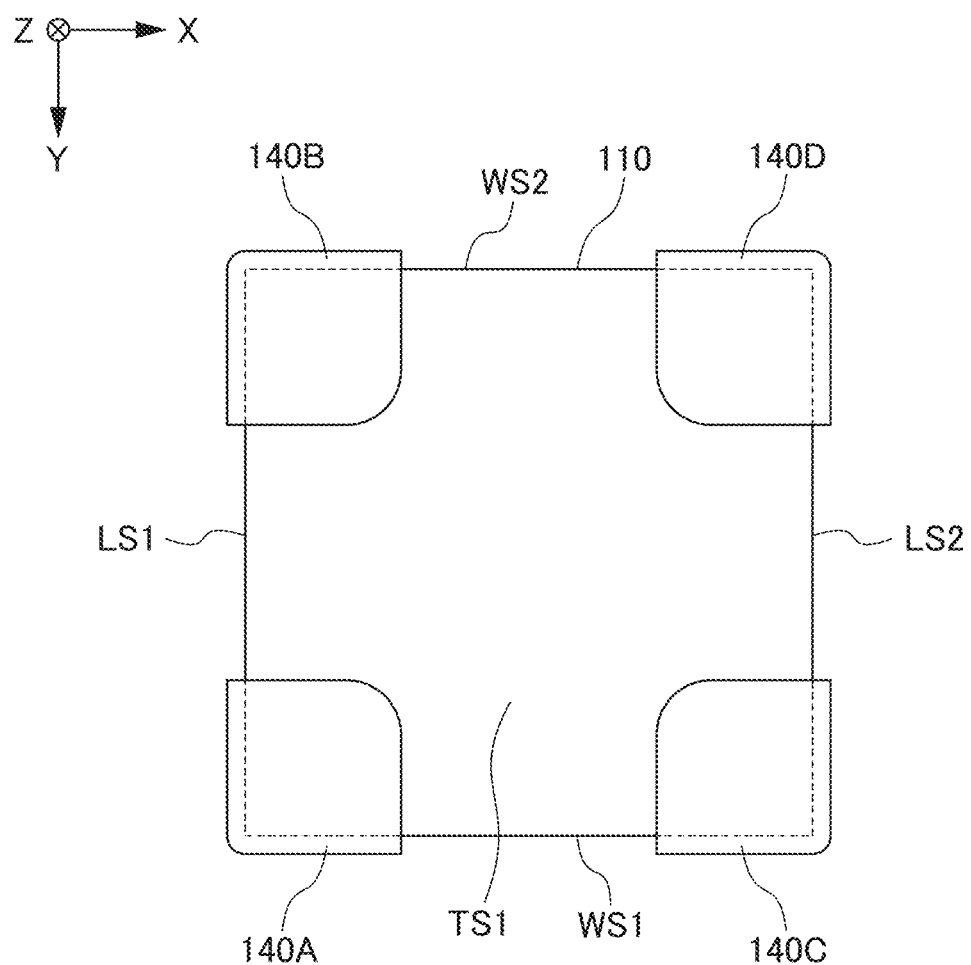
FIG. 20A is an arrow view when viewing the first main surface of the multilayer ceramic capacitor shown in FIG. 17 along the direction of the arrow XXA.

Hereinafter, a multilayer ceramic capacitor 1 according to a third preferred embodiment of the present invention will be described. In the following description, a detailed description for the same or substantially the same configuration as that of the first preferred embodiment is omitted. FIG. 17 is an external perspective view of a multilayer ceramic capacitor 101 according to the present preferred embodiment. FIG. 18 is an exploded perspective view of the multilayer body 110 included in the multilayer ceramic capacitor 101 of the present preferred embodiment. FIG. 19 is an external perspective view of the multilayer body 110 included in the multilayer ceramic capacitor 101 of the present preferred embodiment. FIG. 20A is an arrow view when viewing a first main surface TS1 of the multilayer ceramic capacitor 101 shown in FIG. 17 in the direction along the arrow XXA. FIG. 20B is an arrow view when viewing the first main surface TS1 of the multilayer body 110 shown in FIG. 19 along the direction of the arrow XXB. FIGS. 20A and 20B illustrate that a third side surface WS1 is provided on the lower side thereof.

The multilayer ceramic capacitor 101 of the present preferred embodiment is different from the first preferred embodiment in aspects such as the shapes of a multilayer body 110 and external electrodes 140.

The multilayer ceramic capacitor 101 includes the multilayer body 110 and external electrodes 140.

As shown in FIGS. 17 to 20B, the multilayer body 110 includes a first main surface TS1 and a second main surface TS2 which oppose each other in the lamination direction T, a first side surface LS1 and a second side surface LS2 which oppose each other in the length direction L perpendicular or substantially perpendicular to the lamination direction T, and a third side surface WS1 and a fourth side surface WS2 which oppose each other in the width direction W perpendicular or substantially perpendicular to the lamination direction T and the length direction L.

The dimensions of the multilayer body 110 are not particularly limited. However, when the dimension in the length direction L of the multilayer body 10 is defined as an L dimension, the dimension in the width direction W of the multilayer body 10 is defined as a W dimension, and the dimension in the lamination direction T of the multilayer body 10 is defined as a T dimension, it is preferable, for example, that the L dimension is about 0.43 mm or more and about 0.73 mm or less, about 0.85≤ (W dimension)/(L dimension)≤ about 1.0, and the T dimension be about 50 μm or more and about 90 μm or less.

When the dimension in the length direction L of the multilayer ceramic capacitor 101 including the external electrode 140 is defined as an LC dimension, the dimension in the width direction W of the multilayer ceramic capacitor 101 including the external electrode 140 is defined as a WC dimension, and the dimension in the lamination direction T of the multilayer ceramic capacitor 101 including the external electrode 140 is defined as a TC dimension, it is preferable that the LC dimension is about 0.45 mm or more and about 0.75 mm or less, about 0.85≤ (WC dimension)/(LC dimension)≤about 1.0, and the T dimension is preferably about 70 μm or more about 110 μm or less, for example.

As shown in FIG. 18, the multilayer body 110 includes an inner layer portion 11, and a first main surface-side outer layer portion 12 and a second main surface-side outer layer portion 13 provided so as to sandwich the inner layer portion 11 in the lamination direction T.

The inner layer portion 11 includes a plurality of dielectric layers 120 and a plurality of internal electrode layers 130. In the lamination direction T, the inner layer portion 11 includes internal electrode layers 130 from the internal electrode layer 130 located closest to the first main surface TS1 to the internal electrode layer 130 located closest to the second main surface TS2. In the inner layer portion 11, a plurality of internal electrode layers 130 oppose each other with the dielectric layer 120 interposed therebetween.

The plurality of internal electrode layers 130 include a plurality of first internal electrode layers 131 and a plurality of second internal electrode layers 132. The plurality of first internal electrode layers 131 are each provided on the dielectric layer 120. The plurality of second internal electrode layers 132 are each provided on the dielectric layer 120. The plurality of first internal electrode layers 131 and the plurality of second internal electrode layers 132 are alternately provided via a dielectric layer 120 in the lamination direction T of the multilayer body 10. The first internal electrode layers 131 and the second internal electrode layers 132 each sandwich the dielectric layers 120.

The first internal electrode layer 131 includes a first opposing portion 131A facing the second internal electrode layer 132, a first lead-out portion 131B extending from the first opposing portion 131A to the first side surface LS1 and the third side surface WS1, and a second lead-out portion 131C extending from the first opposing portion 131A to the second side surface LS2 and the fourth side surface WS2. The first lead-out portion 131B is exposed at the first side surface LS1 and the third side surface WS1. The second lead-out portion 131C is exposed at the second side surface LS2 and the fourth side surface WS2.

The second internal electrode layer 132 includes a second opposing portion 132A facing the first internal electrode layer 131, a third lead-out portion 132B extending from the second opposing portion 132A to the second side surface LS2 and the third side surface WS1, and a fourth lead-out portion 132C extending from the second opposing portion 132A to the first side surface LS1 and the fourth side surface WS2. The third lead-out portion 132B is exposed at the second side surface LS2 and the third side surface WS1. The fourth lead-out portion 132C is exposed at the first side surface LS1 and the fourth side surface WS2.

In the present preferred embodiment, the first opposing portion 131A and the second opposing portion 132A oppose each other with the dielectric layers 120 interposed therebetween, such that a capacitance is generated, and the characteristics of a capacitor are provided.

The shape of the first opposing portion 131A is not particularly limited, but is preferably rectangular or substantially rectangular. However, the corners of the rectangular or substantially rectangular shape may be rounded, or the corners of the rectangular or substantially rectangular shape may be slanted. The shapes of the first lead-out portion 131B and the second lead-out portion 131B are not particularly limited, but are preferably rectangular or substantially rectangular such that a portion thereof overlaps with the first opposing portion 131A. However, the corners of the rectangular or substantially rectangular shape may be rounded, or the corners of the rectangular or substantially rectangular shape may be slanted.

The shape of the second opposing portion 132A is not particularly limited, but is preferably rectangular or substantially rectangular. However, the corners of the rectangular or substantially rectangular shape may be rounded, or the corners of the rectangular or substantially rectangular shape may be slanted. The shapes of the third lead-out portion 132B and the fourth lead-out portion 132B are not particularly limited, but are preferably a rectangular or substantially rectangular shape in which a portion thereof overlaps with the second opposing portion 132A. However, the corners of the rectangular or substantially rectangular shape may be rounded, or the corners of the rectangular or substantially rectangular shape may be slanted.

The first main surface-side outer layer portion 12 is located in the vicinity of the first main surface TS1 of the multilayer body 110. The first main surface-side outer layer portion 12 includes a plurality of dielectric layers 120 located between the first main surface TS1 and the internal electrode layer 130 closest to the first main surface TS1.

The second main surface-side outer layer portion 13 is located in the vicinity of the second main surface TS2 of the multilayer body 110. The second main surface-side outer layer portion 13 includes a plurality of dielectric layers 120 located between the second main surface TS2 and the internal electrode layer 130 closest to the second main surface TS2.

The materials of the dielectric layer 120 and the internal electrode layer 130 may be the same or substantially the same as those of the first preferred embodiment. As in the first preferred embodiment, the particle size of the ceramic particles used in the dielectric layer is preferably about 0.1 µm or more and about 1 µm or less, for example. Thus, it is possible to reduce the thickness of the dielectric layer, such that it is possible to obtain a multilayer ceramic capacitor having a large capacitance density per volume.

The external electrode 140 includes a first external electrode 140A, a second external electrode 140B, a third external electrode 140C, and a fourth external electrode 140D. The four external electrodes 140A, 140B, 140C, and 140D are provided in a state of being separated into four corners or substantially four corners when viewing the first main surface TS1 or the second main surface TS2 along the lamination direction T.

The first external electrode 140A is provided on the multilayer body 110. The first external electrode 140A preferably extends from the first side surface LS1 and the third side surface WS1 to a portion of the first main surface TS1 and a portion of the second main surface TS2. That is, it is preferable that the first external electrodes 140A is provided in a portion of the first side surface LS1 in the vicinity of the third side surface WS1, a portion of the third side surface WS1 in the vicinity of the first side surface LS1, a portion of the first main surface TS1, and a portion of the second main surface TS2. The first external electrode 140A may be provided on one of a portion of the first main surface TS1 or a portion of the second main surface TS2, which defines and functions as a mounting surface, instead of both of the main surfaces. In other words, the cross-sectional shape of the first external electrode 140A may be in an L-shape.

The second external electrode 140B is provided on the multilayer body 110. The second external electrode 140B preferably extends from the first side surface LS1 and the fourth side surface WS2 to a portion of the first main surface TS1 and a portion of the second main surface TS2. That is, it is preferable that the second external electrode 140B is provided on a portion of the first side surface LS1 in the vicinity of the fourth side surface WS2, a portion of the fourth side surface WS2 in the vicinity of the first side surface LS1, a portion of the first main surface TS1, and a portion of the second main surface TS2. The second external electrode 140B may be provided not on both main surfaces, but rather on one of a portion of the first main surface TS1 or a portion of the second main surface TS2 defining and functioning as a mounting surface. In other words, the cross-sectional shape of the second external electrode 140B may be in an L-shape.

The third external electrode 140C is provided on the multilayer body 110. The third external electrode 140C preferably extends from the second side surface LS2 and the third side surface WS1 to a portion of the first main surface TS1 and a portion of the second main surface TS2. That is, it is preferable that the third external electrode 140C is provided on a portion of the second side surface LS2 in the vicinity of the third side surface WS1, a portion of the third side surface WS1 in the vicinity of the second side surface LS2 side, a portion of the first main surface TS1, and a portion of the second main surface TS2. The third external electrodes 140C may be provided on one of a portion of the first main surface TS1 or a portion of the second main surface TS2, which defines and functions as a mounting surface, instead of both main surfaces. In other words, the cross-sectional shape of the third external electrode 140C may be in an L-shape.

The fourth external electrode 140D is provided on the multilayer body 110. The fourth external electrode 140D preferably extends from the second side surface LS2 and the fourth side surface WS2 to a portion of the first main surface TS1 and a portion of the second main surface TS2. That is, it is preferable that the second external electrode 140B be provided in a portion of the second side surface LS2 in the vicinity of the fourth side surface WS2 side, a portion of the fourth side surface WS2 in the vicinity of the second side surface LS2 side, a portion of the first main surface TS1, and a portion of the second main surface TS2. The fourth external electrode 140D may be provided on one of a portion of the first main surface TS1 or a portion of the second main surface TS2, which defines and functions as a mounting surface, instead of both main surfaces. In other words, the cross-sectional shape of the fourth external electrode 140D may be in an L-shape.

As shown in FIG. 20B, the first main surface TS1 of the multilayer body 110 includes a plurality of first regions A1 covered with the first external electrode 140A, the second external electrode 140B, the third external electrode 140C, and the fourth external electrode 140D, defining and functioning as the plurality of external electrodes 140. Furthermore, the first main surface TS1 of the multilayer body 110 includes a second region A2 exposed from the first external electrode 140A, the second external electrode 140B, the third external electrode 140C, and the fourth external electrode 140D, defining and functioning as the plurality of external electrodes 140.

In the present preferred embodiment, the plurality of first regions A1 include four separated regions that are covered with the first external electrode 140A, the second external electrode 140B, the third external electrode 140C, and the fourth external electrode 140D, respectively. Furthermore, the second region A2 is provided between the plurality of first regions A1 so as to separate the plurality of first regions A1.

Furthermore, in the present preferred embodiment as well, in the plurality of first regions A1 on the first main surface TS1 of the multilayer body 110, the plurality of recesses 80 each having a spherical curved surface having a mean inlet size of about 0.3 µm or more and about 10.5 µm or less, for example, which are shown in the first preferred embodiment, are provided. Therefore, it is possible to ensure the anchor effect between the external electrode 140 and the multilayer body 110, and to increase the adhesion strength between the external electrode 140 and the multilayer body 110. As a result, it is possible to reduce or prevent a decrease in the moisture resistance of the multilayer ceramic capacitor 101. Also in the present preferred embodiment, it is preferable that, in the first region A1, the area ratio R occupied by the openings of the plurality of recesses 80 is about 52% or more, for example. It is preferable that other aspects such as the depth of the recess 80 are the same or substantially the same as those of the first preferred embodiment.

Furthermore, as in the second preferred embodiment, the plurality of recesses 80 each having a spherical curved surface having a mean inlet size of about 0.3 μm or more and about 10.5 μm or less, similar to the recesses provided in the first region A1, may be provided in the second region A2 on the first main surface TS1 of the multilayer body 110. Thus, it is possible to obtain the same or substantially the same advantageous effects as in the second preferred embodiment.

Also in the present preferred embodiment, as shown in FIG. 19, the second main surface TS2 of the multilayer body 110 includes a plurality of third regions A3 covered with a plurality of external electrodes 140. Furthermore, the second main surface TS2 of the multilayer body 110 includes a fourth area A4 exposed from the plurality of external electrodes 140. Here, as described in the modified examples of the first preferred embodiment, the third region A3 may also be provided with the plurality of recesses 80 each having a spherical curved surface having an average inlet size of about 0.3 μm or more and about 10.5 μm or less, for example, similar to the recesses provided in the first region A1. Furthermore, in the fourth region A4, as described in the second preferred embodiment, the plurality of recesses 80 each having a spherically curved surface having an average inlet size of about 0.3 μm or more and about 10.5 μm or less, for example, similar to the recesses provided in the first region A1, may be provided.

Figure 21:
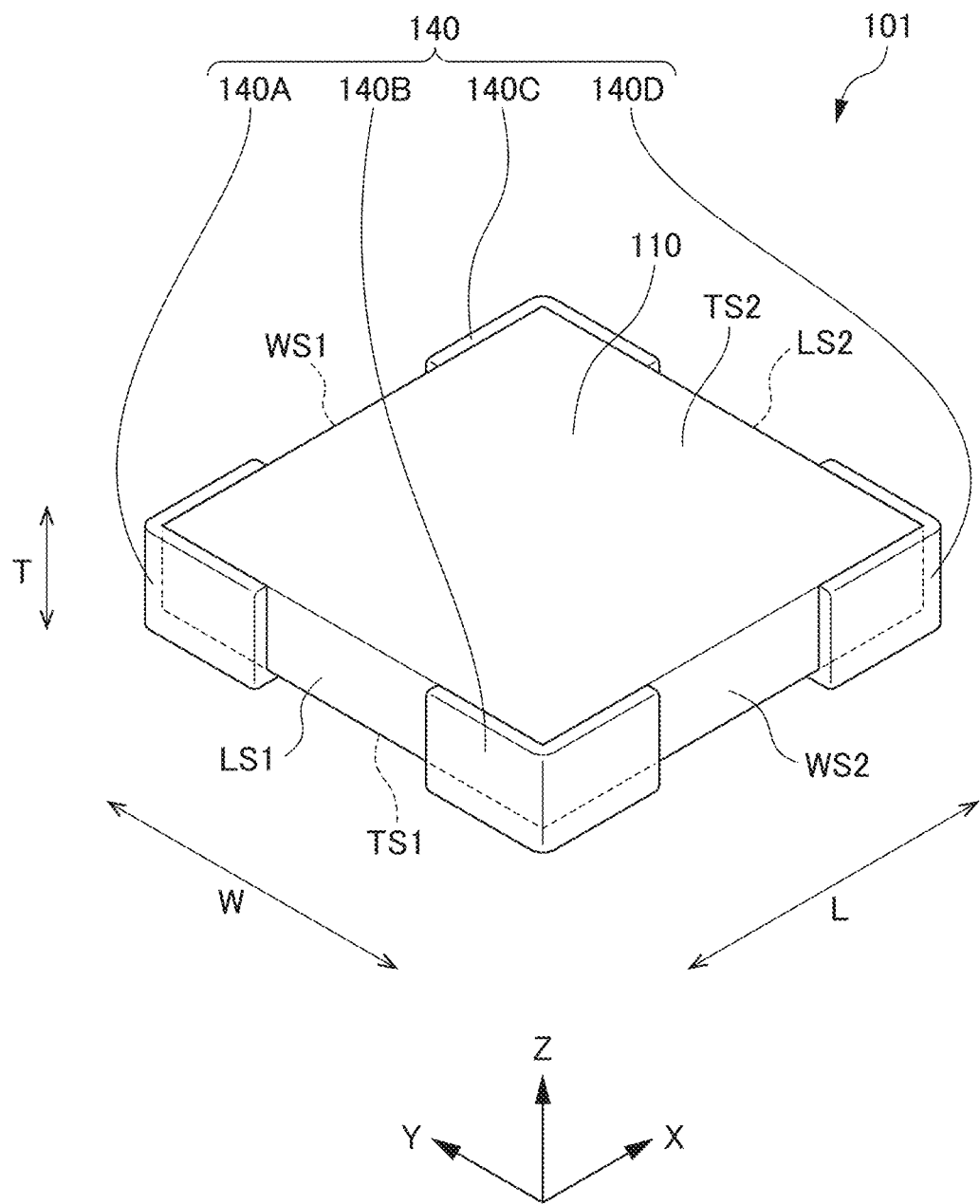
FIG. 21 is an external perspective view of a multilayer ceramic capacitor of a first modified example of a preferred embodiment of the present invention, and corresponding to FIG. 17.

Hereinafter, a first modified example of the multilayer ceramic capacitor 101 of the present preferred embodiment will be described. In the following description, the same or corresponding components as those of the above preferred embodiment are denoted by the same reference numerals, and a detailed description thereof is omitted. FIG. 21 is an external perspective view showing a multilayer ceramic capacitor 101 of the first modified example of the present preferred embodiment, and corresponding to FIG. 17.

In the present modified example, the shapes of external electrodes 140 are different from the above-described preferred embodiment.

In the present modified example, the plurality of external electrodes 140 are provided on portions of the first main surface TS1, but are not provided on the second main surface TS2. That is, a plurality of external electrodes of the present modified example each have an L-shaped cross-sectional shape.

The first external electrode 140A extends from the first side surface LS1 and the third side surface WS1 to a portion of the first main surface TS1.

The second external electrode 140B extends from the first side surface LS1 and the fourth side surface WS2 to a portion of the first main surface TS1.

The third external electrode 140C extends from the second side surface LS2 and the third side surface WS1 to a portion of the first main surface TS1.

The fourth external electrode 140D extends from the second side surface LS2 and the fourth side surface WS2 to a portion of the first main surface TS1.

Also in the present modified example, in the plurality of first regions A1 on the first main surface TS1 of the multilayer body 110, the plurality of recesses 80 each having a spherical curved surface having a mean inlet size of about 0.3 μm or more and about 10.5 μm or less, for example, which are shown in the first preferred embodiment, are provided. Therefore, it is possible to ensure the anchor effect between the external electrode 140 and the multilayer body 110, and to increase the adhesion strength between the external electrode 140 and the multilayer body 110. As a result, it is possible to reduce or prevent a decrease in the moisture resistance of the multilayer ceramic capacitor 101. Also in the present preferred embodiment, it is preferable that, in the first region A1, the area ratio R occupied by the openings of the plurality of recesses 80 is about 52% or more, for example. It is preferable that other aspects such as the depth of the recess 80 are the same or substantially the same as those of the first preferred embodiment.

Figure 22:
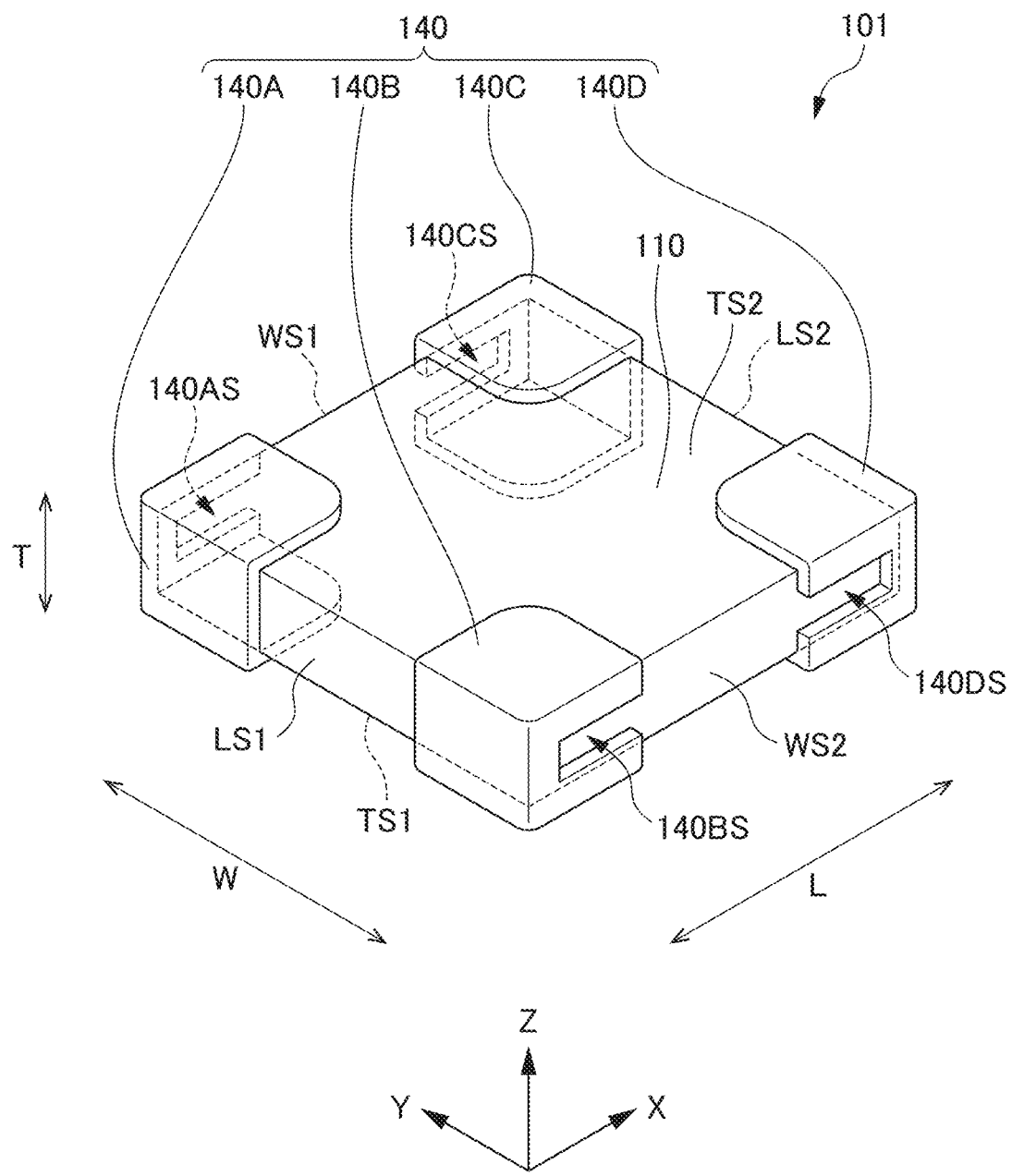
FIG. 22 is an external perspective view of a multilayer ceramic capacitor of a second modified example of a preferred embodiment of the present invention, and corresponding to FIG. 17.

Hereinafter, a second modified example of the multilayer ceramic capacitor 101 according to the present preferred embodiment will be described. In the following description, the same or corresponding components as those of the above-described preferred embodiment are denoted by the same reference numerals, and a detailed description thereof is omitted. FIG. 22 is an external perspective view of a multilayer ceramic capacitor 101 of the second modified example of the present preferred embodiment, and corresponding to FIG. 17. FIG. 23 is an exploded perspective view of a multilayer body 110 included in the multilayer ceramic capacitor 101 of the present modified example, and is a diagram corresponding to FIG. 18.

In the present modified example, the shapes of the internal electrode layer 130 and the external electrode 140 are different from those in the above-described preferred embodiments.

The plurality of internal electrode layers 130 each include a plurality of first internal electrode layers 131 and a plurality of second internal electrode layers 132.

The first internal electrode layer 131 extends to the first side surface LS1 of the multilayer body 110 with a first lead-out portion 131B, and extends to the second side surface LS2 of the multilayer body 110 with a second lead-out portion 131C. More specifically, the first lead-out portion 131B extends to the first side surface LS1 in the vicinity of the third side surface WS1 of the multilayer body 110, and the second lead-out portion 131C extends to the second side surface LS2 in the vicinity of the fourth side surface WS2 of the multilayer body 110. The first internal electrode layer 131 is not exposed at the third side surface WS1 or the fourth side surface WS2 of the multilayer body 110.

The second internal electrode layer 132 extends to the first side surface LS1 of the multilayer body 110 with a third lead-out portion 132B, and extends to the second side surface LS2 of the multilayer body with a fourth lead-out portion 132C. More specifically, the third lead-out portion 132B extends to the first side surface LS1 in the vicinity of the fourth side surface WS2 of the multilayer body 110, and the fourth lead-out portion 132C extends to the second side surface LS2 in the vicinity of the third side surface WS1 of the multilayer body 110. The second internal electrode layer 132 is not exposed at the third side surface WS1 or the fourth side surface WS2 of the multilayer body 110.

The first external electrode 140A includes a notch 140AS therein on the third side surface WS1.

The second external electrode 140B includes a notch 140BS therein on the fourth side surface WS2.

The third external electrode 140C includes a notch 140CS therein on the third side surface WS1.

The fourth external electrode 140D includes a notch 140DS therein on the fourth side surface WS2.

The first lead-out portions 131B of the first internal electrode layer 131 may extend to one of the first side surface LS1, the second side surface LS2, the third side surface WS1, and the fourth side surface WS2. In this case, the second lead-out portion 131C of the first internal electrode layer 131 may extend to one side surface other than the side from which the first lead-out portion 131B extends.

Furthermore, the third lead-out portion 132B of the second internal electrode layer 132 may extend to one of the first side surface LS1, the second side surface LS2, the third side surface WS1, and the fourth side surface WS2. In this case, the fourth lead-out portion 132C of the second internal electrode layer 132 may extend to one side surface other than the side from which the third lead-out portion 132B extends.

In addition, when viewing the multilayer ceramic capacitor 1 in the lamination direction T, it is preferable that a straight line connecting the first lead-out portion 131B and the second lead-out portion 131C of the first internal electrode layer 131, and a straight line connecting the third lead-out portion 132B and the fourth lead-out portion 132C of the second internal electrode layer 132 intersect.

Furthermore, in the four side surfaces LS1, LS2, LS3, and LS4 of the multilayer body 10, it is preferable that the first lead-out portion 131B of the first internal electrode layer 131 and the fourth lead-out portion 132C of the second internal electrode layer 132 extend to opposite locations, and the second lead-out portion 131C of the first internal electrode layer 131 and the third lead-out portion 132B of the second internal electrode layer 132 extend to opposite locations.

Also in the present modified example, in the plurality of first regions A1 on the first main surface TS1 of the multilayer body 110, the plurality of recesses 80 each having a spherical curved surface having a mean inlet size of about 0.3 μm or more and about 10.5 μm or less, for example, which are shown in the first preferred embodiment, are provided. Therefore, it is possible to ensure the anchor effect between the external electrode 140 and the multilayer body 110, and to increase the adhesion strength between the external electrode 140 and the multilayer body 110. As a result, it is possible to reduce or prevent a decrease in the moisture resistance of the multilayer ceramic capacitor 101. Also in the present preferred embodiment, in the first region A1, the area ratio R occupied by the openings of the plurality of recesses 80 is preferably about 52% or more, for example. It is preferable that other aspects such as the depth of the recess 80 are the same or substantially the same as those of the first preferred embodiment.

According to the multilayer ceramic capacitor 101 of the present preferred embodiment, the following advantageous effects are obtained in addition to the abovementioned (1) to (19).

(20) In the multilayer ceramic capacitor 101 according to the present preferred embodiment, the plurality of external electrodes 140 include the first external electrode 140A, the second external electrode 140B, the third external electrode 140C, and the fourth external electrode 140D, the first external electrode 140A is provided at least on a portion of the first main surface TS1, a portion of the first side surface LS1, and a portion of the third side surface WS1, the second external electrode 140B is provided at least on a portion of the first main surface TS1, a portion of the first side surface LS1, and a portion of the fourth side surface WS2, the third external electrode 140C is provided at least on a portion of the first main surface TS1, a portion of the second side surface LS2, and a portion of the third side surface WS1, the fourth external electrode 140D is provided at least on a portion of the first main surface TS1, a portion of the second side surface LS2, and a portion of the fourth side surface WS2, and the plurality of first regions A1 includes a region covered with the first external electrode 140A, a region covered with the second external electrode 140B, a region covered with the third external electrode 140C, and a region covered with the fourth external electrode 140D. Even in a multilayer ceramic capacitor including such four external electrodes 40, it is still possible to obtain the advantageous effects of various preferred embodiments of the present invention.

EXAMPLES

According to the above-described non-limiting example of a manufacturing method, multilayer ceramic capacitors were produced as samples of the Examples, and a moisture resistance reliability test and a folding resistance test were performed.

1. Manufacture of Multilayer Ceramic Capacitors

As samples of the Examples, multilayer ceramic capacitors having the following specifications were manufactured with the structure shown in FIGS. 1 to 7 in accordance with the manufacturing method of the first preferred embodiment.

Dimensions of multilayer ceramic capacitors: L×W×T=about 0.6 mm×about 0.3 mm×about 0.11 mm Material of dielectric layer (main component): $BaTiO_3$ Plurality of recesses having spherical curved surfaces are provided in first region A1 of multilayer body Average inlet size of plurality of recesses: see Table 1

Area ratio occupied by openings of plurality of recesses in first region A1: see Table 1

Material of internal electrode layer: Ni

Structure of external electrode

Base electrode layer: thin film layer mainly made of Ni/Cr alloy is formed by sputtering Plated layer: three-layer structure of Cu plated layer, Ni plated layer, and Sn plated layer from the base body side As a sample of the Comparative Examples, a multilayer ceramic capacitor including no plurality of recesses in the first region A1 of the multilayer body was manufactured. Except for a plurality of recesses not being provided, the sample was manufactured with the same or substantially the same specifications as the samples of the Examples.

2. Measurement and Testing

Next, the prepared samples were subjected to measurement and testing according to the following measurement method and test method.

(1) Moisture Resistance Reliability Test

Each sample was mounted on a glass epoxy board using eutectic solder. Thereafter, each sample was put into a high-temperature and high-humidity bath at about 125° C. and about 95% RH (relative humidity), and subjected to a moisture resistance accelerated test under the conditions of about 3.2 V for about 72 hours. The samples in which the insulation resistance value (IR value) was lowered by two digits or more were determined to be samples in which the moisture resistance was deteriorated, and the number of the samples was counted.

(2) Transverse Test

Tests were performed according to three-point bending tests using a stainless steel support and a stainless steel push bar. The distance between the support points was about 0.5 mm. A hemispherical push rod with a tip of R=about 0.05 mm was used. The samples were provided on the support base central portion, and brought into contact with the push rod at the central portion of the upper surface of the samples (the second main surface of the multilayer ceramic capacitor). A downward external force was applied to the push rod to confirm whether or not the samples fractured. The magnitude of the external force was about 2.0 N, the number of samples measured was 20, and the number of samples fractured was counted. The number of fractured chips is preferably 3 or less, and more preferably 0.

3. Test Results

The test results are given in Table 1.

TABLE 1

| | SAMPLE NO. | | | | | | | | | | | |
|---|---|---|---|---|---|---|---|---|---|---|---|---|
| | COMPARATIVE EXAMPLE | 1 | 2 | 3 | 4 | 5 | 6 | 7 | 8 | 9 | 10 | 11 |
| AREA RATIO OF RECESSES (%) | NO RECESSES | 79 | 80 | 78 | 81 | 82 | 81 | 79 | 26 | 52 | 77 | 98 |
| INLET SIZE OF RECESSES (μm) | NO RECESSES | 0.2 | 0.3 | 1.1 | 3.2 | 6.9 | 10.5 | 12.2 | 1.0 | 1.1 | 1.1 | 0.9 |
| MOISTURE RESISTANCE RELIABILITY TEST-DETERIORATION | 5/10 | 3/10 | 0/10 | 0/10 | 0/10 | 0/10 | 0/10 | 0/10 | 2/10 | 0/10 | 0/10 | 0/10 |
| TRANSVERSE TEST-FRACTURE | 0/10 | 0/10 | 0/10 | 0/10 | 0/10 | 1/10 | 2/10 | 5/10 | 0/10 | 0/10 | 0/10 | 0/10 |
| EVALUATION | P | P | E | E | E | G | G | P | G | E | E | E |

E: Excellent, G: Good, P: Poor(not applicable)

As shown in Table 1, favorable results were obtained from Samples 2 to 6 and 8 to 11 of the Examples as compared to the sample of the Comparative Examples. That is, when the inlet size of the recess was about 0.3 μm or more and about 10.5 μm or less, favorable results were obtained in both the moisture resistance reliability test and the transverse test. In particular, when the inlet size of the recess was about 0.3 μm or more and about 3.2 μm or less, extremely favorable balanced results were obtained in both the moisture resistance reliability test and the folding test.

It was also discovered from the test results that it is preferable that the area ratio of the recesses, that is, the area ratio occupied by the openings of the plurality of recesses in the first region A1, is about 52% or more. When the area ratio of the recesses was about 26%, the moisture resistance reliability was inferior to that when the area ratio of the recesses is about 52% or more. However, even in the samples in which the area ratio of the recess was about 26%, the advantageous effect of improving the moisture resistance reliability compared with the Comparative Examples was obtained.

In view of the above results, it is possible for the ceramic capacitor according to preferred embodiments of the present invention to enable the anchor effect to be generated between the external electrode and the multilayer body, and to increase the adhesion strength between the external electrode and the multilayer body. As a result, it is possible to reduce or prevent the intrusion of moisture or the like from the interface between the multilayer body and the external electrode, such that it is possible to reduce or prevent a decrease in moisture resistance of the multilayer ceramic capacitor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
 a multilayer body including a plurality of laminated dielectric layers and a plurality or laminated internal electrode layers, the multilayer body further including a first main surface and a second main surface which oppose each other in a lamination direction, a first side surface and a second side surface which oppose each other in a length direction perpendicular or substantially perpendicular to the lamination direction, and a third side surface and a fourth side surface which oppose each other in a width direction perpendicular or substantially perpendicular to the lamination direction and the length direction; and
 a plurality of external electrodes including a first external electrode, a second external electrode, a third external electrode, and a fourth external electrode; wherein
 the fir external electrode is provided on at least a portion of the first main surface, a portion of the first side surface, and a portion of the third side surface;
 the second external electrode is provided on at least a portion of the first main surface, a portion of the first side surface, and a portion of the fourth side surface;
 the third external electrode is provided on at least a portion of the first main surface, a portion of the second side surface, and a portion of the third side surface;
 the fourth external electrode is provided on at least a portion of the first main surface, a portion of the second side surface, and a portion of the fourth side surface; and
 the first main surface includes a plurality of first regions and a second region;
 the plurality of first regions include a region covered with the first external electrode, a region covered with the second external electrode, a region covered with the third external electrode, and a region covered with the fourth external electrode; and
 the second region includes a region exposed from the plurality of external electrodes;
 the plurality of first regions each include a plurality of recesses therein;
 the plurality of recesses in each of: the plurality of first regions each include a spherical curved wall surface; and
 the plurality of recesses in each of the plurality of first regions each have an average inlet size of about 0.3 μm or more and about 10.5 μm or less.

2. The multilayer ceramic capacitor according to claim 1, wherein, in each of the plurality of first regions, an area ratio occupied by openings of the plurality of recesses is about 52% or more.

3. The multilayer ceramic capacitor according to claim 1, wherein
 each of the plurality of external electrodes is also provided on a portion of the second main surface;

the second main surface includes a plurality of third regions covered by the plurality of external electrodes and a fourth region exposed from the plurality of external electrode;

the plurality of third regions of the second main surface each include a plurality of recesses therein;

the plurality of recesses in each of the plurality of third regions each include a spherical curved wall surface; and the plurality of recesses in each of the plurality of third regions each have an average inlet size of about 0.3 µm or more and about 10.5 µm or less.

4. The multilayer ceramic capacitor according to claim 3, wherein, in each of the plurality of third regions, an area ratio occupied by openings of the plurality of recesses is about 52% or more.

5. The multilayer ceramic capacitor according to claim 3, wherein the fourth region, in addition to the plurality of third regions, includes a plurality of recesses provided therein;

the plurality of recesses in the fourth region each include a spherical curved wall surface; and the plurality of recesses provided in the fourth region each have an average inlet size of about 0.3 µm or more and about 10.5 µm or less.

6. The multilayer ceramic capacitor according to claim 3, wherein, in the fourth region, an area ratio occupied by openings of the plurality of recesses is about 52% or more.

7. The multilayer ceramic capacitor according to claim 1, wherein the second region, in addition to the plurality of first regions, includes a plurality of recesses therein;

the plurality of recesses in the second region each include a spherical curved wall surface; and the plurality of recesses provided in the second region each have an average inlet size of about 0.3 µm or more and about 10.5 µm or less.

8. The multilayer ceramic capacitor according to claim 7, wherein, in the second region, an area ratio occupied by openings of the plurality of recesses is about 52% or more.

9. The multilayer ceramic capacitor according to claim 1, wherein, in the plurality of first regions, the plurality of recesses have an average inlet size of about twice or more and about 20 times or less the average particle size of the ceramic particles included in the plurality of dielectric layers.

10. The multilayer ceramic capacitor according to claim 1, wherein the plurality of internal electrode layers include plurality of first internal electrode layers and a plurality of second internal electrode layers;

the multilayer body includes the plurality of dielectric layers sandwiched between the plurality of first internal electrode layers and the plurality of second internal, electrode layers; and in the plurality of first regions, the plurality of recesses have an average inlet size of about 0.2 times or more and about 5 times or less a thickness of the dielectric layers.

11. The multilayer ceramic capacitor according to claim 1, wherein, in the plurality of first regions, the plurality of recesses have an average depth of about 0.1 µm or more and about 5 µm or less.

12. The multilayer ceramic capacitor according to claim 1, wherein a dimension in the length direction of the multilayer body is about 0.43 mm or more and about 0.73 mm or less.

13. The multilayer ceramic capacitor according to claim 1, wherein a dimension in the width direction of the multilayer body is about 0.85≤(width dimension)/(length dimension)≤about 1.0.

14. The multilayer ceramic capacitor according to claim 1, wherein a dimension in the lamination direction of the multilayer body is about 50 µm or more and about 90 µm or less.

* * * * *